US012651190B2

(12) United States Patent
Kliuchnikov et al.

(10) Patent No.: US 12,651,190 B2
(45) Date of Patent: Jun. 9, 2026

(54) STABILIZER INSTRUMENT EQUALITY DETERMINATION

(71) Applicant: Microsoft Technology Licensing, LLC, Redmond, WA (US)

(72) Inventors: Vadym Kliuchnikov, Redmond, WA (US); Michael Edward Beverland, Seattle, WA (US); Adam Edward Paetznick, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 741 days.

(21) Appl. No.: 18/067,683

(22) Filed: Dec. 16, 2022

(65) Prior Publication Data

US 2024/0169244 A1      May 23, 2024

Related U.S. Application Data

(60) Provisional application No. 63/383,057, filed on Nov. 9, 2022.

(51) Int. Cl.
*G06N 10/60* (2022.01)
*G06N 10/80* (2022.01)

(52) U.S. Cl.
CPC ............. *G06N 10/60* (2022.01); *G06N 10/80* (2022.01)

(58) Field of Classification Search
None
See application file for complete search history.

(56) References Cited

U.S. PATENT DOCUMENTS

2014/0118023 A1* 5/2014 Eastin .................. H03K 19/195
326/7
2021/0126652 A1* 4/2021 Delfosse ............. H03M 13/136
(Continued)

FOREIGN PATENT DOCUMENTS

WO        2014066054 A2      5/2014
WO        WO-2021202409 A1 * 10/2021 ............. G06N 10/40
(Continued)

OTHER PUBLICATIONS

Spee, Cornelia, Costantino Budroni, and Otfried Gühne. "Simulating extremal temporal correlations." New Journal of Physics 22, No. 10 (2020): 103037. (Year: 2020).*
(Continued)

*Primary Examiner* — Uyen T Le
(74) *Attorney, Agent, or Firm* — Alleman Hall LLP

(57) ABSTRACT

A computing system including a processor configured to receive a first stabilizer instrument specification of a first stabilizer instrument. The first stabilizer instrument specification includes a first input Clifford unitary, a first output Clifford unitary, and first stabilizer instrument bit matrices. The processor is further configured to receive a second stabilizer instrument specification of a second stabilizer instrument. The second stabilizer instrument specification includes a second input Clifford unitary, a second output Clifford unitary, and second stabilizer instrument bit matrices. Based at least in part on the first stabilizer instrument specification and the second stabilizer instrument specification, the processor is further configured to determine whether the first stabilizer instrument is equal to the second stabilizer instrument up to measurement outcome relabeling. The processor is further configured to output an indication of whether the first stabilizer instrument is equal to the second stabilizer instrument up to measurement outcome relabeling.

18 Claims, 29 Drawing Sheets

(56)                    References Cited

U.S. PATENT DOCUMENTS

| 2021/0224150 | A1  |    | 7/2021  | Zheng |            |
|--------------|-----|----|---------|-------|------------|
| 2021/0240893 | A1* |    | 8/2021  | Gunnels | G06F 30/30 |
| 2021/0391873 | A1* |    | 12/2021 | Zheng | G06N 3/045 |
| 2022/0129411 | A1  |    | 4/2022  | Bravyi |           |
| 2022/0278683 | A1* |    | 9/2022  | Haah | H03K 19/195 |
| 2023/0027698 | A1  |    | 1/2023  | Hastings et al. |   |

FOREIGN PATENT DOCUMENTS

| WO |    | 2022090178 | A2 |   | 5/2022  |          |
|----|----|------------|----|---|---------|----------|
| WO | WO-2022251913 | | A1 | * | 12/2022 | H03M 13/11 |

OTHER PUBLICATIONS

Beverland, et al., "Lower Bounds on the Non-Clifford Resources for Quantum Computations", Retrieved From: http://dx.doi.org/10.1088/2058-9565/ab8963, May 28, 2020, 63 Pages.

Pllaha, et al., "Decomposition of Clifford Gates", In Proceedings of IEEE Global Communications Conference, Dec. 7, 2021, pp. 1-9.

Notice of Allowance mailed on Apr. 17, 2024, in U.S. Appl. No. 18/067,641 9 pages.

Gross, et al., "Schur-Weyl Duality for the Clifford Group with Applications: Property Testing, a Robust Hudson Theorem, and de Finetti Representations", ArXiv.org, Cornell University, Jan. 16, 2021, 69 pages.

International Search Report and Written Opinion received for PCT Application No. PCT/US2023/032035 mailed on Jan. 5, 2024, 10 pages.

International Search Report and Written Opinion received for PCT Application No. PCT/US2023/033661, mailed on Feb. 6, 2024, 10 pages.

Kliuchinikov, et al., "Stabilizer circuit verification", ArXiv.org, Cornell University, Sep. 15, 2023, 90 pages.

Notice of Allowance mailed on Aug. 29, 2024, in U.S. Appl. No. 18/067,641, 9 pages.

Non-Final Office Action mailed on Aug. 28, 2025, in U.S. Appl. No. 18/067,665, 06 pages.

* cited by examiner

1

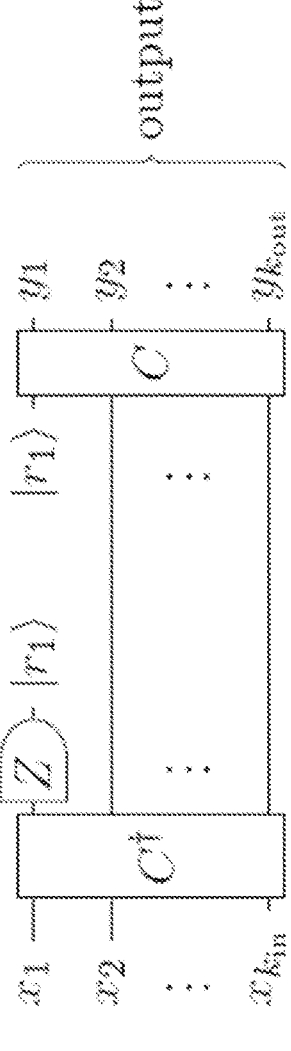
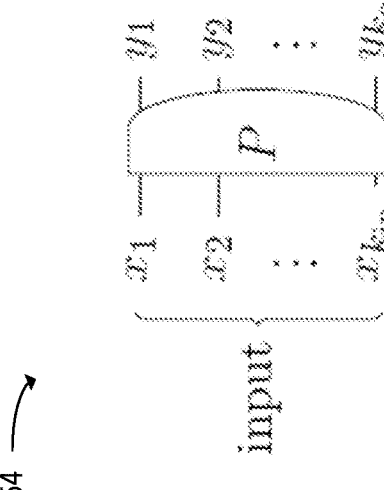
FIG. 4B

Figure 7A:
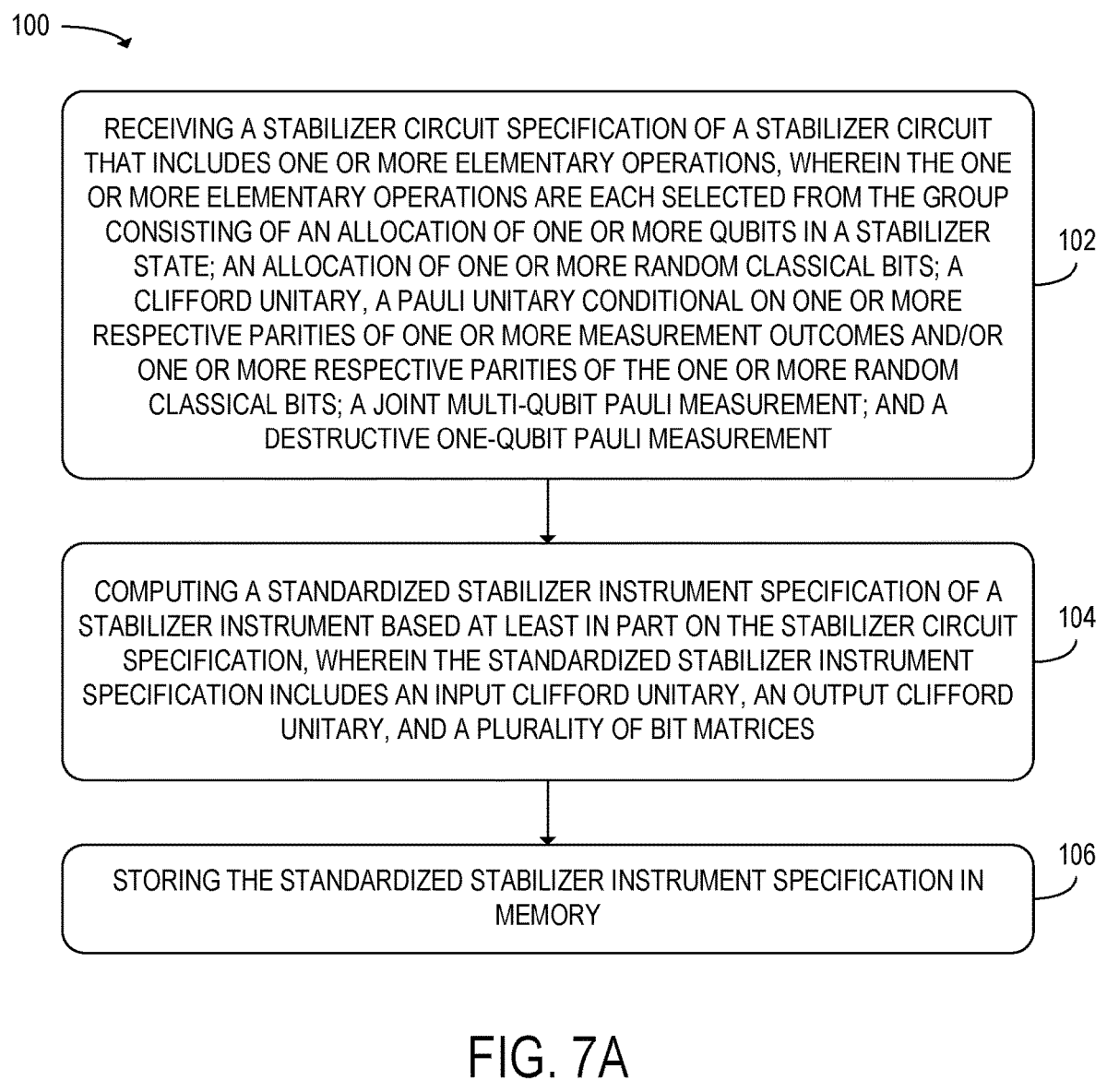

100 ⟶

RECEIVING A STABILIZER CIRCUIT SPECIFICATION OF A STABILIZER CIRCUIT THAT INCLUDES ONE OR MORE ELEMENTARY OPERATIONS, WHEREIN THE ONE OR MORE ELEMENTARY OPERATIONS ARE EACH SELECTED FROM THE GROUP CONSISTING OF AN ALLOCATION OF ONE OR MORE QUBITS IN A STABILIZER STATE; AN ALLOCATION OF ONE OR MORE RANDOM CLASSICAL BITS; A CLIFFORD UNITARY, A PAULI UNITARY CONDITIONAL ON ONE OR MORE RESPECTIVE PARITIES OF ONE OR MORE MEASUREMENT OUTCOMES AND/OR ONE OR MORE RESPECTIVE PARITIES OF THE ONE OR MORE RANDOM CLASSICAL BITS; A JOINT MULTI-QUBIT PAULI MEASUREMENT; AND A DESTRUCTIVE ONE-QUBIT PAULI MEASUREMENT

102

COMPUTING A STANDARDIZED STABILIZER INSTRUMENT SPECIFICATION OF A STABILIZER INSTRUMENT BASED AT LEAST IN PART ON THE STABILIZER CIRCUIT SPECIFICATION, WHEREIN THE STANDARDIZED STABILIZER INSTRUMENT SPECIFICATION INCLUDES AN INPUT CLIFFORD UNITARY, AN OUTPUT CLIFFORD UNITARY, AND A PLURALITY OF BIT MATRICES

104

STORING THE STANDARDIZED STABILIZER INSTRUMENT SPECIFICATION IN MEMORY

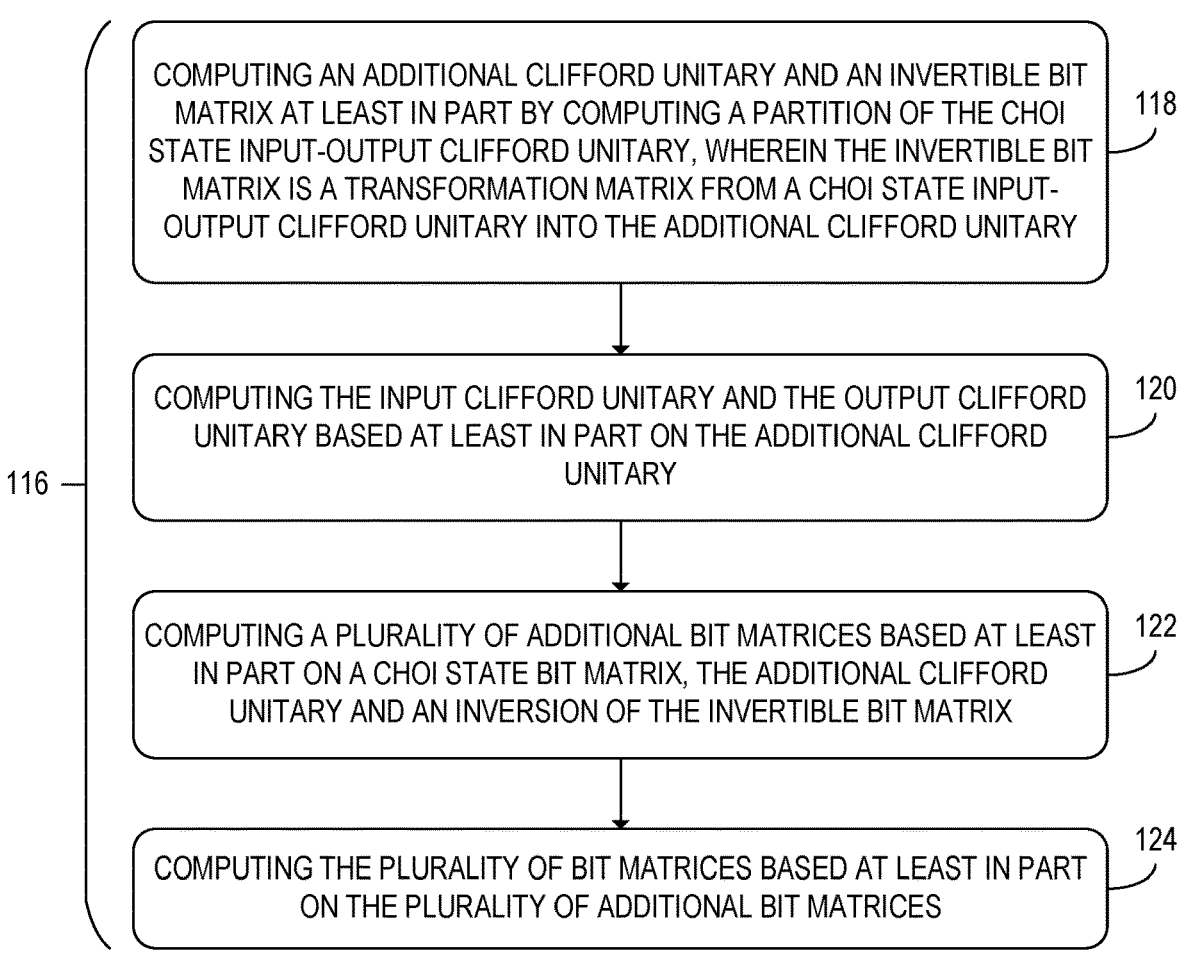

116 —

118 — COMPUTING AN ADDITIONAL CLIFFORD UNITARY AND AN INVERTIBLE BIT MATRIX AT LEAST IN PART BY COMPUTING A PARTITION OF THE CHOI STATE INPUT-OUTPUT CLIFFORD UNITARY, WHEREIN THE INVERTIBLE BIT MATRIX IS A TRANSFORMATION MATRIX FROM A CHOI STATE INPUT-OUTPUT CLIFFORD UNITARY INTO THE ADDITIONAL CLIFFORD UNITARY

120 — COMPUTING THE INPUT CLIFFORD UNITARY AND THE OUTPUT CLIFFORD UNITARY BASED AT LEAST IN PART ON THE ADDITIONAL CLIFFORD UNITARY

122 — COMPUTING A PLURALITY OF ADDITIONAL BIT MATRICES BASED AT LEAST IN PART ON A CHOI STATE BIT MATRIX, THE ADDITIONAL CLIFFORD UNITARY AND AN INVERSION OF THE INVERTIBLE BIT MATRIX

124 — COMPUTING THE PLURALITY OF BIT MATRICES BASED AT LEAST IN PART ON THE PLURALITY OF ADDITIONAL BIT MATRICES

FIG. 7C

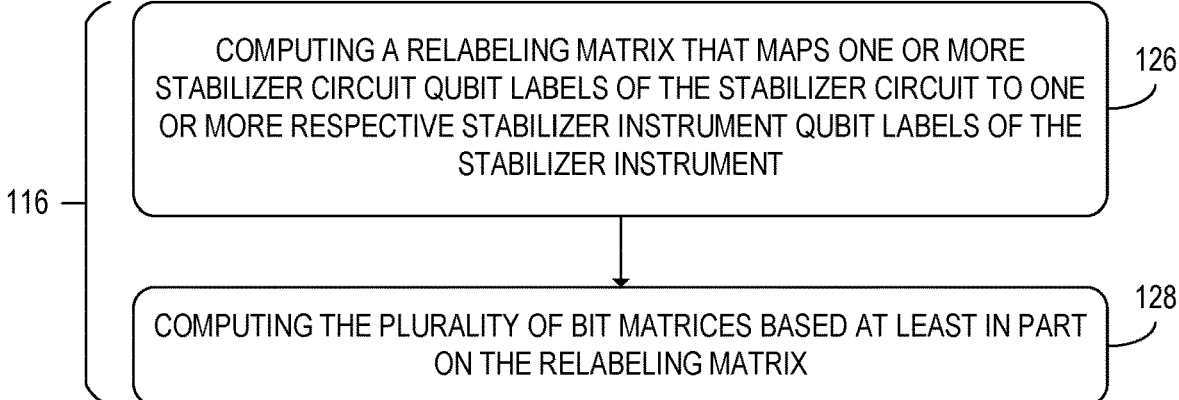

116 —

126 — COMPUTING A RELABELING MATRIX THAT MAPS ONE OR MORE STABILIZER CIRCUIT QUBIT LABELS OF THE STABILIZER CIRCUIT TO ONE OR MORE RESPECTIVE STABILIZER INSTRUMENT QUBIT LABELS OF THE STABILIZER INSTRUMENT

128 — COMPUTING THE PLURALITY OF BIT MATRICES BASED AT LEAST IN PART ON THE RELABELING MATRIX

FIG. 7D

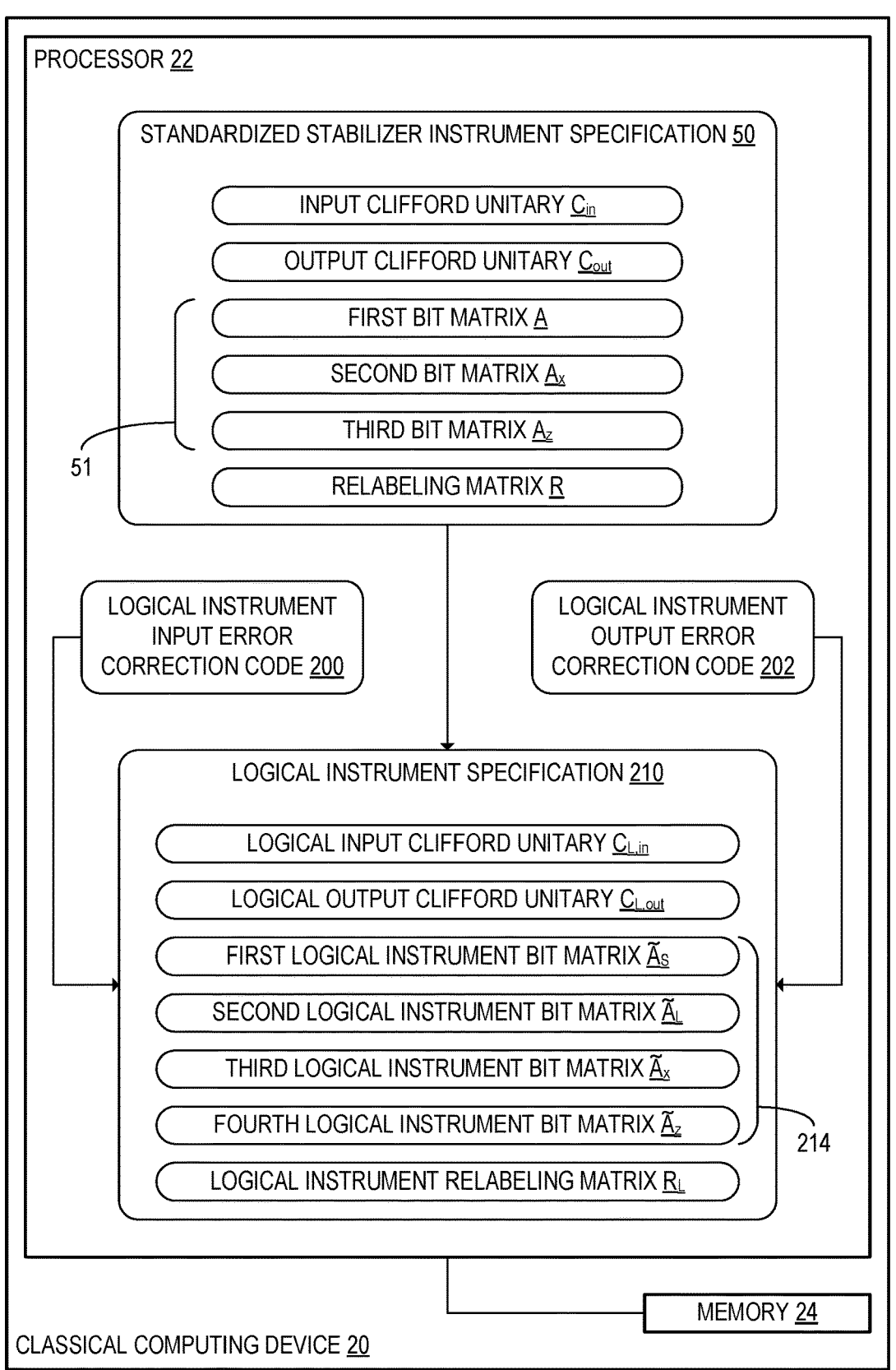

PROCESSOR 22

STANDARDIZED STABILIZER INSTRUMENT SPECIFICATION 50

INPUT CLIFFORD UNITARY $C_{in}$

OUTPUT CLIFFORD UNITARY $C_{out}$

FIRST BIT MATRIX $A$

SECOND BIT MATRIX $A_x$

THIRD BIT MATRIX $A_z$

51

RELABELING MATRIX $R$

LOGICAL INSTRUMENT INPUT ERROR CORRECTION CODE 200

LOGICAL INSTRUMENT OUTPUT ERROR CORRECTION CODE 202

LOGICAL INSTRUMENT SPECIFICATION 210

LOGICAL INPUT CLIFFORD UNITARY $C_{L,in}$

LOGICAL OUTPUT CLIFFORD UNITARY $C_{L,out}$

FIRST LOGICAL INSTRUMENT BIT MATRIX $\tilde{A}_S$

SECOND LOGICAL INSTRUMENT BIT MATRIX $\tilde{A}_L$

THIRD LOGICAL INSTRUMENT BIT MATRIX $\tilde{A}_x$

FOURTH LOGICAL INSTRUMENT BIT MATRIX $\tilde{A}_z$

214

LOGICAL INSTRUMENT RELABELING MATRIX $R_L$

MEMORY 24

CLASSICAL COMPUTING DEVICE 20

FIG. 8A

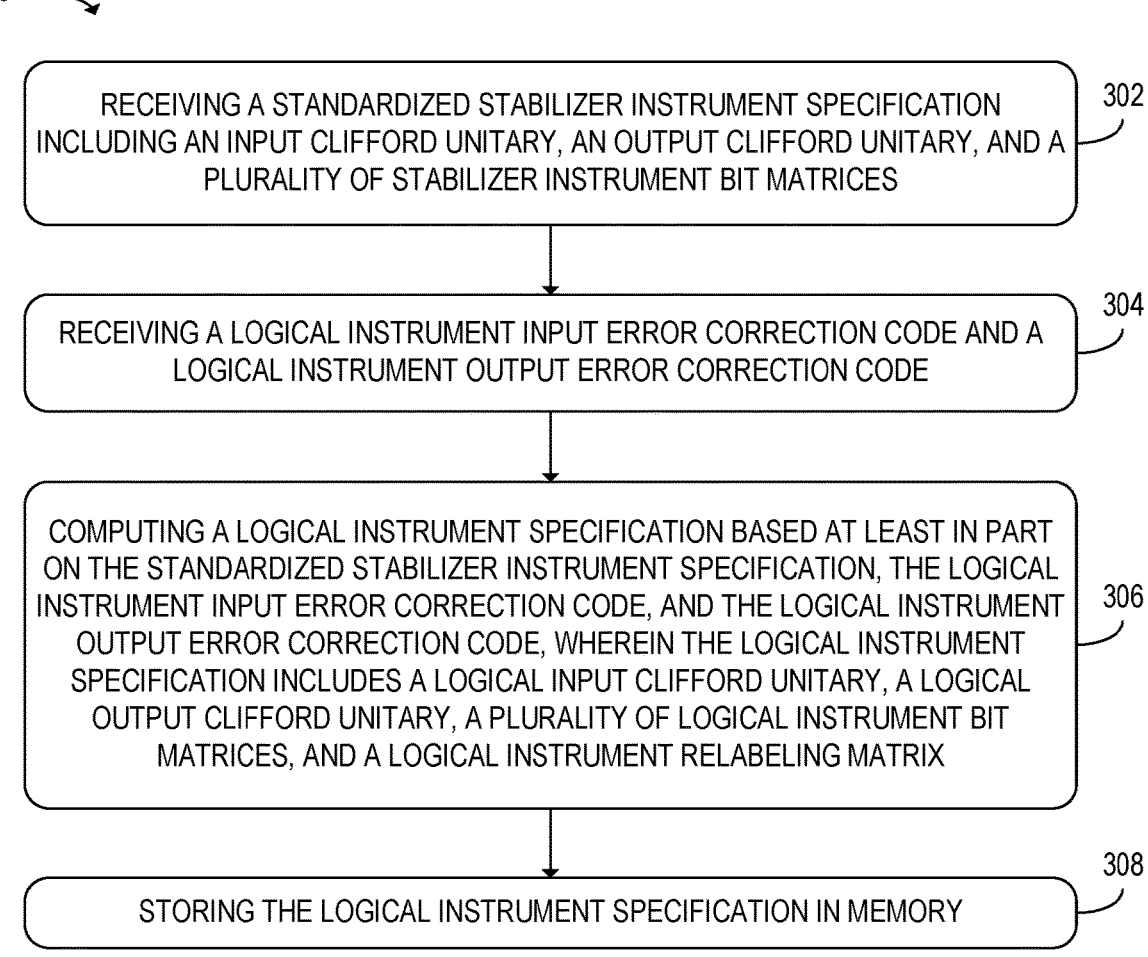

300

RECEIVING A STANDARDIZED STABILIZER INSTRUMENT SPECIFICATION INCLUDING AN INPUT CLIFFORD UNITARY, AN OUTPUT CLIFFORD UNITARY, AND A PLURALITY OF STABILIZER INSTRUMENT BIT MATRICES — 302

RECEIVING A LOGICAL INSTRUMENT INPUT ERROR CORRECTION CODE AND A LOGICAL INSTRUMENT OUTPUT ERROR CORRECTION CODE — 304

COMPUTING A LOGICAL INSTRUMENT SPECIFICATION BASED AT LEAST IN PART ON THE STANDARDIZED STABILIZER INSTRUMENT SPECIFICATION, THE LOGICAL INSTRUMENT INPUT ERROR CORRECTION CODE, AND THE LOGICAL INSTRUMENT OUTPUT ERROR CORRECTION CODE, WHEREIN THE LOGICAL INSTRUMENT SPECIFICATION INCLUDES A LOGICAL INPUT CLIFFORD UNITARY, A LOGICAL OUTPUT CLIFFORD UNITARY, A PLURALITY OF LOGICAL INSTRUMENT BIT MATRICES, AND A LOGICAL INSTRUMENT RELABELING MATRIX — 306

STORING THE LOGICAL INSTRUMENT SPECIFICATION IN MEMORY — 308

Figure 15B:
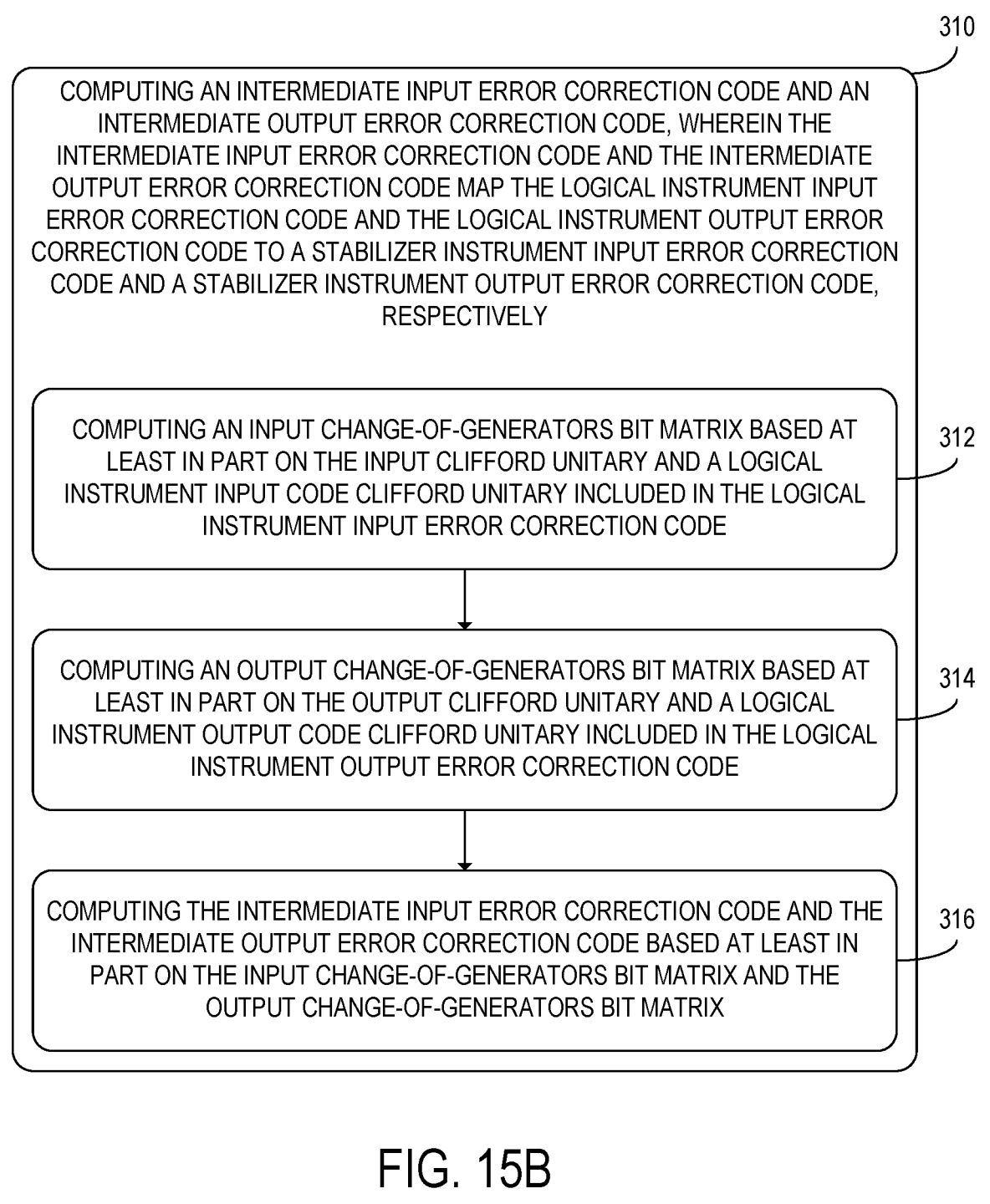

COMPUTING AN INTERMEDIATE INPUT ERROR CORRECTION CODE AND AN INTERMEDIATE OUTPUT ERROR CORRECTION CODE, WHEREIN THE INTERMEDIATE INPUT ERROR CORRECTION CODE AND THE INTERMEDIATE OUTPUT ERROR CORRECTION CODE MAP THE LOGICAL INSTRUMENT INPUT ERROR CORRECTION CODE AND THE LOGICAL INSTRUMENT OUTPUT ERROR CORRECTION CODE TO A STABILIZER INSTRUMENT INPUT ERROR CORRECTION CODE AND A STABILIZER INSTRUMENT OUTPUT ERROR CORRECTION CODE, RESPECTIVELY

COMPUTING AN INPUT CHANGE-OF-GENERATORS BIT MATRIX BASED AT LEAST IN PART ON THE INPUT CLIFFORD UNITARY AND A LOGICAL INSTRUMENT INPUT CODE CLIFFORD UNITARY INCLUDED IN THE LOGICAL INSTRUMENT INPUT ERROR CORRECTION CODE

312

COMPUTING AN OUTPUT CHANGE-OF-GENERATORS BIT MATRIX BASED AT LEAST IN PART ON THE OUTPUT CLIFFORD UNITARY AND A LOGICAL INSTRUMENT OUTPUT CODE CLIFFORD UNITARY INCLUDED IN THE LOGICAL INSTRUMENT OUTPUT ERROR CORRECTION CODE

314

COMPUTING THE INTERMEDIATE INPUT ERROR CORRECTION CODE AND THE INTERMEDIATE OUTPUT ERROR CORRECTION CODE BASED AT LEAST IN PART ON THE INPUT CHANGE-OF-GENERATORS BIT MATRIX AND THE OUTPUT CHANGE-OF-GENERATORS BIT MATRIX

Figure 15C:
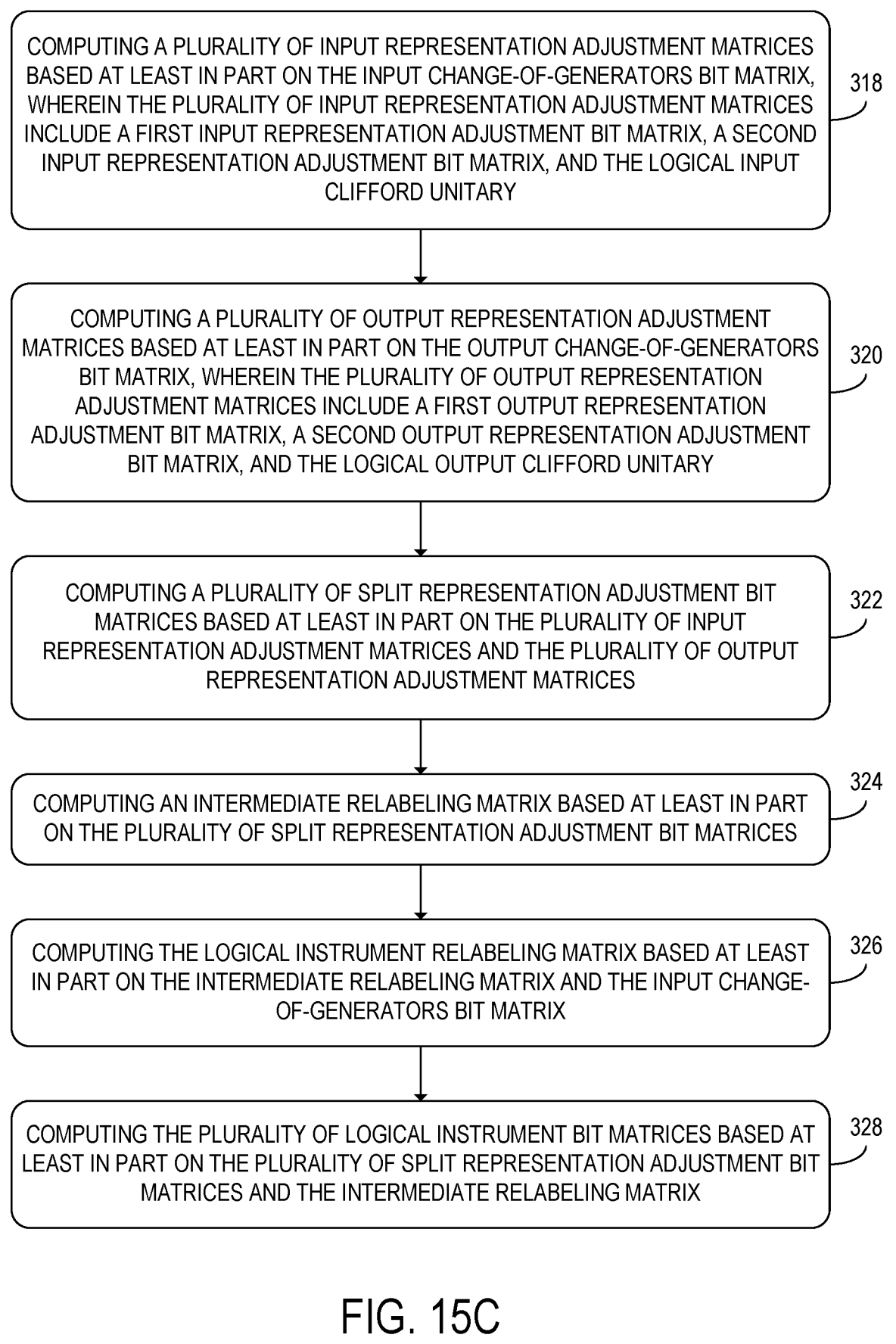

COMPUTING A PLURALITY OF INPUT REPRESENTATION ADJUSTMENT MATRICES BASED AT LEAST IN PART ON THE INPUT CHANGE-OF-GENERATORS BIT MATRIX, WHEREIN THE PLURALITY OF INPUT REPRESENTATION ADJUSTMENT MATRICES INCLUDE A FIRST INPUT REPRESENTATION ADJUSTMENT BIT MATRIX, A SECOND INPUT REPRESENTATION ADJUSTMENT BIT MATRIX, AND THE LOGICAL INPUT CLIFFORD UNITARY    318

COMPUTING A PLURALITY OF OUTPUT REPRESENTATION ADJUSTMENT MATRICES BASED AT LEAST IN PART ON THE OUTPUT CHANGE-OF-GENERATORS BIT MATRIX, WHEREIN THE PLURALITY OF OUTPUT REPRESENTATION ADJUSTMENT MATRICES INCLUDE A FIRST OUTPUT REPRESENTATION ADJUSTMENT BIT MATRIX, A SECOND OUTPUT REPRESENTATION ADJUSTMENT BIT MATRIX, AND THE LOGICAL OUTPUT CLIFFORD UNITARY    320

COMPUTING A PLURALITY OF SPLIT REPRESENTATION ADJUSTMENT BIT MATRICES BASED AT LEAST IN PART ON THE PLURALITY OF INPUT REPRESENTATION ADJUSTMENT MATRICES AND THE PLURALITY OF OUTPUT REPRESENTATION ADJUSTMENT MATRICES    322

COMPUTING AN INTERMEDIATE RELABELING MATRIX BASED AT LEAST IN PART ON THE PLURALITY OF SPLIT REPRESENTATION ADJUSTMENT BIT MATRICES    324

COMPUTING THE LOGICAL INSTRUMENT RELABELING MATRIX BASED AT LEAST IN PART ON THE INTERMEDIATE RELABELING MATRIX AND THE INPUT CHANGE-OF-GENERATORS BIT MATRIX    326

COMPUTING THE PLURALITY OF LOGICAL INSTRUMENT BIT MATRICES BASED AT LEAST IN PART ON THE PLURALITY OF SPLIT REPRESENTATION ADJUSTMENT BIT MATRICES AND THE INTERMEDIATE RELABELING MATRIX    328

Figure 18A:
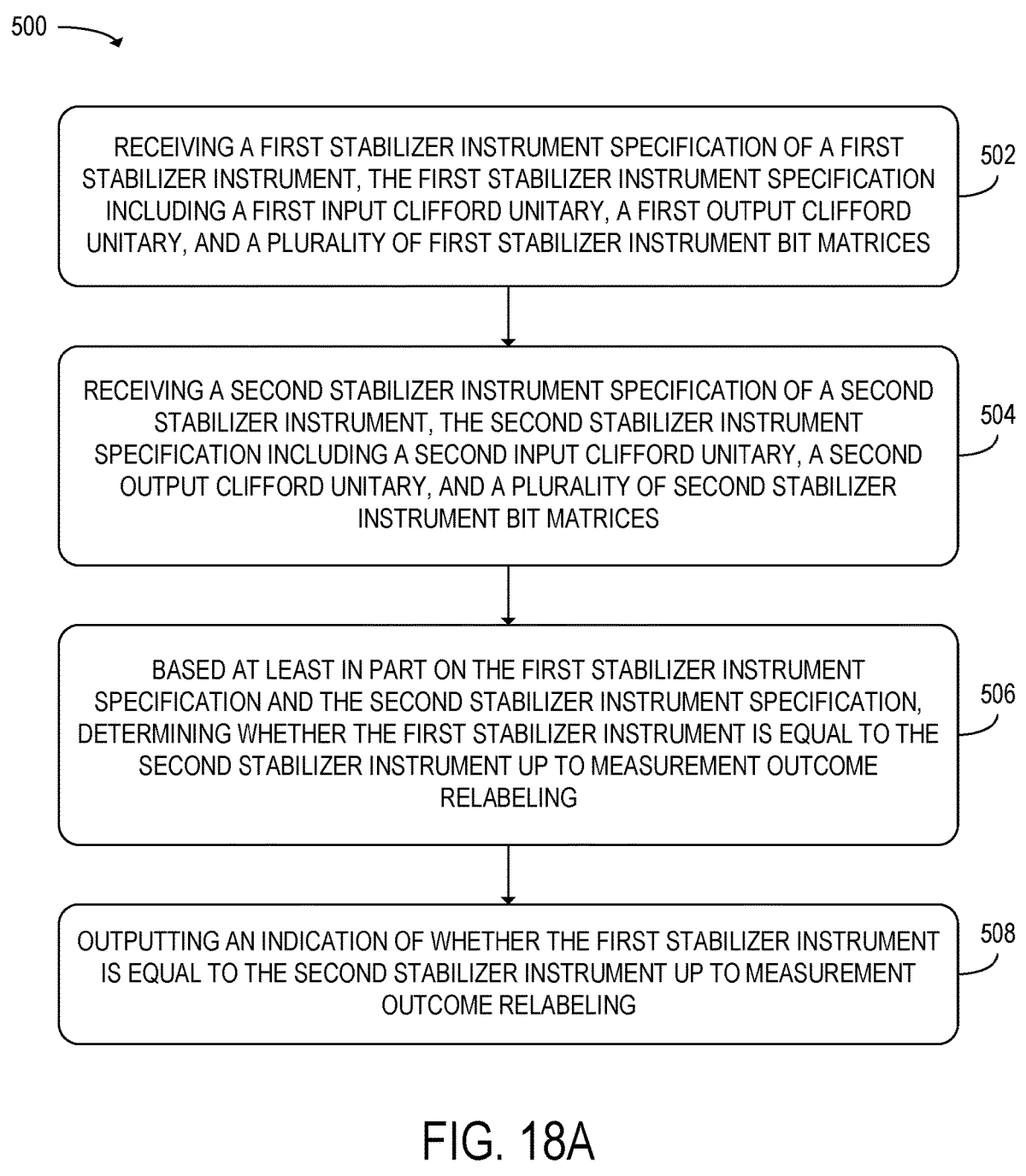

RECEIVING A FIRST STABILIZER INSTRUMENT SPECIFICATION OF A FIRST STABILIZER INSTRUMENT, THE FIRST STABILIZER INSTRUMENT SPECIFICATION INCLUDING A FIRST INPUT CLIFFORD UNITARY, A FIRST OUTPUT CLIFFORD UNITARY, AND A PLURALITY OF FIRST STABILIZER INSTRUMENT BIT MATRICES

502

RECEIVING A SECOND STABILIZER INSTRUMENT SPECIFICATION OF A SECOND STABILIZER INSTRUMENT, THE SECOND STABILIZER INSTRUMENT SPECIFICATION INCLUDING A SECOND INPUT CLIFFORD UNITARY, A SECOND OUTPUT CLIFFORD UNITARY, AND A PLURALITY OF SECOND STABILIZER INSTRUMENT BIT MATRICES

504

BASED AT LEAST IN PART ON THE FIRST STABILIZER INSTRUMENT SPECIFICATION AND THE SECOND STABILIZER INSTRUMENT SPECIFICATION, DETERMINING WHETHER THE FIRST STABILIZER INSTRUMENT IS EQUAL TO THE SECOND STABILIZER INSTRUMENT UP TO MEASUREMENT OUTCOME RELABELING

506

OUTPUTTING AN INDICATION OF WHETHER THE FIRST STABILIZER INSTRUMENT IS EQUAL TO THE SECOND STABILIZER INSTRUMENT UP TO MEASUREMENT OUTCOME RELABELING

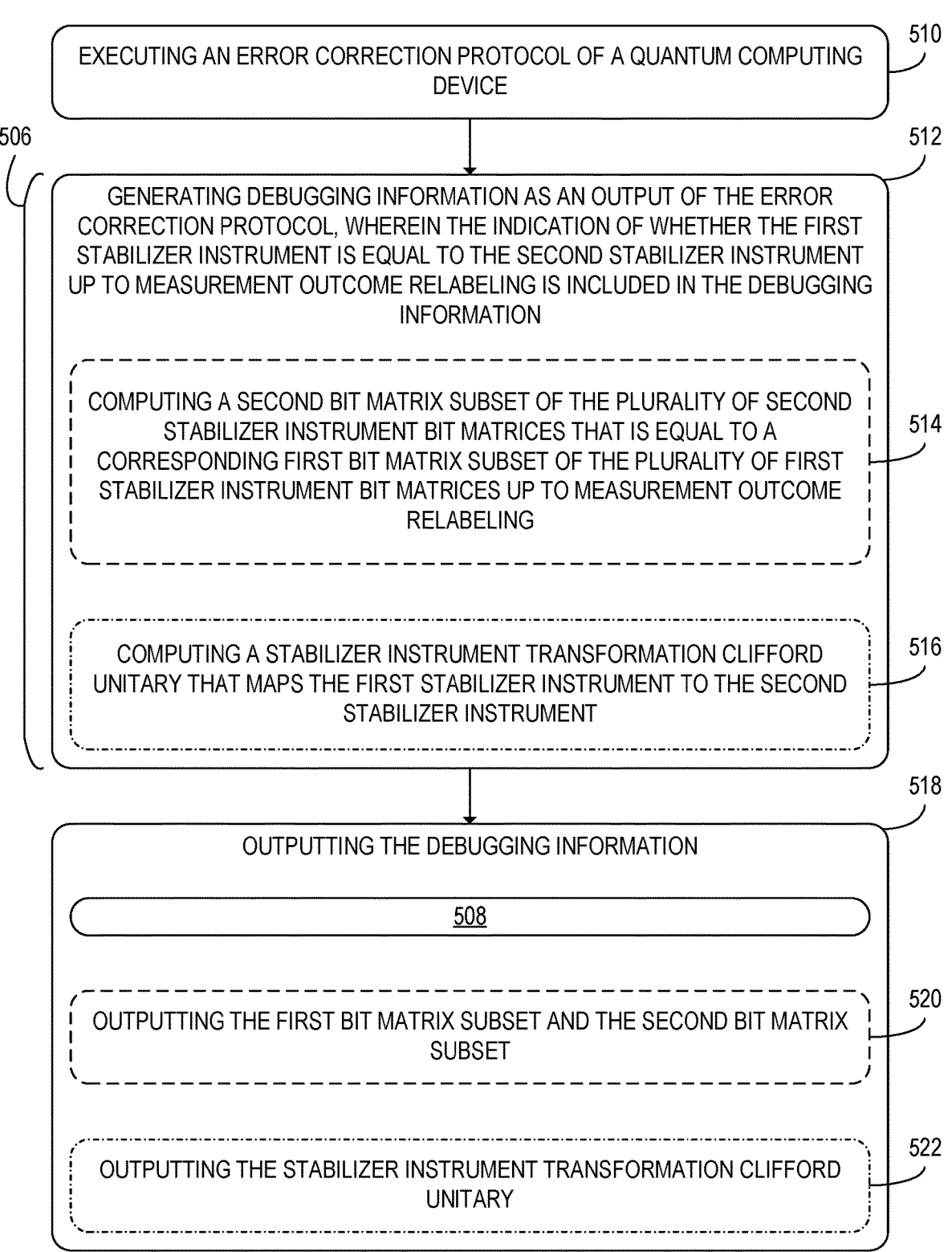

510

EXECUTING AN ERROR CORRECTION PROTOCOL OF A QUANTUM COMPUTING DEVICE

506

512

GENERATING DEBUGGING INFORMATION AS AN OUTPUT OF THE ERROR CORRECTION PROTOCOL, WHEREIN THE INDICATION OF WHETHER THE FIRST STABILIZER INSTRUMENT IS EQUAL TO THE SECOND STABILIZER INSTRUMENT UP TO MEASUREMENT OUTCOME RELABELING IS INCLUDED IN THE DEBUGGING INFORMATION

514

COMPUTING A SECOND BIT MATRIX SUBSET OF THE PLURALITY OF SECOND STABILIZER INSTRUMENT BIT MATRICES THAT IS EQUAL TO A CORRESPONDING FIRST BIT MATRIX SUBSET OF THE PLURALITY OF FIRST STABILIZER INSTRUMENT BIT MATRICES UP TO MEASUREMENT OUTCOME RELABELING

516

COMPUTING A STABILIZER INSTRUMENT TRANSFORMATION CLIFFORD UNITARY THAT MAPS THE FIRST STABILIZER INSTRUMENT TO THE SECOND STABILIZER INSTRUMENT

518

OUTPUTTING THE DEBUGGING INFORMATION

508

520

OUTPUTTING THE FIRST BIT MATRIX SUBSET AND THE SECOND BIT MATRIX SUBSET

522

OUTPUTTING THE STABILIZER INSTRUMENT TRANSFORMATION CLIFFORD UNITARY

FIG. 18B

STABILIZER INSTRUMENT EQUALITY DETERMINATION

CROSS REFERENCE TO RELATED APPLICATIONS

This application claims priority to U.S. Provisional Patent Application Ser. No. 63/383,057, filed Nov. 9, 2022, the entirety of which is hereby incorporated herein by reference for all purposes.

BACKGROUND

In fault-tolerant quantum computing, error correction codes are used to fix errors in quantum computations specified by quantum circuits. These error correction codes modify the quantum states of physical qubits that make up the logical qubits of the quantum computing device. For example, multiple physical qubits may be entangled to form a logical qubit. Thus, the states of the logical qubits may be corrected to match expected behavior of the quantum computations.

When implementing an error correction protocol on a fault-tolerant quantum computing device, a verification process may be performed to determine whether the error correction protocol has its intended effect on the quantum circuit. This verification may be performed using a stabilizer circuit. The stabilizer circuit performs an operation known as a stabilizer instrument via which a density matrix is mapped to a joint quantum-classical state, as discussed in further detail below. Thus, measurement outcomes obtained from a quantum circuit may be mapped to joint quantum-classical states from which the accuracy of a quantum computation may be determined.

Stabilizer circuits also have other uses in quantum computing in addition to fault-tolerant protocol verification. For example, stabilizer circuits may be used to verify T-state distillation protocols and measure the effects of noise on the distillation. Stabilizer circuits may also be used to verify the behavior of logical-level quantum circuit layouts. As another example, stabilizer circuits may be used to perform integrated testing and verification of components of a quantum software stack across layers.

SUMMARY

According to one aspect of the present disclosure, a computing system is provided, including a processor configured to receive a stabilizer circuit specification of a stabilizer circuit that includes one or more elementary operations. The one or more elementary operations are each selected from the group consisting of an allocation of one or more qubits in a stabilizer state, an allocation of one or more random classical bits, a Clifford unitary, a Pauli unitary conditional on one or more respective parities of one or more measurement outcomes and/or one or more respective parities of the one or more random classical bits, a joint multi-qubit Pauli measurement, and a destructive one-qubit Pauli measurement. The processor is further configured to compute a standardized stabilizer instrument specification of a stabilizer instrument based at least in part on the stabilizer circuit specification. The standardized stabilizer instrument specification includes an input Clifford unitary, an output Clifford unitary, and a plurality of bit matrices. The processor is further configured to store the standardized stabilizer instrument specification in memory.

According to another aspect of the present disclosure, a computing system is provided, including a processor configured to receive a standardized stabilizer instrument specification including an input Clifford unitary, an output Clifford unitary, and a plurality of stabilizer instrument bit matrices. The processor is further configured to receive a logical instrument input error correction code and a logical instrument output error correction code. The processor is further configured to compute a logical instrument specification based at least in part on the standardized stabilizer instrument specification, the logical instrument input error correction code, and the logical instrument output error correction code. The logical instrument specification includes a logical input Clifford unitary, a logical output Clifford unitary, a plurality of logical instrument bit matrices, and a logical instrument relabeling matrix. The processor is further configured to store the logical instrument specification in memory.

According to another aspect of the present disclosure, a computing system is provided, including a processor configured to receive a first stabilizer instrument specification of a first stabilizer instrument. The first stabilizer instrument specification includes a first input Clifford unitary, a first output Clifford unitary, and a plurality of first stabilizer instrument bit matrices. The processor is further configured to receive a second stabilizer instrument specification of a second stabilizer instrument. The second stabilizer instrument specification includes a second input Clifford unitary, a second output Clifford unitary, and a plurality of second stabilizer instrument bit matrices. Based at least in part on the first stabilizer instrument specification and the second stabilizer instrument specification, the processor is further configured to determine whether the first stabilizer instrument is equal to the second stabilizer instrument up to measurement outcome relabeling. The processor is further configured to output an indication of whether the first stabilizer instrument is equal to the second stabilizer instrument up to measurement outcome relabeling.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4B schematically shows a joint Pauli measurement stabilizer instrument, according to the example of FIG. 4A.

FIG. 7A shows a flowchart of a method for use with a computing system to compute a standardized stabilizer instrument specification, according to the example of FIG. 2A.

FIGS. 7B-7D show additional steps of the method of FIG. 7A that may be performed when computing the standardized stabilizer instrument specification.

FIG. 8A schematically shows the classical computing device when the processor is configured to compute a logical instrument specification corresponding to a standardized stabilizer instrument specification, according to the example of FIG. 2A.

FIG. 15A shows a flowchart of a method for use with a computing system to compute a logical instrument specification from a standardized stabilizer instrument specification, according to the example of FIG. 8A.

FIG. 15B shows additional steps of the method of FIG. 15A that may be performed in some examples when computing the logical instrument specification.

FIG. 15C shows additional steps of the method of FIG. 15B that may be performed in examples in which an input change-of-generators bit matrix and an output change-of-generators bit matrix are computed.

FIG. 18A shows a flowchart of a method for use with a computing system to determine whether a pair of stabilizer instruments are equal up to measurement outcome relabeling, according to the example of FIG. 16.

FIGS. 18B-18C show additional steps of the method of FIG. 18A that may be performed in some examples.

DETAILED DESCRIPTION

In order to facilitate the use of a stabilizer circuit at a quantum computing device, systems and methods for use with a quantum computing device including a stabilizer circuit are provided below. According to the systems and methods discussed below, a corresponding stabilizer instrument implemented by a stabilizer circuit may be determined. The systems and methods discussed below further allow a logical-level stabilizer instrument to be determined from a physical-level stabilizer instrument implemented at the stabilizer circuit. In addition, according to the systems and methods discussed below, a pair of stabilizer instruments may be checked for equality, and, in cases in which the stabilizer instruments are not equal, debugging information for the pair may be obtained.

Figure 1:
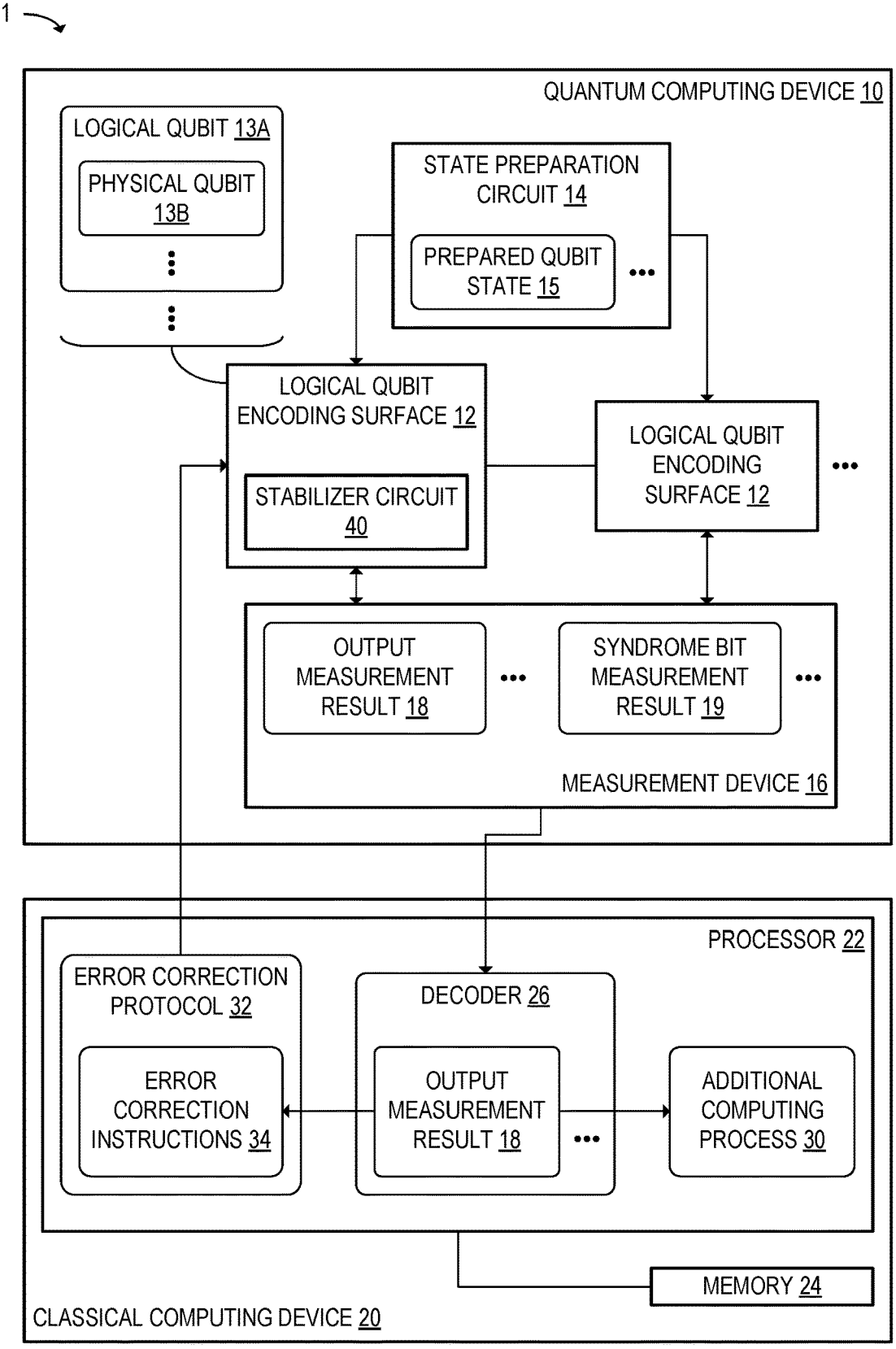
FIG. 1 schematically shows an example computing system 1 including a quantum computing device that is communicatively coupled to a classical computing device, according to one example embodiment.

FIG. 1 schematically shows an example computing system 1 including a quantum computing device 10 that is communicatively coupled to a classical computing device 20. The quantum computing device 10 may include one or more logical qubit encoding surfaces 12. The logical qubit encoding surface 12 is a portion of the quantum computing device 12 at which a measurement device 16 interfaces with one or more sets of physical qubits 13B that form one or more logical qubits. At each of the logical qubit encoding surfaces 12, the plurality of logical qubits 13A are configured to be encoded by corresponding arrays of the physical qubits 13B. Encoding the logical qubits 13A using arrays of physical qubits 13B may allow the logical qubits 13A to be instantiated in a fault-tolerant manner in which errors that occur at the logical qubit encoding surface 12 may be identified and corrected.

The quantum computing device 10 may further include a state preparation circuit 14 at which one or more prepared qubit states 15 may be generated as inputs to the one or more logical qubit encoding surfaces 12. For example, the state preparation circuit 14 may be configured to prepare a plurality of prepared qubit states 15 allow for universal quantum computation when subjected to Clifford operations. Additionally or alternatively, the prepared qubit states 15 may include other states such as a blank state of a qubit register.

The quantum computing device 10 may further include a measurement device 16 at which measurements may be performed on qubits included in the one or more logical qubit encoding surfaces 12. By performing measurements at the one or more logical qubit encoding surfaces 12, the quantum computing device 10 may be configured to perform quantum computations on the prepared qubit states 15 by applying logic gates. At the measurement device 16, the quantum computing device 10 may be configured to measure a plurality of output qubit states to obtain a plurality of output measurement results 18. The measurement device 16 may be further configured to transmit the plurality of output measurement results 18 to the classical computing device 20. The output measurement results 18 may, in some examples, include one or more syndrome bit measurement results 19 that may indicate one or more locations on the one or more logical qubit encoding surfaces 12 at which errors have occurred.

The quantum computing device 10 may include a stabilizer circuit 40 located on a corresponding logical qubit encoding surface 12. At the stabilizer circuit 40, measurements may be performed on a plurality of prepared qubit states 15 as discussed below to perform a verification operation on an output measurement result 18 of another quantum circuit. The quantum circuit for which the stabilizer circuit 40 is configured to perform the verification operation may be located at another logical qubit encoding surface 12 or the same logical qubit encoding surface 12. An output of the verification operation may be included in the output measurement results 18.

The classical computing device 20 may include a processor 22 that is communicatively coupled to memory 24. The processor 22 may include one or more physical processing devices, which may, for example, include one or more central processing units (CPUs), graphical processing units (GPUs), application-specific integrated circuits (ASICs), field-programmable gate arrays (FPGAs), specialized hardware accelerators, or other types of classical processing devices. The memory 24 may, for example, include one or more volatile memory devices and/or one or more non-volatile memory devices.

In some examples, the computing system 1 may be instantiated in a single physical computing device that includes both the quantum computing device 10 and the classical computing device 20. Alternatively, the computing system 1 may be provided as a plurality of communicatively coupled physical computing devices. In some examples, the functionality of the quantum computing device 10 and/or the classical computing device 20 may be divided between a plurality of interconnected physical computing devices, such as server computing devices located in a data center.

The processor 22 of the classical computing device 20 may be configured to implement a decoder 26 that is configured to receive the plurality of output measurement results 18 from the quantum computing device 10. At the decoder 26, the processor 22 may be configured to preprocess the output measurement results 18 into forms in which further classical computations may be performed on the output measurement results 18. The preprocessed measurements may subsequently be transmitted to one or more additional computing processes 30.

In examples in which the output measurement results 18 include one or more syndrome bit measurement results 19, the syndrome bit measurement results 19 may be preprocessed at the decoder 26 and input into an error correction protocol 32. At the error correction protocol 32, the processor 22 may be configured to generate error correction instructions 34 that may be transmitted to the quantum computing device 10 for execution at the one or more logical qubit encoding surfaces 12. Thus, errors that occur at the one or more logical qubit encoding surfaces 12 may be corrected.

Notation and terminology related to the stabilizer circuit 40 is now provided. The Pauli matrices are notated $\{I, X, Y, Z\}^{\otimes n}$, the Pauli operators are notated $\pm\{I, X, Y, Z\}^{\otimes n}$, and the Pauli unitaries are notated $i^k\{I, X, Y, Z\}^{\otimes n}$. The Pauli unitaries on n qubits form the Pauli group on n qubits, which is notated $\mathcal{P}_n$. A stabilizer group is a group of commuting Pauli operators other than $-I$. A stabilizer code is a sub-space of a Hilbert space that includes all vectors stabilized by a stabilizer group S. For any two Pauli unitaries P and Q, $[\![ P, Q ]\!]=0\in\mathbb{F}_2$ if P and Q commute and $[\![ P, Q ]\!]=1\in\mathbb{F}_2$ otherwise. For any subgroup G of a Pauli group, $G^\perp$ is defined as:

$$G^\perp=\{P\in\mathcal{P}_k\colon [\![ P,g ]\!]=0, \forall g\in G\}$$

Thus, $G^\perp$ includes all the members of the Pauli group that commute with each member of G. In the above definitions, $\mathbb{F}_2$ is the two-element finite field. The two-element finite field $\mathbb{F}_2$ has the elements $\{0,1\}$, and within the two-element finite field $\mathbb{F}_2$, addition and multiplication are performed modulo 2. Thus, matrices over $\mathbb{F}_2$ are matrices with elements that are each included in $\mathbb{F}_2$.

A quantum instrument with a set of outcomes R is defined as including $|R|$ completely positive non-zero maps $\{\mathcal{Q}_r : r\in R\}$, where $\Sigma_{r\in R}\mathcal{Q}_r$ is a trace-preserving map. The quantum instrument maps a density matrix $\rho$ to a joint quantum-classical state $\{r, \rho_r\}$, where $p_r=\mathrm{Tr}(\mathcal{Q}_r[\rho])$ is the probability of observing outcome r, and $\rho_r=\mathcal{Q}_r[\rho]/p_r$ is the output state conditional on observing the outcome r.

Equality of a pair of quantum instruments may be defined according to the following definitions, in order of decreasing strictness:

Strict quantum instrument equality: two quantum instruments with sets of outcomes R and R' and completely positive maps $\{\mathcal{Q}_r : r\in R\}$, $\{\mathcal{Q}'_r : r\in R'\}$ are strictly equal when R=R' and when for all $r\in R$, $\mathcal{Q}_r=\mathcal{Q}'_r$.

Quantum instrument equality with relabeling: two quantum instruments with sets of outcomes R and R' and completely positive maps $\{\mathcal{Q}_r : r\in R\}$, $\{\mathcal{Q}'_r : r\in R'\}$ are equal up to relabeling when $|R|=|R'|$ and there exists a bijection $f:R\to R'$, called outcome relabeling, such that for all $r\in R$, $\mathcal{Q}_r=\mathcal{Q}'_{f}(r)$.

Two completely positive maps $\mathcal{Q}$, $\mathcal{Q}'$ are scalar equivalent, denoted as $\simeq$, if there exists a positive scalar $\alpha$ such that $\mathcal{Q}=\alpha\mathcal{Q}'$. For any set $\mathcal{S}$ of completely positive maps, define $\mathcal{S}/\simeq$ to be a set of equivalence classes with respect to $\simeq$. With these definitions, quantum instrument class equality is defined as follows. Two quantum instruments with sets of outcomes R and R' and completely positive maps $S = \{Q_r : r \in R\}$, $S' = \{Q_r : r \in R'\}$ are class-equal when $S / \simeq = S' / \simeq$.

Choi-Jamiolkowski isomorphism for quantum instruments is now discussed. Given a quantum instrument with a set of outcomes R and completely positive maps $\{Q_r : r \in R\}$, the corresponding family of Choi matrices is $\{(Q_r \otimes J)(\rho_{Bell}) : r \in R\}$. When $Q_r$ maps density matrices on $k_{in}$ qubits to density matrices on $k_{out}$ qubits, the Bell density matrix is given by:

$$\rho_{Bell} = \sum_{k,j \in \{0,1\}^{k_{in}}} |k\rangle \otimes \langle j| \bigotimes |k\rangle\langle j| \text{ and}$$

$$(Q_r \otimes J)(\rho_{Bell}) = \sum_{k,j \in \{0,1\}^{k_{in}}} Q_r(|k\rangle\langle j|) \otimes |k\rangle\langle j|$$

When $Q_r$ is specified using linear operators $Q_r$ as $Q_r(\rho) = Q_r \rho Q_r^\dagger$, the Choi matrices correspond to normalized pure states. Thus, the Choi states of a quantum instrument may be defined as follows in such examples:

$$|Bell\rangle = \sum_{k \in \{0,1\}^{k_{in}}} |k\rangle \otimes |k\rangle \text{ and}$$

$$(Q_r \otimes I)|Bell\rangle = \sum_k Q_r |k\rangle \otimes |k\rangle$$

The Choi matrix of a linear map on space of matrices is positive semi-definite if and only if the map is completely positive. In addition, completely positive maps are equal if and only if corresponding Choi matrices or Choi states are equal. Thus, the equality of quantum instruments may be checked by checking the equality (with or without relabeling) of the corresponding Choi matrices or Choi states, up to a global phase.

A quantum error correcting code on n qubits and with k logical qubits may be specified by an n-qubit Clifford unitary C. Clifford unitaries are members of the Clifford group, which is defined as the group $\mathcal{C}_n$ of unitaries that normalize the Pauli group:

$$\mathcal{C}_n = \{V \in U_{2^n} | V \mathcal{P}_n V^\dagger = \mathcal{P}_n\}$$

The Clifford group may be generated using Hadamard gates, S gates, and CNOT gates. When the quantum error correcting code has generators $CZ_1C^\dagger \ldots CZ_{n-k}C^\dagger$, then $CZ_{n-k+1}C^\dagger \ldots CZ_nC^\dagger$ represent logical Z operators for qubits 1, ... k and $CX_{n-k+1}C^\dagger \ldots CX_nC^\dagger$ represent logical X operators for qubits 1, . . . , k. The Clifford unitary C is referred to as an encoding unitary of the error correcting code. In addition, the code $[\![ n, k, C ]\!]$ is a subset of the code $[\![ n, k', C' ]\!]$ if the stabilizer group of $[\![ n, k', C' ]\!]$ is a subgroup of $[\![ n, k, C ]\!]$.

The two-qubit Bell state is stabilized by $X \otimes X$, $-Y \otimes Y$, $Z \otimes Z$. Using the notation $Y^* = -Y$ for element-wise complex conjugation of a matrix, the stabilizers of Bell n are $P^* \otimes P = P \otimes P^*$ for $P \in \{I, X, Y, Z\}^{\otimes n}$.

A quantum instrument is a stabilizer instrument if it is equal to an instrument that has a set of outcomes $\mathbb{F}_2^r$, has completely positive maps $Q_r(\rho) = Q_r \rho Q_r^\dagger$, and has a Choi state of $Q_r$ that is a stabilizer state proportional to C|Fr⟩ for some Clifford unitary C and matrix F over $\mathbb{F}_2$. Any of the quantum instrument equality definitions may be used in the definition of the stabilizer instrument. The stabilizer instrument is the most general quantum instrument that may be implemented by a stabilizer operation with Pauli unitaries, conditional on parities of measurement outcomes.

Figure 2A:
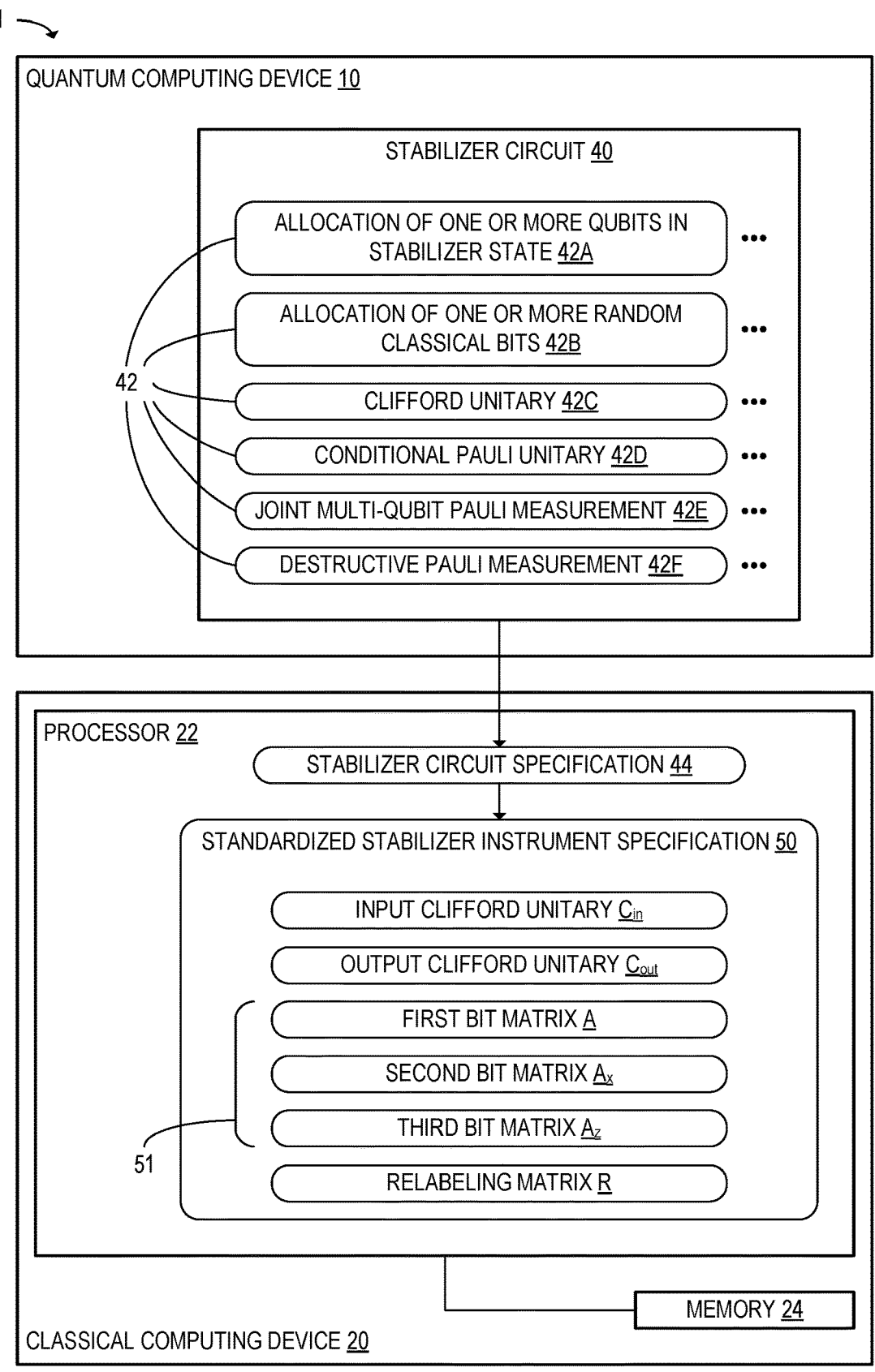
FIG. 2A schematically shows the computing system when a processor computes a standardized stabilizer instrument specification based at least in part on a stabilizer circuit, according to the example of FIG. 1.

FIG. 2A schematically shows the stabilizer circuit 40 in additional detail. A stabilizer circuit 40 is a quantum circuit that is constructed from one or more elementary operations 42. The one or more elementary operations 42 are each selected from the group consisting of:
    1. An allocation of one or more qubits in a stabilizer state (42A). For example, the stabilizer state may be a zero state.
    2. An allocation of one or more random classical bits distributed as fair coin-flips (42B).
    3. A Clifford unitary 42C. The Clifford unitary 42C may, for example, be a Pauli unitary.
    4. A conditional Pauli unitary 42D. The conditional Pauli unitary 42D may be conditional on one or more respective parities of one or more measurement outcomes and/or one or more respective parities of the one or more random classical bits.
    5. A joint multi-qubit Pauli measurement 42E.
    6. A destructive one-qubit Pauli measurement 42F.

The stabilizer circuit 40 starts with a set of input qubits that are in an arbitrary state. The qubits that remain after executing the stabilizer circuit 40 are output qubits. Due to the inclusion of destructive qubit measurement, there may be fewer output qubits than the number of input qubits of the stabilizer circuit 40. The allocations of classical bits distributed as fair coin-flips may, in some examples, be implemented with destructive X measurements applied to a qubit initialized in a zero state. However, when considering algorithms that manipulate stabilizer circuits, it is typically more efficient to treat classical bits separately. The classical bits may, for example, be used to add Pauli errors to a stabilizer circuit 40. In such examples, the behavior of the stabilizer circuit 40 conditional on the Pauli error is the behavior conditional on random bits equal to a bitstring describing the Pauli error.

As depicted in FIG. 2A, the processor 22 is configured to receive a stabilizer circuit specification 44 of the stabilizer circuit 40. The stabilizer circuit specification 44 may encode the stabilizer circuit 40 in terms of the elementary operations 42. The processor 22 is further configured to compute a standardized stabilizer instrument specification 50 of a stabilizer instrument based at least in part on the stabilizer circuit specification 44, as discussed in further detail below.

Figure 2B:
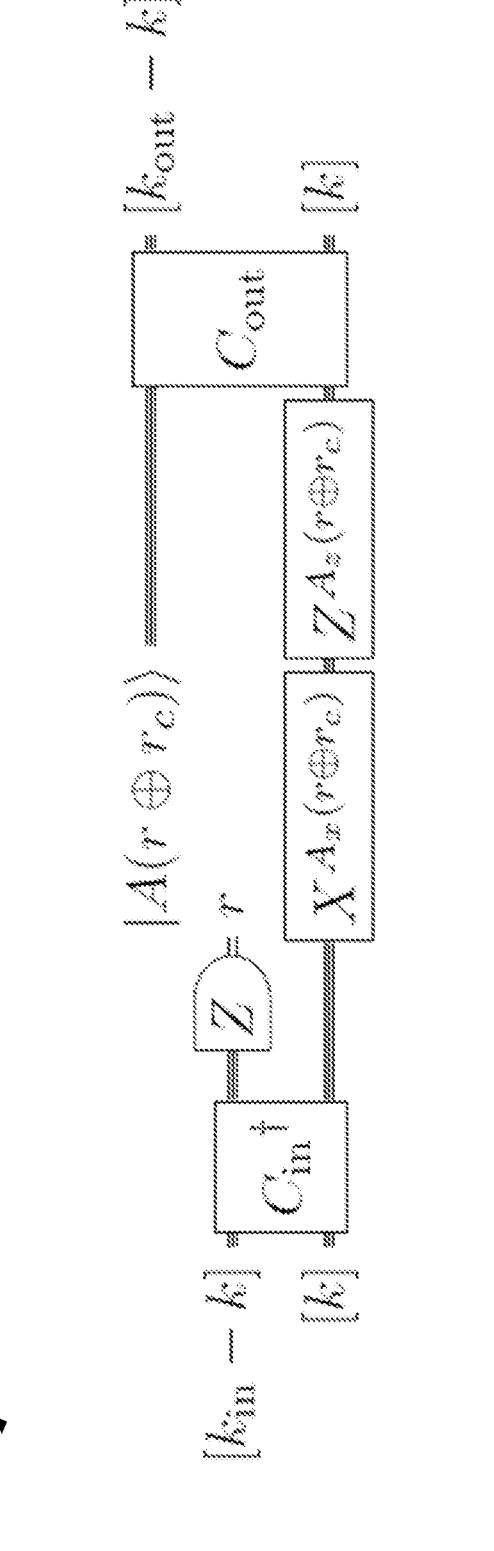
FIG. 2B schematically shows the standardized stabilizer instrument specification computed for the stabilizer circuit, according to the example of FIG. 2A.

Two distinct stabilizer circuits 40 may have the same behavior. FIG. 2B schematically shows a standardized stabilizer instrument specification 50 computed for the stabilizer circuit 40. The stabilizer instrument encoded by the standardized stabilizer instrument specification 50 satisfies the definition of a stabilizer instrument provided above for some Clifford unitary C, some matrix F, and some Choi state $Q_r$. By rewriting the stabilizer circuit 40 as the standardized stabilizer instrument specification 50 shown in FIGS. 2A-2B, the processor 22 may be configured to check whether a pair of stabilizer circuits 40 have equivalent behavior, as discussed in further detail below. Given a stabilizer circuit 40, a corresponding standardized stabilizer instrument specification 50 may be computed. The measurement outcomes of the original stabilizer circuit 40 are related to the measurement outcomes of the stabilizer instrument by an invertible affine function. The standardized stabilizer instrument specification 50 is a data structure that encodes a stabilizer instrument implemented by the stabilizer circuit 40.

In the example of in FIGS. 2A-2B, the standardized stabilizer instrument specification 50 is computed for a stabilizer circuit 40 that has $k_{in}$ input qubits and $k_{out}$ output qubits. In addition, the stabilizer circuit 40 is configured to receive $k_r$ random classical bits. The standardized stabilizer instrument specification 50 includes an input Clifford unitary $C_{in}$ and an output Clifford unitary $C_{out}$. The standardized stabilizer instrument specification 50 further includes a plurality of bit matrices 51, including a first bit matrix A, a second bit matrix $A_x$, and a third bit matrix $A_z$. The Clifford unitaries $C_{in}$ and $C_{out}$ respectively act on $k_{in}$ and $k_{out}$ qubits. The bit matrices 51 in FIGS. 2A-2B are matrices over $\mathbb{F}_2$ and $r_c$ is a $k_r$-dimensional random vector over $\mathbb{F}_2$. r is an observed outcome of a Z measurement, and l is the dimension of $r \oplus r_c$ such that $l=k_{in}-k+k_r$. The first bit matrix A has dimensions $(k_{out}-k) \times l$ and the second and third bit matrices $A_x$ and $A_z$ have dimensions $k \times l$. The superscripts of the X and Z Pauli gates depicted in FIG. 2B indicate the qubits to which those Pauli gates are applied. In some examples, as shown in FIG. 2A, the standardized stabilizer instrument specification 50 may further include an $l \times l$ relabeling matrix R.

Figure 3:
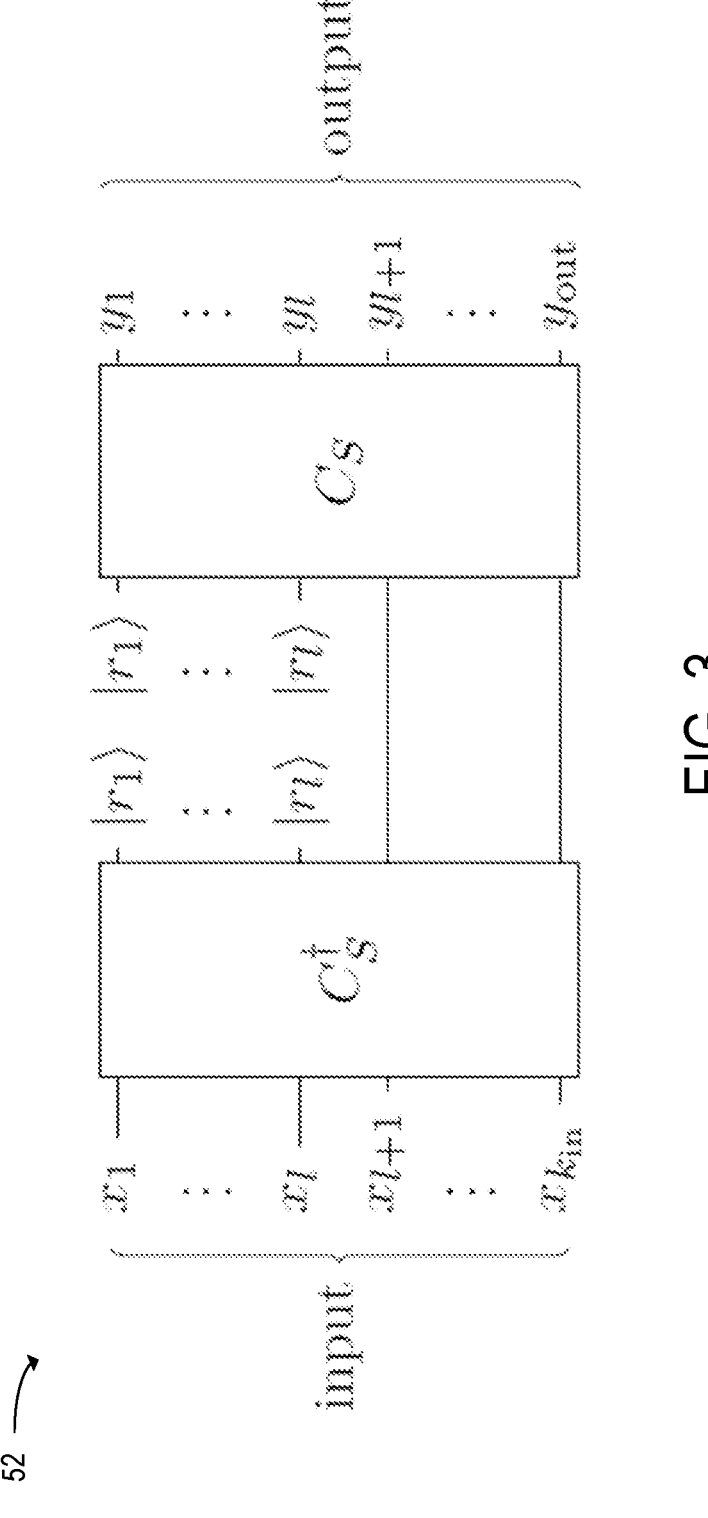
FIG. 3 schematically shows a zero-operation standardized stabilizer instrument specification, according to the example of FIG. 2A.

In an example where the stabilizer circuit 40 is an identity circuit that includes zero elementary operations and where no stabilizer group of the inputs to the stabilizer circuit 40 is specified, the standardized stabilizer instrument specification 50 is trivial. In an example where the stabilizer circuit 40 includes zero elementary operations and has a non-trivial stabilizer group S (a stabilizer group not equal to the identity), the standardized stabilizer instrument specification 50 is the zero-operation stabilizer instrument specification 52 shown in FIG. 3. The example zero-operation stabilizer instrument specification 52 of FIG. 3 has trivial action on input states stabilized by S. The stabilizer group S has l generators and has an encoding Clifford unitary $C_S$. In the example of FIG. 3, the encoding Clifford unitary $C_S$ has the property $C \langle Z_1, \ldots, Z_l \rangle C^\dagger = S$. The numbers of input and output bits of the zero-operation stabilizer instrument specification 52 are equal, so $k_{in}=k_{out}$. The matrix A is a zero matrix in the example of FIG. 3, and the Pauli correction function $P^r$ of the zero-operation stabilizer instrument specification 52 is trivial.

Figure 4A:
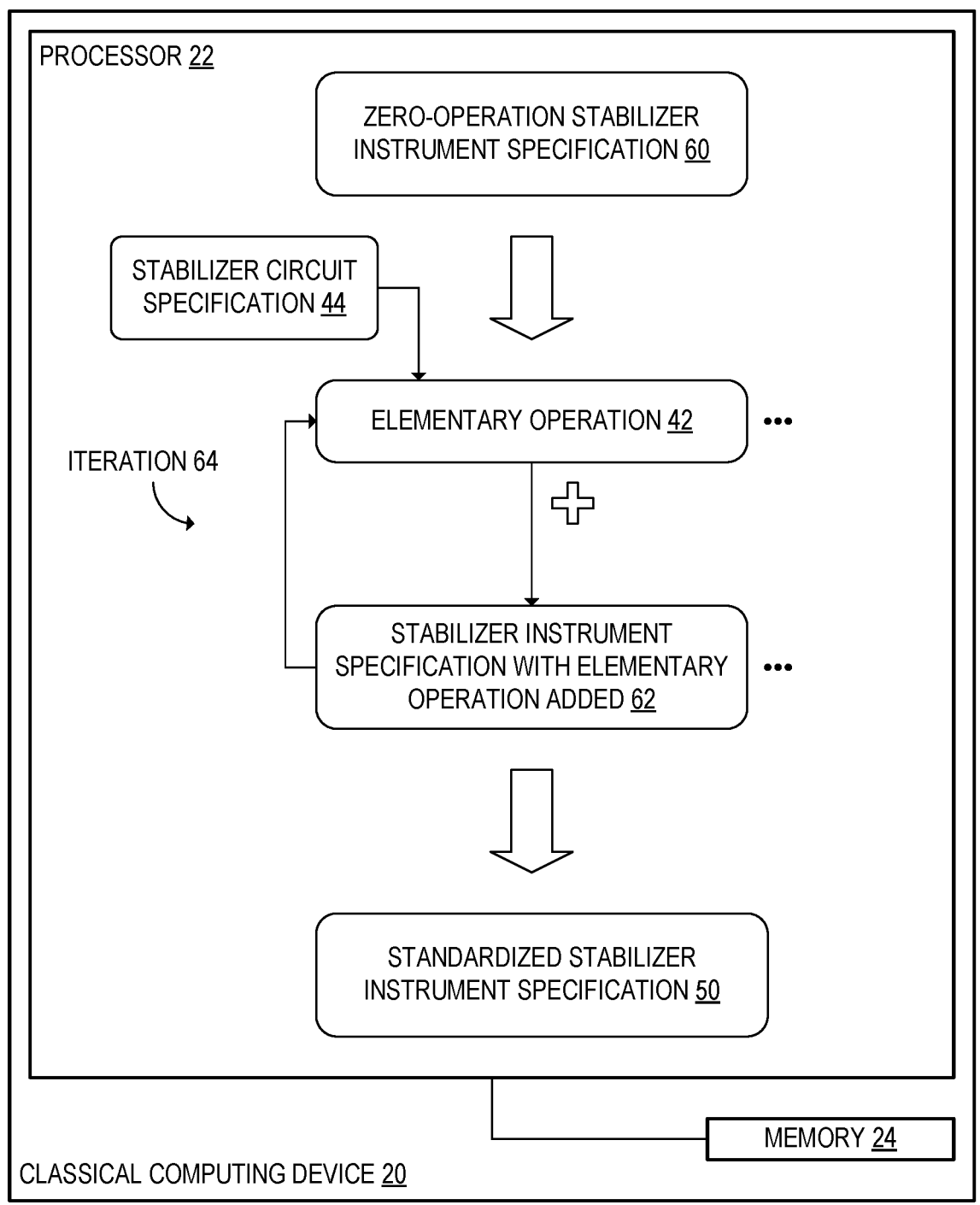
FIG. 4A schematically shows the classical computing device when the processor inductively constructs the standardized stabilizer instrument specification from a stabilizer circuit specification, according to the example of FIG. 2A.

Starting from the general form of the zero-operation stabilizer instrument specification 52 shown in the example of FIG. 3, corresponding standardized stabilizer instrument specifications 50 of larger stabilizer circuits 40 may be inductively constructed. FIG. 4A schematically shows the classical computing device 20 when the processor 22 inductively constructs the standardized stabilizer instrument specification 50 from a stabilizer circuit specification 44 in this manner. According to the example of FIG. 4A, the processor 22 is configured to compute the standardized stabilizer instrument specification 50 at least in part by iteratively incorporating the elementary operations 42 included in the stabilizer circuit specification 44 into the standardized stabilizer instrument specification 50, starting from a zero-operation stabilizer instrument specification 60. In each of a plurality of iterations 64, the processor 12 is configured to incorporate an elementary operation 42 indicated in the stabilizer circuit specification 44 into the stabilizer instrument specification to thereby generate a stabilizer instrument specification with the elementary operation added 62. When each elementary operation 42 included in the stabilizer circuit specification 44 has been incorporated, the resulting stabilizer instrument specification is the standardized stabilizer instrument specification 50.

The steps of iteratively constructing the standardized stabilizer instrument specification 50 are now provided in further detail. Given a stabilizer circuit 40 that includes K elementary operations 42 and is expressible as a standardized stabilizer instrument specification 50, a stabilizer circuit 40 that includes K+1 elementary operations is also expressible as a corresponding standardized stabilizer instrument specification 50. The last operation included in the stabilizer circuit 40 that has K+1 elementary operations is one of (A) a Clifford unitary 42C, (B) an allocation of one or more ancilla qubits in a stabilizer state 42B, (C) a joint multi-qubit Pauli measurement 42E, (D) a destructive one-qubit Pauli measurement 42F, or (E) a Pauli correction conditional on the parity of a set of measurement outcomes 42D. In each of the above cases, the standardized stabilizer instrument specification 50 of the stabilizer circuit 40 that includes K elementary operations may be converted into the standardized stabilizer instrument specification 50 of the stabilizer circuit 40 that includes K+1 elementary operations.

(A): When the last operation of the K+1-operation stabilizer circuit 40 is a Clifford unitary $C_0$, set $C_{out}:=C_0 C_{out}$.

(B) When the last operation of the K+1-operation stabilizer circuit 40 is an ancilla allocation with the ancilla initialized to a stabilizer state (e.g., a zero state), increase $k_{out}$ by 1, set $C_{out}:=I \otimes C_{out}$, and append a zero row to the start of the matrix A.

(C) When the last operation of the K+1-operation stabilizer circuit 40 is a multi-qubit Pauli measurement P, measuring P is equivalent to measuring $$P' = C_{out}^\dagger P C_{out}$$

prior to measuring $C_{out}$. Define T to be the group generated by $Z_1, \ldots, Z_{k_{out}-k}$. In examples in which $P \in T^\perp$, there exists a column vector $b=b_1, \ldots, b_{k_{out}-k}$ over $\mathbb{F}_2$ such that $$P' = Z^{b_1} \otimes \ldots \otimes Z^{b_{k_{out}-k}} \otimes P''$$

(C1a) In examples in which $P''=(-1)^c I$ for $c \in \mathbb{F}_2$, the measurement outcome is deterministic and is equal to $c \oplus b^T A r$. The new measurement outcome is an affine function of r. The map between r and the circuit measurement outcomes is invertible, since r may be computed from the previous measurement outcomes by induction.

(C1b) In examples in which P'' is not proportional to the identity, measuring P'' after applying the Pauli correction $P^r$ is equivalent to measuring $(-1)^{[P^r,P'']}P''$ before applying $P^r$. The Pauli correction $P^r$ is given by $P^r=X^{A_x(r \oplus r_c)}Z^{A_z(r \oplus r_c)}$. The measurement of $(-1)^{[P^r,P'']}P''$ is equivalent to measuring P'' with outcome r' and returning the outcome $r' \otimes [\![ P^r, P'' ]\!]$. The part of the stabilizer circuit 40 that measures P'' may be replaced with a circuit having the form of the joint Pauli measurement stabilizer instrument 54 shown in FIG. 4B. In the joint Pauli measurement stabilizer instrument 54, the Clifford unitary C may be any Clifford unitary for which $CZ_1 C^\dagger=P$. The numbers of input and output qubits are equal. The joint Pauli measurement stabilizer instrument 54 is a special case of the standardized stabilizer instrument specification 50 in which $k=k_{in}-1$, the matrix A is a $1 \times 1$ identity matrix, and the Pauli correction function $P^r$ is trivial. The measurement of P'' in the standardized stabilizer instrument specification 50 may be replaced with the joint Pauli measurement stabilizer instrument 54 using a Clifford unitary $C_0$ such that $$P'' = C_0 Z_k C_0^\dagger.$$

When converting the stabilizer circuit specification 44 into the standardized stabilizer instrument specification 50, the correction $P^r$ may also be moved past $C_0$ by setting $P^r:=P^r (P')^{c^T r}$. Converting the stabilizer circuit specification 44 into the standardized stabilizer instrument specification 50 further includes setting k:=k−1 and setting $$C_{in}^\dagger := C_{in}^\dagger C_0^\dagger.$$

A new outcome bit r' is appended to the beginning of the outcome vector r, and the affine outcome function is updated. Since r' and the current circuit measurement outcome are related to each other by an affine invertible function, the function relating the circuit measurement outcomes and the vector r remains invertible. Converting the stabilizer circuit specification 44 into the standardized stabilizer instrument specification 50 further includes setting $C_{out}:=C_{out}\tilde{C}_0$, where $\tilde{C}_0$ is a version of $C_0$ with permuted inputs and outputs such that the last input becomes the first input, and the ordering of the other inputs is preserved. $\tilde{C}_0$ is also extended to act on $k_{out}$ qubits. Converting the stabilizer circuit specification 44 into the standardized stabilizer instrument specification 50 further includes setting $A:=I\otimes A$, where I is the 1×1 identity matrix over $\mathbb{F}_2$. Thus, by performing the above transformations, the K+1-operation stabilizer circuit specification 44 may be converted into the standardized stabilizer instrument specification 50.

(C2) In examples in which P does not belong to $T^\perp$, P anti-commutes with one of $Z_j$ for j=1, . . . , $k_{out}$−k. Thus, in such examples, measuring P' produces an outcome 0 or 1 with a probability of ½ for each. Converting the stabilizer circuit specification 44 into the standardized stabilizer instrument specification 50 further includes adding an additional classical random bit to the general form such that m:=m+1. Since $r_m$ and the current circuit measurement outcome are related to each other by an affine invertible function, the function relating the circuit measurement outcomes and the vector r remains invertible. Given the measurement outcome $r_m$, the projector $(I+(-1)^{r_m}P')/\sqrt{2}$ may be applied to each of the currently available qubits. Alternatively, the unitary $(I+(-1)^{r_m a_j(r)}P'Z_j)/\sqrt{2}$ may be applied. In the above expression for the unitary, $a_j(r)$ is the jth element of a vector $a=A(r\oplus r_c)$. The unitaries $(I\pm P'Z_j)/\sqrt{2}$ differ by a Pauli correction $iP'Z_j$. The conditional Pauli operator $(iP'Z_j)^{r_m + a_j(r)}$ may be reduced to act only on qubits $x_1, . . . , x_k$ by updating the matrix A to $A:=A+rc^T$, where c is a column vector over $\mathbb{F}_2$ as discussed above. In addition, converting the stabilizer circuit specification 44 into the standardized stabilizer instrument specification 50 may further include setting $C_{out}:=((I+P'Z_j)/\sqrt{2})C_{out}$. Thus, by performing the above transformations, the K+1-operation stabilizer circuit specification 44 may be converted into the corresponding standardized stabilizer instrument specification 50.

(D) When the last operation of the K+1-operation stabilizer circuit 40 is a destructive one-qubit Pauli measurement, converting the K+1-operation stabilizer circuit specification 44 into the standardized stabilizer instrument specification

50 may include updating $C_{out}$ such that the measurement is performed on a chosen qubit in the Z basis. The destructive measurement may include three steps:
 1. Measuring a qubit in the Z basis,
 2. Applying a Pauli X gate if the measurement outcome is 1, and
 3. Removing the resulting qubit, which is always in the 0 state.

After the first two steps, the Clifford operation may be converted into a general form. When an output qubit of a Clifford operation is always equal to zero, that qubit may be removed, and the remaining stabilizer circuit specification 44 may be converted into the standardized stabilizer instrument specification 50.

(E) When the last operation of the K+1-operation stabilizer circuit 40 is a Pauli correction conditional on the parity of a set of measurement outcomes, converting the stabilizer circuit specification 44 into the standardized stabilizer instrument specification 50 may include setting the matrix A to $A:=A+rc^T$, where c is a column vector over $\mathbb{F}_2$. In this update, the Pauli correction P is applied when $c^T r=1$ or 0, where the outcome vector r is a column vector. The measurement outcomes of the stabilizer circuit 40 are related to r by an invertible affine function. The case in which P is applied conditionally on $c^T r=0$ may be reduced to the case in which P is applied conditionally on $c^T r=1$ by first applying P unconditionally. Applying P after $C_{out}$ is equivalent to applying $$P' = C_{out}^\dagger P C_{out}$$

prior to applying $C_{out}$. The first $k_{out}$−k qubits to which P' is applied are in the computational basis, so applying P' to these first qubits is equivalent to applying $$X^{b_1} \otimes \ldots \otimes X^{b_{k_{out}-k}}$$

for the column vector b discussed above. Converting the stabilizer circuit specification 44 into the standardized stabilizer instrument specification 50 may further include modifying the Pauli correction function as $P^r:=P^r(P')^{c^T r}$. The K+1-operation stabilizer circuit specification may accordingly be converted into the standardized stabilizer instrument specification 50.

By iteratively performing the above transformations on the stabilizer circuit specification 44, the standardized stabilizer instrument specification 50 depicted in FIGS. 2A-2B may be generated from the stabilizer circuit specification 44. The general form may encode the stabilizer instrument corresponding to the stabilizer circuit 40 in a compact manner within memory 24. In addition, the standardized stabilizer instrument specification 50 may be computed in polynomial time in the circuit length and the number of qubits used.

As discussed below, vectors over $\mathbb{F}_2$ may be mapped to stabilizer states on n qubits. These maps each correspond to a stabilizer state followed by a Pauli correction applied conditionally on random classical bits distributed as fair coin-flips. In addition, any state prepared by a stabilizer circuit 40 may be described with such a map, which may be computed in polynomial time as a function of circuit length. A redundant description of the state may be used to increase the efficiency of an algorithm for converting a stabilizer circuit 40 that prepares the state into the standardized stabilizer instrument specification 50. The following notation is used below:

$$X^x = X^{x_1} \otimes \ldots \otimes X^{x_n}$$

$$Z^x = Z^{z_1} \otimes \ldots \otimes Z^{z_n}$$

In addition, $w(x)$ is used to indicate the weight of a bitstring x, which is the number of entries of the bitstring x that are equal to 1. $x \wedge z$ is used to indicate the bitwise AND of bitstrings x and z, and $x+z$ is used to indicate the bitwise XOR. Computational complexity expressions for the algorithms discussed below also assume that matrices over $\mathbb{F}_2$ are stored in row-major form.

Figure 5:
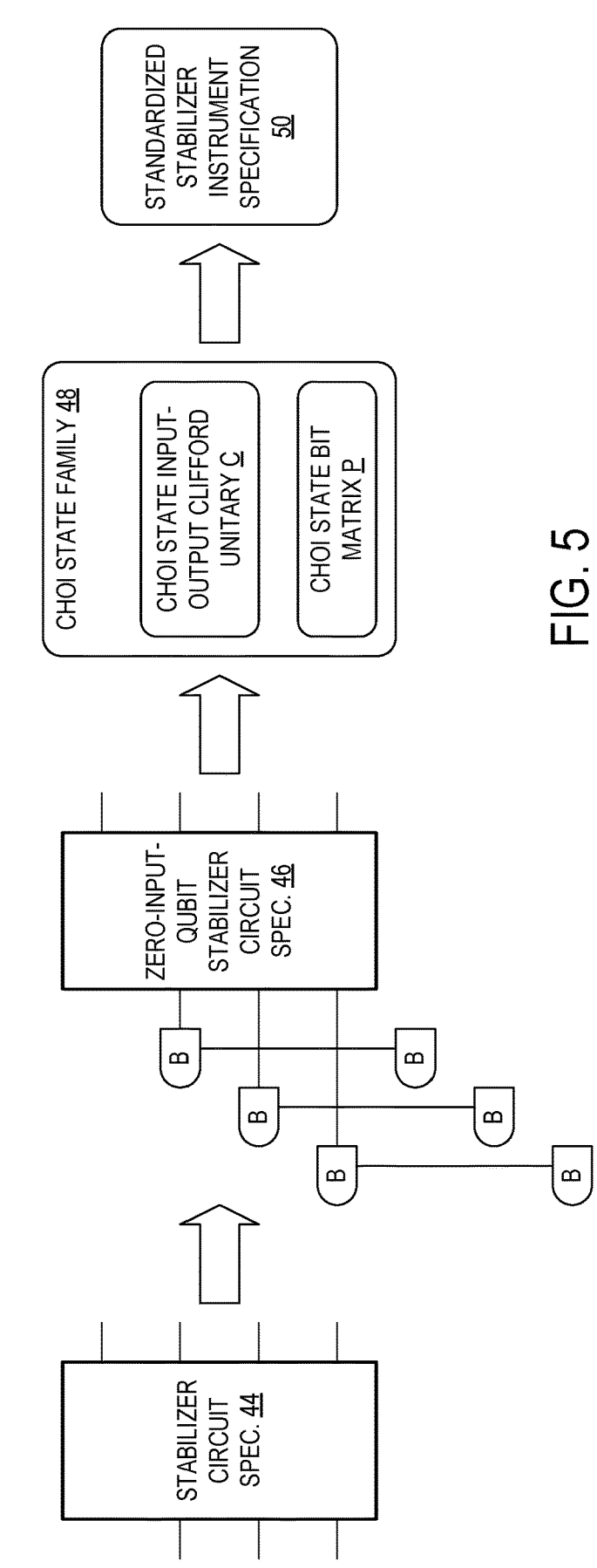
FIG. 5 schematically shows a Choi-state-based stabilizer instrument algorithm with which the processor may be configured to compute the standardized stabilizer instrument specification, according to the example of FIG. 2A.

A Choi-state-based stabilizer instrument algorithm 56 is provided below, as schematically shown in the example of FIG. 5. The Choi-state-based stabilizer instrument algorithm 56 may be used to compute the standardized stabilizer instrument specification 50 shown in FIGS. 2A-2B, as an alternative to the iterative algorithm discussed above. When the Choi-state-based stabilizer instrument algorithm 56 is performed, the processor 22 is configured to compute the standardized stabilizer instrument specification 50 at least in part by computing a Choi state family 48 of the stabilizer instrument. In addition, the processor 22 is further configured to compute the standardized stabilizer instrument specification 50 based at least in part on the Choi state family 48. In some examples, the Choi-state-based stabilizer instrument algorithm may be performed more efficiently than using the iterative algorithm of FIGS. 4A-4B.

The processor 22 may be configured to compute the Choi state family 48 as follows. When the Choi-state-based stabilizer instrument algorithm 56 is performed, the processor 22 may be configured to compute a zero-input-qubit stabilizer circuit specification 46 based at least in part on the stabilizer circuit specification 44 and compute the Choi state family 48 as the Choi state family of the zero-input-qubit stabilizer circuit specification 46. The zero-input-qubit stabilizer circuit specification 46 may, for example, be computed at least in part by coupling each of one or more input qubits of the stabilizer circuit specification 44 to a respective Bell pair, as shown in the example of FIG. 5.

Using the Choi-state-based stabilizer instrument algorithm 56, given the zero-input-qubit stabilizer circuit specification 46, the following properties of the standardized stabilizer instrument specification 50 of the stabilizer circuit 40 may be computed:

1. n, the number of qubits included in the output of the stabilizer circuit 40.
2. $n_r$, the number of random bits used in the description of the circuit output.
3. $n_O$, the total number of outcomes (classical random bits and measurement outcomes) used in the stabilizer circuit 40.
4. C, an n-qubit Clifford stored as a $(2n+2) \times (2n+2)$ matrix.
5. Prob, an array of probabilities that has entries $\{1/2, 1\}$ and length $n_O$.
6. $\mathcal{P}$, an $n \times n_r$ matrix over $\mathbb{F}_2$ stored in row-major form.
7. B, an $n_O \times (n_r+1)$ matrix over $\mathbb{F}_2$ stored in row-major form.

The properties listed above uniquely specify the standardized stabilizer instrument specification 50. Thus, the stabilizer circuit property determination algorithm computes the standardized stabilizer instrument specification 50.

In addition, conditional on random bit values (including the classical random bits and random measurement outcomes) given by the vector r over $\mathbb{F}_2$, the following properties hold:

1. The output state of the stabilizer circuit 40 is $CX^{\mathcal{P}r}|0\rangle^{\otimes n} = C|\mathcal{P}r\rangle$.
2. The vector of outcomes is $L_O = B(1 \oplus r)$, where $\oplus$ indicates concatenation.
3. The conditional probabilities of the outcomes are given by the array Prob, and the joint probability of the outcome $L_O$ is $P_O = \Pi_{p \in Prob} p$.

Thus, C is a Choi state input-output Clifford unitary and $\mathcal{P}$ is a Choi state bit matrix, and C and $\mathcal{P}$ parametrize the Choi state family 48 of the stabilizer circuit 40.

In the Choi-state-based stabilizer instrument algorithm 56, the description of the Choi state input-output Clifford unitary C is initialized as the empty description. In addition, $\mathcal{P}$ and B are initialized as empty matrices. For each gate G in the stabilizer circuit 40, the following respective steps are performed in the following cases:

When G is a qubit allocation, replace C with $C \otimes I$ and adding a zero row to $\mathcal{P}$. This step has a time complexity of $O(|C|^2 + cols(\mathcal{P}))$.

When G is an allocation of a classical random bit distributed as a fair coin-flip, add zero columns to $\mathcal{P}$ and B, add a zero row to B, set the last bit of the added row of B to 1, and append ½ to Prob. This step has a time complexity of $O(cols(\mathcal{P})(|C|+rows(B)))$.

When G is a Clifford unitary $\tilde{C}$ acting on qubits from an ordered set K, replace C with $\tilde{C}_{[K]}C$ using a compose operation, where $\tilde{C}_{[K]}$ is the Clifford unitary $\tilde{C}$ acting on qubits indexed by K. This step has a time complexity of $O(|C| \cdot |K|^2)$.

When G is a special Clifford unitary $\tilde{C}$ written as P, as $e^{i\pi P/4}$, or $\Lambda(P, P')$ for Pauli operators, P, P' acting on qubits indexed by K, replace C with $\tilde{C}'C$ using an exponential compose operation, a controlled Pauli compose operation, and a Pauli compose operation. In the above expression for G, $\Lambda(P, P')$ is defined as:

$$\Lambda(P, P') = \frac{I+P}{2} + \frac{I-P}{2} \cdot P'$$

for P, P' that commute with each other. This step has a time complexity of $O(|C| \cdot |K|)$.

In examples in which G is a Pauli unitary P supported on k qubits and conditional on the parity b of the random bits r, the random bits r are masked by a bitstring c, which is conditional on $\langle c, r \rangle = b$. When b=0, replace C with PC using a Pauli compose operation. Then compute $\tilde{P} = C^\dagger PC$ using a preimage operation. For $j \in [n]$, when $x(\tilde{P})_j = 1$, update row j of $\mathcal{P}$ by setting $\mathcal{P}_j := \mathcal{P}_j + c$. The total time complexity of these steps is given by $O(cols(\mathcal{P})|C|+k|C|)$.

G may be a Pauli unitary P supported on k qubits and conditional on the parity b of classical bits and measurement outcomes given by the list of indices L. The classical bits and measurement outcomes may, for example, be indexed according to their order of occurrence in the stabilizer circuit 40. In examples in which G has the above properties, s may be defined as a bitstring equal to the parity of rows B indexed by L. In addition, J may be defined as a list of non-zero indices of s excluding 1. P may be applied conditionally on the parity of $b+s_1$ random bits from J. The total time complexity of these steps is given by $O(cols(\mathcal{P})|C|+k|C|)$.

In some examples, G may be a joint measurement of a Pauli operator P supported on k qubits. The state of the k qubits may be stabilized by the operator $\pm P'$ supported on k' qubits such that $[\![ P', P ]\!] = 1$. In such examples, set $\tilde{P}' = C^\dagger P'C$. Subsequently to setting $\tilde{P}'$, assert $\tilde{P}' = \pm Z_a$ so that the state $C|0\rangle^{\otimes n}$ is stabilized by $\pm P'$. When $\tilde{P}' = -z^a$, set $P'$ to $-P'$ so that the state is stabilized by $P'$. In addition, define $Q = (-i) \cdot PP'$ and replace C with $$e^{i\frac{\pi}{4}Q}C$$

using an exponential compose operation. Define $c = \mathcal{P}^T a$, where c is a bitwise parity of a set of rows of $\mathcal{P}$. Then allocate a random classical bit and apply $P'$ conditional on cell $c \oplus 1$. The total runtime complexity of the above steps is given by $O(|C|(k=k') + \text{cols}(\mathcal{P}) \cdot |C| + \text{cols}(\mathcal{P})(|C| + \text{rows}(B)))$.

In some examples, G may be a joint measurement of a Pauli operator P supported on k qubits. In such examples, compute $\tilde{P} = C^\dagger PC$ using the preimage operation. When $x(\tilde{P}) = 0$, the measurement outcome is deterministic. In examples in which $x(\tilde{P}) = 0$, when $s(\tilde{P}) = 2$, set b to 1, and otherwise set b to 0. In addition, in examples in which $x(\tilde{P}) = 0$, add a row $b \oplus \mathcal{P}^T z(\tilde{P})$ to B and append 1 to Prob. In examples in which $x(\tilde{P})$ is nonzero, set j to the position of the first nonzero bit of $x(\tilde{P})$. The Pauli unitary $P' = CX_j C^\dagger$ anti-commutes with P, and the steps discussed above for the $[\![ P', P ]\!] = 1$ case may be performed. The total runtime complexity of the above steps is given by $O(|C| \cdot (\text{cols}(\mathcal{P}) \cdot |C|) + \text{cols}(\mathcal{P})(|C| + \text{rows}(B)))$.

G may be a destructive measurement of a qubit j in the computational basis. In such examples, perform a $Z_j$ measurement using the joint Pauli measurements steps discussed above. Subsequently to performing the $Z_j$ measurement, disentangle the qubit j by modifying C such that $C|0\rangle^{\otimes n}$ is in the same state and such that $CZ_1 C^\dagger = \pm Z_j$ and $CX_j C^\dagger = \pm X_j$. Then remove rows j and n+j and columns j and n+j from the description of C and remove row j from $\mathcal{P}$. The total runtime complexity of the above steps is given by $O(|C| \cdot (\text{cols}(\mathcal{P}) \cdot |C|) + \text{cols}(\mathcal{P})(|C| + \text{rows}(B)) + |C|^2)$.

Using the above steps of the Choi-state-based stabilizer instrument algorithm 56, the properties of the standardized stabilizer instrument specification 50 listed above may be computed. As seen from the computational complexity expressions, the properties of the standardized stabilizer instrument specification 50 may be computed in polynomial time.

Figure 6:
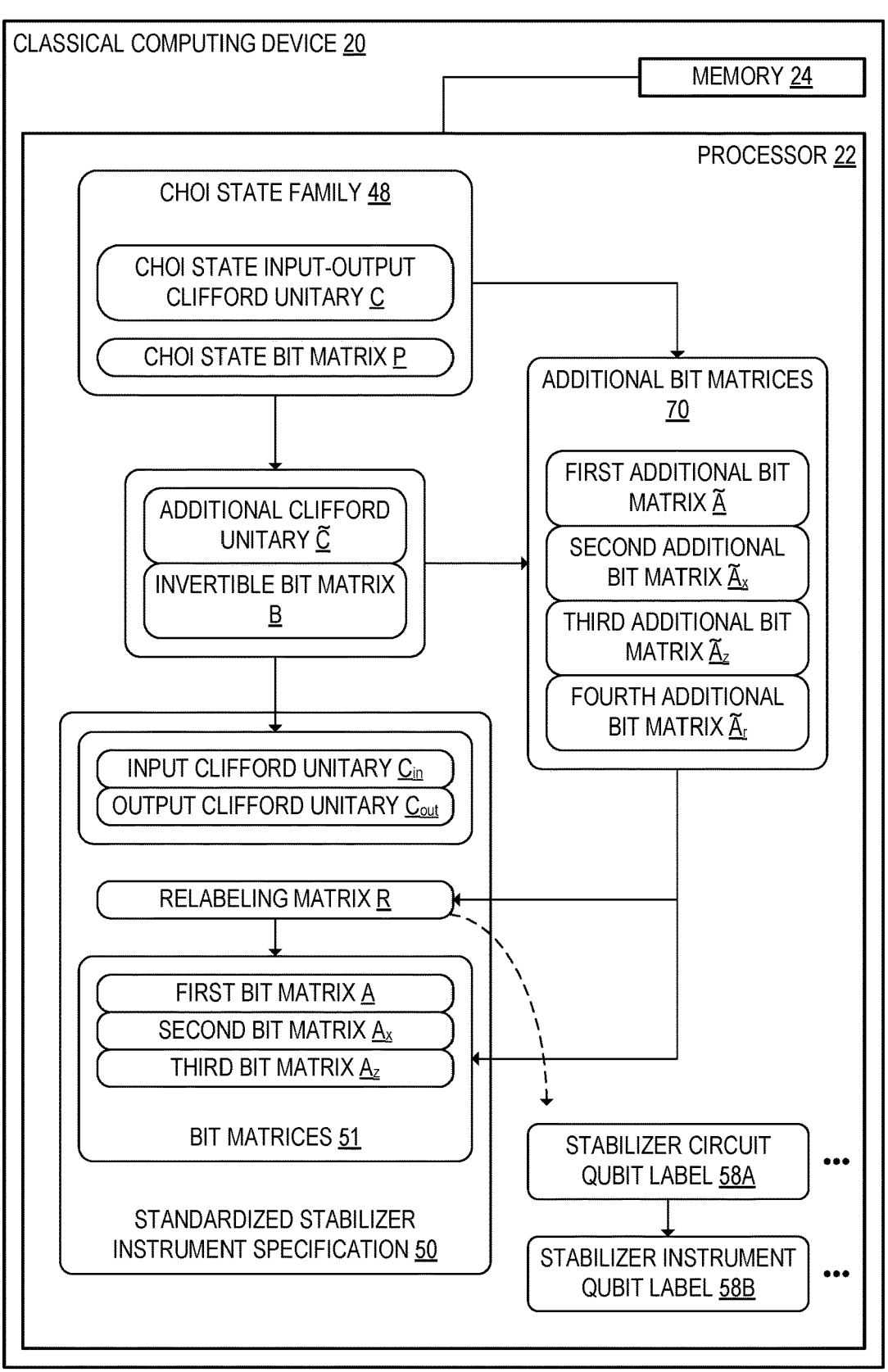
FIG. 6 schematically shows the classical computing device when the processor computes the standardized stabilizer instrument based at least in part on a Choi state family, according to the example of FIG. 5.

The Choi-state-based stabilizer instrument algorithm 56 further includes steps by which the processor 22 may be configured to compute the standardized stabilizer instrument specification 50 from the Choi state family 48 of the stabilizer circuit 40. The classical computing device 20 is schematically shown in FIG. 6 when the processor 22 computes the standardized stabilizer instrument specification 50 based at least in part on the Choi state family 48, according to one example. In the example of FIG. 6, the processor 22 is configured to compute an additional Clifford unitary $\tilde{C}$ and an invertible bit matrix B at least in part by computing a partition of the Choi state input-output Clifford unitary C. The invertible bit matrix B is a transformation matrix from the Choi state input-output Clifford unitary C into the additional Clifford unitary $\tilde{C}$. The processor 22 is further configured to compute the input Clifford unitary $C_{in}$ and the output Clifford unitary $C_{out}$ based at least in part on the additional Clifford unitary $\tilde{C}$.

When computing the standardized stabilizer instrument specification 50 based at least in part on the Choi state family 48, as depicted in the example of FIG. 6, the processor 22 may be further configured to compute a plurality of additional bit matrices 70 based at least in part on the Choi state bit matrix $\mathcal{P}$, the additional Clifford unitary $\tilde{C}$, and an inversion $B^{-1}$ of the invertible bit matrix B. The plurality of additional bit matrices 70, as shown in the example of FIG. 6, may include a first additional bit matrix $\tilde{A}$, a second additional bit matrix $\tilde{A}_x$, a third additional bit matrix $\tilde{A}_z$, and a fourth additional bit matrix $\tilde{A}_r$ over $\mathbb{F}_2$.

As depicted in the example of FIG. 6, the processor 22 may be further configured to compute a relabeling matrix R that maps one or more stabilizer circuit qubit labels 58A of the stabilizer circuit 40 to one or more respective stabilizer instrument qubit labels 58B of the stabilizer instrument. In addition, the processor 22 may be further configured to compute the plurality of bit matrices 51 based at least in part on the relabeling matrix R. The plurality of additional bit matrices 70 may also be used when computing the plurality of bit matrices 51 included in the standardized stabilizer instrument specification 50.

The steps of computing the standardized stabilizer instrument specification 50 from the Choi state family 48 are discussed in further detail below. The processor 22 is configured to receive, as input, the Choi state input-output Clifford unitary C, which is a $k_{in} + k_{out}$-qubit Clifford unitary. The Choi-state-based stabilizer instrument algorithm 56 further receives the Choi state bit matrix $\mathcal{P}$, which is a $(k_{in} + k_{out}) \times l$ matrix over $\mathbb{F}_2$. The Choi state bit matrix $\mathcal{P}$ describes a family of Choi states $CX^{\mathcal{P}\tilde{r}}|0\rangle^{\otimes(k_{in}+k_{out})}$ of a quantum instrument that has $k_{in}$ input qubits, $k_{out}$ output qubits, and outcomes $r \in \mathbb{F}_2^l$. The Choi state input-output Clifford unitary C and the Choi state bit matrix $\mathcal{P}$ may be computed according to the steps discussed above. The outputs of the general form computation algorithm include the Clifford unitaries $C_{in}$ and $C_{out}$, the numbers of input and output qubits $k_{in}$ and $k_{out}$, an integer k, and the bit matrices A, $A_x$, and $A_z$ over $\mathbb{F}_2$. The bit matrices A, $A_x$, and $A_z$ have dimensions $(k_{out} - k) \times l$, $k \times l$, and $k \times l$, respectively. In addition, the general form computation algorithm outputs an invertible $l \times l$ matrix R over $\mathbb{F}_2$ such that each Choi state of the standardized stabilizer instrument specification 50 with an outcome $r \oplus r_c$ is equal to $CX^{\mathcal{P}\tilde{r}}|0\rangle^{\otimes(k_{in}+k_{out})}$ for $\tilde{r} = R(r \otimes r_c)$. Thus, R is a relabeling matrix for the measurement outcomes of the stabilizer circuit 40.

In the steps of the Choi-state-based stabilizer instrument algorithm 56 performed when computing the standardized stabilizer instrument specification 50 from the Choi state family 48, the processor 22 is configured to compute a partition of the Choi state input-output Clifford unitary C for a set K and a set $K^c$. The set K includes the first $k_{out}$ qubits and the set $K^c$ includes the last $k_{out}$ qubits of the Clifford unitary C. The partition includes the invertible bit matrix B, which is a $(k_{in} + \text{knit}) \times (k_{in} + k_{out})$ matrix over $\mathbb{F}_2$, and further includes integers $k_1$ and $k_2$. For the partition of Choi state input-output C, the additional Clifford unitary $\tilde{C}$ is defined as $\tilde{C} = CU_B$, where $U_B$ is a Clifford unitary described by the following $(2n+2) \times (2n+2)$ matrix:

$$U_B = \begin{pmatrix} B^{-1} & 0 & 0 \\ 0 & B^T & 0 \\ 0 & 0 & 0 \end{pmatrix}$$

The additional Clifford unitary e has the following properties:

1. $\tilde{C}Z_1\tilde{C}^\dagger, \ldots, \tilde{C}Z_{k_1}\tilde{C}^\dagger$ are supported on K.
2. $\tilde{C}Z_{k_1+1}\tilde{C}^\dagger, \ldots, \tilde{C}Z_{k_1k_2}\tilde{C}^\dagger$ are supported on $K^c$.
3. $\tilde{C}Z_{k_1k_2+1}\tilde{C}^\dagger \ldots, \tilde{C}Z_n\tilde{C}^\dagger$ restricted to qubits in K form a symplectic basis. In addition, $\tilde{C}Z_{k_1k_2+1}\tilde{C}^\dagger \ldots, \tilde{C}Z_n\tilde{C}^\dagger$ restricted to qubits in $K^c$ also form a symplectic basis. A symplectic basis of a group is a basis of 2m Pauli operators that have the same commutation relations as $X_1, \ldots, X_m, Z_1, \ldots, Z_m$.

For the partition of the Choi state input-output Clifford unitary C, the following property holds:

$$CX^{B^{-1}\mathcal{P}\vec{r}}|0\rangle^{\otimes(k_{in}+k_{out})} = CX^{B^{-1}\mathcal{P}\vec{r}}|0\rangle^{\otimes(k_{in}+k_{out})}$$

This is the case because $$U_B^\dagger = U_{B^{-1}} \text{ and } U_B X^b U_B^\dagger = X^{Bb}.$$

Returning to the steps of the Choi-state-based stabilizer instrument algorithm 56, set $k=(n-k_1-k_2)/2$ and assert that k is an integer.

Construct $C_{out}$ acting on $k_{out}=k_1+k$ qubits. Constructing C out includes the following steps:

Set $$C_{out}Z_jC_{out}^\dagger \text{ to } \tilde{C}Z_j\tilde{C}^\dagger$$

restricted to K, for $j \in [k_1]$.

Set $$C_{out}Z_{k_1+j}C_{out}^\dagger \text{ to } \tilde{C}Z_{k_1+k_2+j}\tilde{C}^\dagger$$

restricted to K, for $j \in [k]$.

Set $$C_{out}X_{k_1+j}C_{out}^\dagger \text{ to } \tilde{C}Z_{k_1+k_2+j}\tilde{C}^\dagger$$

restricted to K, for $j \in [k]$.

Complete the partially specified $C_{out}$ to form a full Clifford unitary using $$\tilde{C}, \text{ with } C_{out}Z_jC_{out}^\dagger \text{ and } \tilde{C}X_j\tilde{C}^\dagger$$

restricted to K form a symplectic basis. Thus, the output Clifford unitary $C_{out}$ acting on $k_{out}=k_1+k$ qubits is constructed.

The Choi-state-based stabilizer instrument algorithm 56 further includes constructing $C_{in}$ acting on $k_{out}=k_2+k$ qubits. Constructing $C_{in}$ includes the following steps:

Set $$C_{in}Z_jC_{in}^\dagger \text{ to } \tilde{C}Z_{k_1+j}\tilde{C}^\dagger$$

restricted to $K^c$, for $j \in [k_2]$.

Set $$C_{in}Z_{k_1+j}C_{in}^\dagger \text{ to } \tilde{C}Z_{k_1+k_2+j}\tilde{C}^\dagger$$

restricted to $K^c$, for $j \in [k]$.

Set $$C_{in}X_{k_1+j}C_{in}^\dagger \text{ to } \tilde{C}Z_{k_1+k_2+k+j}\tilde{C}^\dagger$$

restricted to $K^c$, for $j \in [k]$.

Complete the partially specified $C_{in}$ to form a full Clifford unitary using $\tilde{C}$, considering that $$C_{in}Z_jC_{in}^\dagger \text{ and } \tilde{C}X_{k_1+j}\tilde{C}^\dagger$$

restricted to KC form a symplectic basis. Thus, the input Clifford unitary $C_{in}$ acting on $k_{out}=k_2+k$ qubits is constructed.

The Choi-state-based stabilizer instrument algorithm 56 further includes setting $\tilde{A}$ to the first $k_1$ rows of $B^{-1}\mathcal{P}$, setting $\tilde{A}_r$ to rows $k_1+1$ to $k_1+k_2$ of $B^{-1}\mathcal{P}$, setting $\tilde{A}_x$ to rows $k_1+k_2+1$ to $k_1+k_2+k$ of $B^{-1}\mathcal{P}$, and setting A, to rows $k_1+k_2+k+1$ to n of $B^{-1}\mathcal{P}$.

The Choi-state-based stabilizer instrument algorithm 56 further includes asserting that $A_r$ is a full-rank matrix and computing an invertible matrix R such that $A_rR= 1_{k_2} \oplus 0_{k_2 \times (l=k_2)}$. In addition, the general form computation algorithm further includes completing $A_r$ to a square full-rank matrix using PLE decomposition and setting $R=A_r^{-1}$. Thus, the processor 22 is configured to compute the relabeling matrix R.

To complete the Choi-state-based stabilizer instrument algorithm 56, the processor 22 is further configured to set $A_x=\tilde{A}_xR$, setting $A_z=A_zR$, and setting $A=\tilde{A}R$. Thus, each of the matrices included in the general form is computed.

FIG. 7A shows a flowchart of a method 100 for use with a computing system. Via the method 100, a standardized stabilizer instrument specification is computed at a processor included in the computing system. The method 100 includes, at step 102, receiving a stabilizer circuit specification of a stabilizer circuit that includes one or more elementary operations. The one or more elementary operations are each selected from the group consisting of:

(1) An allocation of one or more qubits in a stabilizer state;
(2) An allocation of one or more random classical bits;
(3) A Clifford unitary;
(4) A Pauli unitary conditional on one or more respective parities of one or more measurement outcomes and/or one or more respective parities of the one or more random classical bits;
(5) A joint multi-qubit Pauli measurement; and
(6) A destructive one-qubit Pauli measurement.

Each operation included in the stabilizer instrument is included in the above group.

At step 104, the method 100 further includes computing a standardized stabilizer instrument specification of a stabilizer instrument based at least in part on the stabilizer circuit specification. The standardized stabilizer instrument specification includes an input Clifford unitary, an output Clifford unitary, and a plurality of bit matrices. The plurality of bit matrices may, for example, include a first bit matrix, a second bit matrix, and a third bit matrix. At step 106, the method 100 further includes storing the standardized stabilizer instrument specification in memory.

Figure 7B:
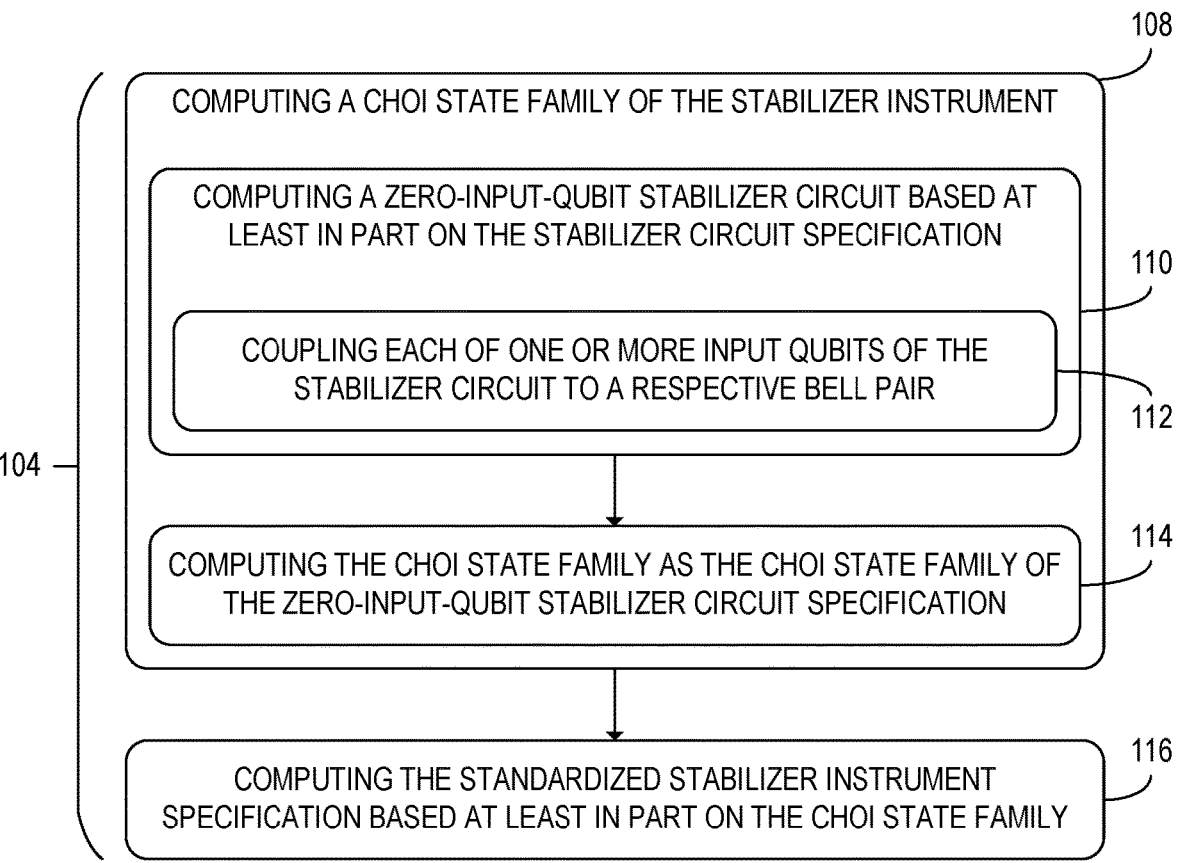

FIG. 7B shows additional steps of the method 100 that may be performed when computing the standardized stabilizer instrument specification at step 104. Step 104 may include, at step 108, computing a Choi state family of the stabilizer instrument. Computing the Choi state family at step 108 may include, at step 110, computing a zero-input-qubit stabilizer circuit specification based at least in part on the stabilizer circuit specification. The zero-input-qubit stabilizer circuit specification may be computed at step 112 by coupling each of one or more input qubits of the stabilizer circuit specification to a respective Bell pair. At step 114, computing the Choi state family may further include computing the Choi state family as the Choi state family of the zero-input-qubit stabilizer circuit specification. At step 116, step 104 may further include computing the standardized stabilizer instrument specification based at least in part on the Choi state family.

FIG. 7C shows additional steps of the method 100 that may be performed when computing the standardized stabilizer instrument specification based at least in part on the Choi state family at step 116. At step 118, step 116 may include computing an additional Clifford unitary and an invertible bit matrix at least in part by computing a partition of the Choi state input-output Clifford unitary. The invertible bit matrix, in the example of FIG. 7C, is a transformation matrix from the Choi state input-output Clifford unitary into the additional Clifford unitary. At step 120, step 116 may further include computing the input Clifford unitary and the output Clifford unitary based at least in part on the additional Clifford unitary.

At step 122, steps 116 may further include computing a plurality of additional bit matrices based at least in part on the Choi state bit matrix, the additional Clifford unitary and an inversion of the invertible bit matrix. The plurality of additional bit matrices may, for example, include a first additional bit matrix, a second additional bit matrix, a third additional bit matrix, and a fourth additional bit matrix. In addition, at step 124, step 116 may further include computing the plurality of bit matrices based at least in part on the plurality of additional bit matrices.

FIG. 7D shows additional steps of the method 100 that may be performed in addition to the steps of FIG. 7C when computing the standardized stabilizer instrument specification at step 116. At step 126, step 116 may further include computing a relabeling matrix that maps one or more stabilizer circuit qubit labels of the stabilizer circuit to one or more respective stabilizer instrument qubit labels of the stabilizer instrument. The relabeling matrix may be included in the standardized stabilizer instrument specification in some examples. In addition, at step 128, the method 100 may further include computing the plurality of bit matrices based at least in part on the relabeling matrix as well as the plurality of additional bit matrices.

Turning now to FIG. 8A, the classical computing device 20 is shown when the processor 22 is configured to compute a logical instrument specification 210 corresponding to a standardized stabilizer instrument specification 50. The logical instrument specification 210 may encode a computation at the logical qubit level that the stabilizer circuit 40 associated with the standardized stabilizer instrument specification 50 performs at the physical qubit level. Thus, processor 22 may map a physical-qubit-level quantum computation to a logical-qubit-level quantum computation.

In the example of FIG. 8A, the processor 22 is configured to receive a standardized stabilizer instrument specification 50 including an input Clifford unitary $C_{in}$, an output Clifford unitary $C_{out}$, and a plurality of stabilizer instrument bit matrices 51. The plurality of stabilizer instrument bit matrices 51 include a first stabilizer instrument bit matrix A, a second stabilizer instrument bit matrix $A_x$, and a third stabilizer instrument bit matrix $A_z$ in the example of FIG. 8A. In addition, the standardized stabilizer instrument specification 50 shown in FIG. 8A includes a relabeling matrix R. In addition to the standardized stabilizer instrument specification 50, the processor 22 is further configured to receive a logical instrument input error correction code 200 and a logical instrument output error correction code 202 in the example of FIG. 8A.

Figure 8B:
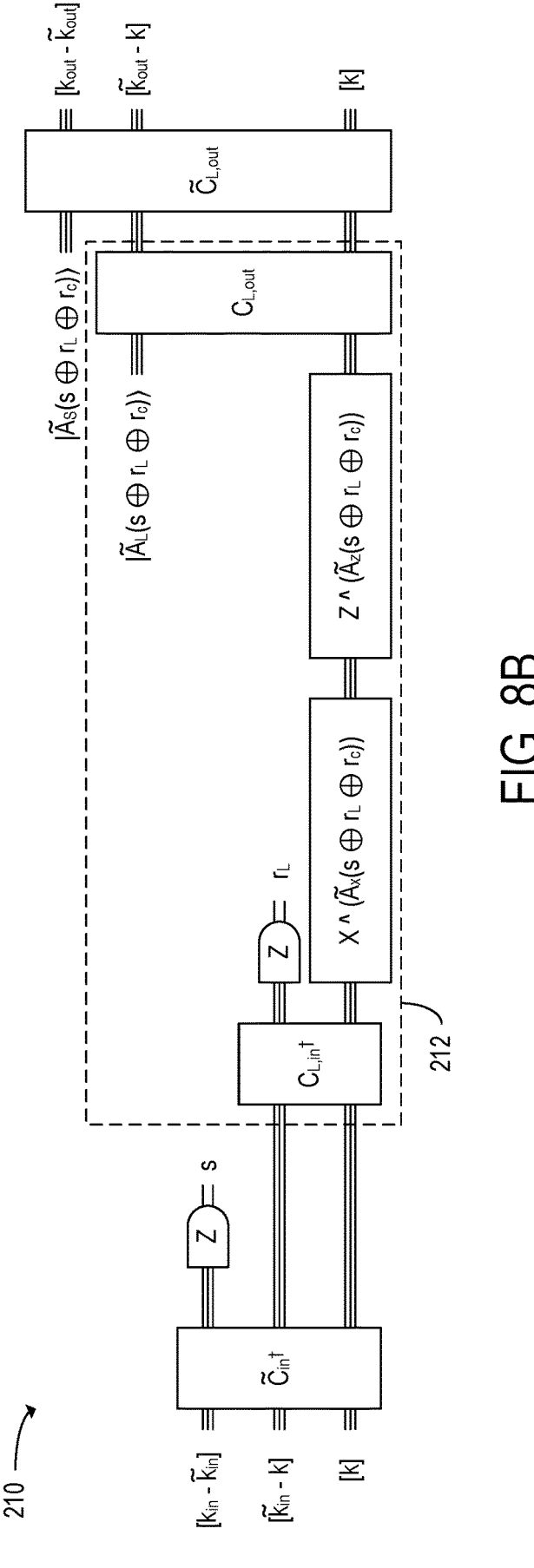
FIG. 8B schematically shows the logical instrument specification corresponding to the standardized stabilizer instrument specification, according to the example of FIG. 8A.

The processor 22 is further configured to compute a logical instrument specification 210 based at least in part on the standardized stabilizer instrument specification 50, the logical instrument input error correction code 200, and the logical instrument output error correction code 202. FIG. 8B schematically shows the logical instrument specification 210 in additional detail.

The standardized stabilizer instrument specification 50 shown in FIGS. 8A-8B has $k_{in}$ input qubits, $k_{out}$ output qubits, and $k_r$ random bits. The logical instrument specification 210 has $\tilde{k}_{in}$ input qubits and $\tilde{k}_{out}$ output qubits. The logical instrument input error correction code 200 is specified by $\llbracket k_{in}, \tilde{k}_{in}, \tilde{C}_{in} \rrbracket$, and the output error correction code is specified by $\llbracket k_{out}, \tilde{k}_{out}, \tilde{C}_{out} \rrbracket$. In the above expressions, $\tilde{C}_{in}$ is a logical instrument input code Clifford unitary and $\tilde{C}_{out}$ is a logical instrument output code Clifford unitary. As shown in FIG. 8B, the logical instrument specification 210 includes a specification of a logical action 212 implemented by the stabilizer circuit 40 with which the logical instrument specification 210 is associated.

The logical instrument specification 210 includes a logical input Clifford unitary $C_{L,in}$, a logical output Clifford unitary $C_{L,out}$, a plurality of logical instrument bit matrices 214, and a logical instrument relabeling matrix $R_L$. In the logical instrument specification 210, the logical input Clifford unitary C on and the logical output Clifford unitary $C_{L,out}$ act on $\tilde{k}_{in}$ and $\tilde{k}_{out}$ qubits, respectively. The plurality of logical instrument bit matrices 214 include a first logical instrument bit matrix $\tilde{A}_S$, a second logical instrument bit matrix $\tilde{A}_L$, a third logical instrument bit matrix $\tilde{A}_x$, and a fourth logical instrument bit matrix $\tilde{A}_z$ in the example of FIGS. 8A-8B. The plurality of logical instrument bit matrices 214 are matrices over $\mathbb{F}_2$. In FIG. 8B, $r_c$ is a $k_r$–dimensional random vector over $\mathbb{F}_2$. 1 is the dimension of $s \oplus r_L \oplus r_c$, such that $l = k_{in} - k + k_r$. The first logical instrument bit matrix A s is a $(k_{out} - \tilde{k}_{out}) \times l$ matrix, the second logical instrument bit matrix $\tilde{A}_L$ is a $(\tilde{k}_{out} - k) \times l$ matrix, and the third and fourth logical instrument bit matrices $\tilde{A}_x$ and $\tilde{A}_z$ are k×l matrices.

The standardized stabilizer instrument specification 50 and the logical instrument specification 210 are equal up to relabeling, such that the logical instrument relabeling matrix $R_L$ satisfies $R_L r = s \oplus r_L$. Similarly to the relabeling matrix R included in the standardized stabilizer instrument specification 50, the logical instrument relabeling matrix $R_L$ is a matrix over $\mathbb{F}_2$.

Figure 9A:
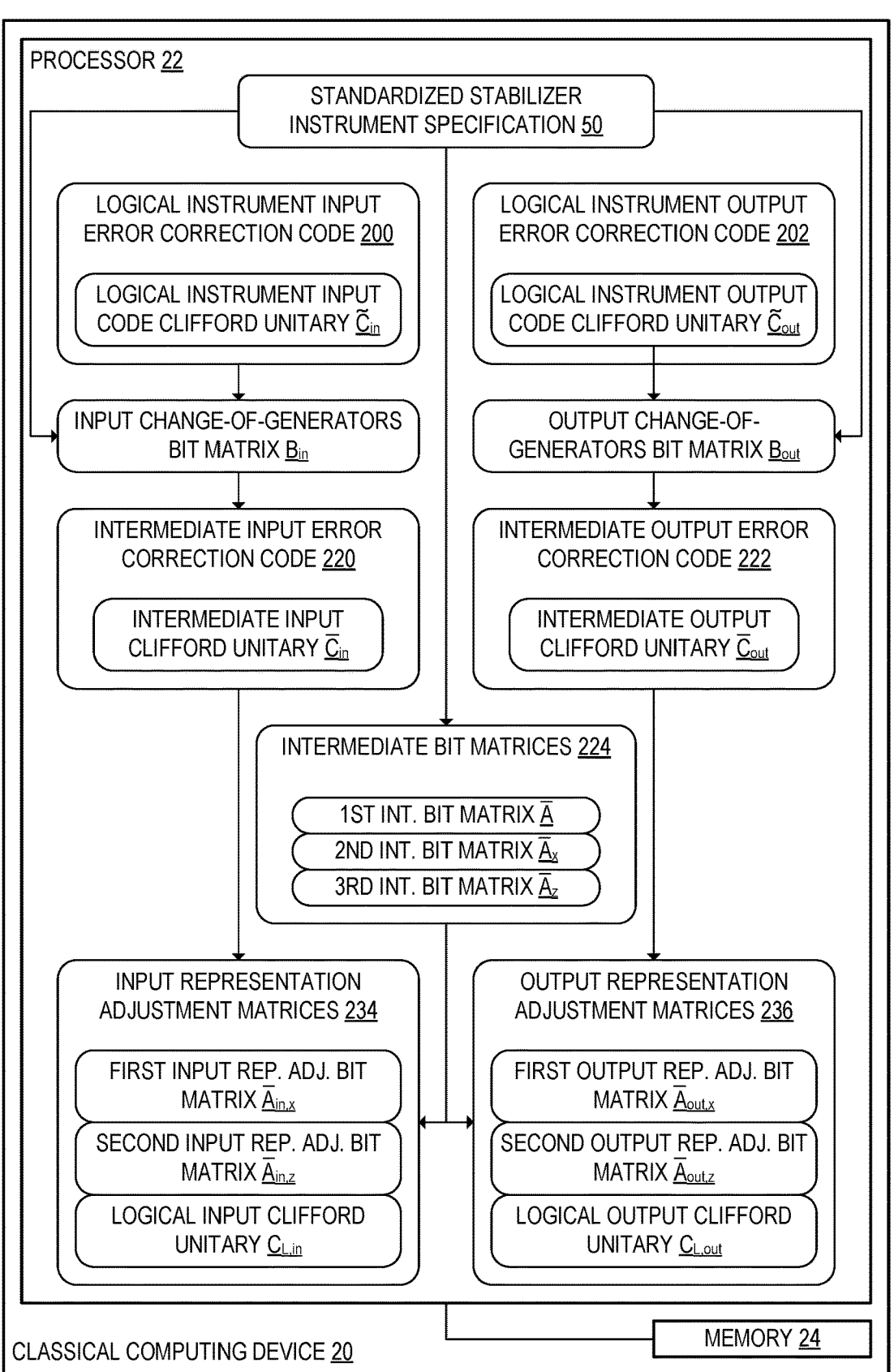
FIG. 9A schematically shows the classical computing device when the processor is configured to generate intermediate results that are used when computing the logical instrument specification, according to the example of FIG. 8A.

FIG. 9A schematically shows the classical computing device 20 when the processor 22 is configured to generate intermediate results that are used when computing the logical instrument specification 210. Using the intermediate results shown in FIG. 9A, a logical instrument specification 210 as shown in the example of FIGS. 8A-8B may be generated from the standardized stabilizer instrument specification 50 as shown in FIGS. 2A-2B. When executing the logical instrument computation algorithm, the processor 22 is configured to receive a standardized stabilizer instrument specification 50 as input, as discussed above.

Figure 9B:
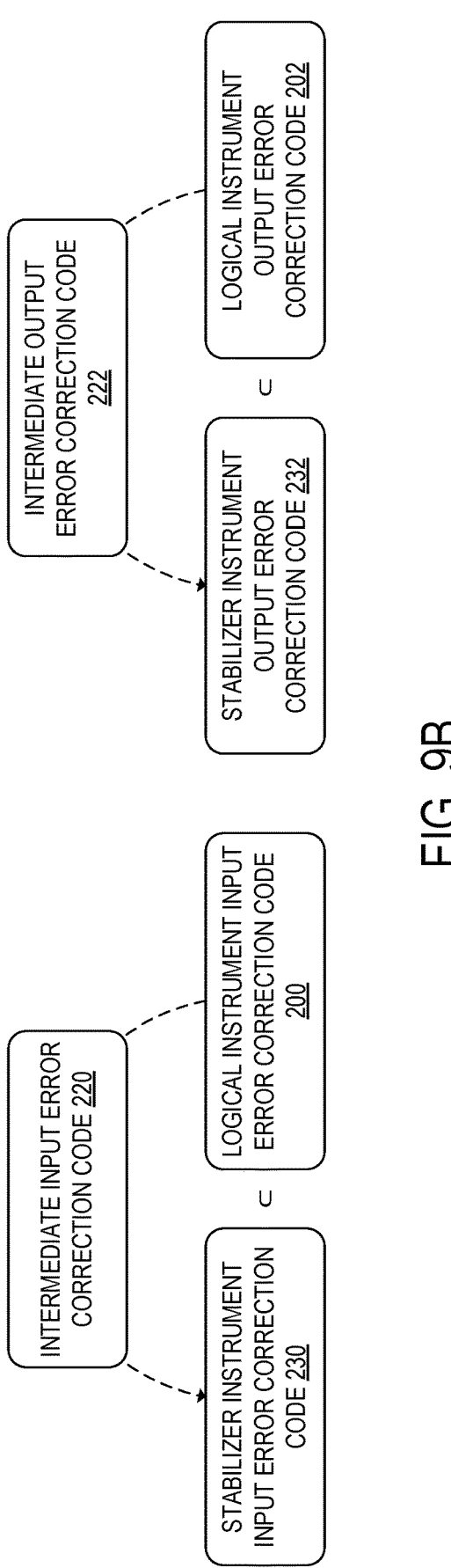
FIG. 9B schematically shows relationships between a stabilizer instrument input error correction code and the logical instrument error correction code, as well as between a stabilizer instrument output error correction code and a logical instrument error correction code, according to the example of FIG. 8A.

FIG. 9B schematically shows relationships between a stabilizer instrument input error correction code 230 and the logical instrument input error correction code 200, as well as between the stabilizer instrument output error correction code 232 and the logical instrument output error correction code 202. The stabilizer instrument input error correction code 230 of the standardized stabilizer instrument specification 50 may be expressed as $[\![k_{in}, k, \tilde{C}_{in}]\!]$, and the stabilizer instrument output error correction code 232 may be expressed as $[\![k_{in}, k, \tilde{C}_{in}]\!]$. The standardized stabilizer instrument specification 50 has the properties $[\![k_{in}, k, \tilde{C}_{in}]\!] \subset [\![k_{in}, \tilde{k}_{in}, \tilde{C}_{in}]\!]$ and $[\![k_{out}, k, \tilde{C}_{out}]\!] \subset [\![k_{out}, \tilde{k}_{out}, \tilde{C}_{out}]\!]$. Thus, the stabilizer instrument input error correction code 230 is a subset of the logical instrument input error correction code 200, and the stabilizer instrument output error correction code 232 is a subset of the logical instrument output error correction code 202.

Returning to FIG. 9A, when computing the logical instrument specification 210, the processor 22 is configured to align the generators of the input and output error correction codes of the standardized stabilizer instrument specification 50 and the logical instrument specification 210. Aligning the input and output error correction codes includes computing an intermediate input error correction code 220 and an intermediate output error correction code 222. The intermediate input error correction code 220 and the intermediate output error correction code respectively include an intermediate input Clifford unitary $\overline{C}_{in}$ and an intermediate output Clifford unitary $\overline{C}_{out}$ such that $[\![k_{in}, k, \overline{C}_{in}]\!] = [\![k_{in}, k, C_{in}]\!]$ and $[\![k_{out}, k, \overline{C}_{out}]\!] = [\![k_{out}, k, C_{out}]\!]$. In addition, $[\![k_{in}, \tilde{k}, \overline{C}_{in}]\!] = [\![k_{in}, \tilde{k}, \tilde{C}_{in}]\!]$ and $[\![k_{out}, \tilde{k}, \overline{C}_{out}]\!] = [\![k_{out}, \tilde{k}, \tilde{C}_{out}]\!]$. Thus, as depicted in FIG. 9B, the intermediate input error correction code 220 may be used to convert the logical instrument input error correction code 200 into the stabilizer instrument input error correction code 230, and the intermediate output error correction code 222 may be used to convert the logical instrument output error correction code 202 into the stabilizer instrument output error correction code 232.

Figures 10A, 10B:
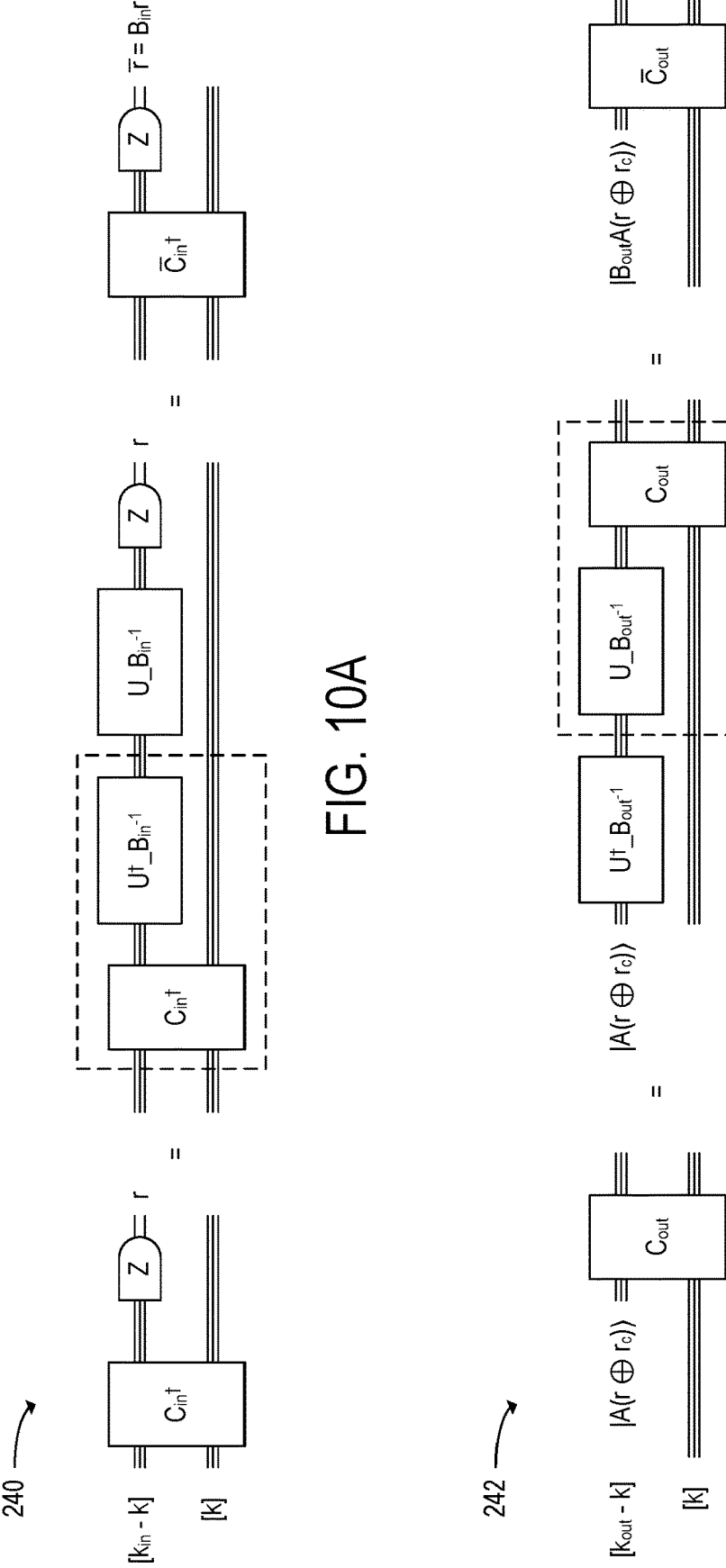
FIG. 10A schematically shows an example of an input generator adjustment that may be performed on the standardized stabilizer instrument specification to align the stabilizer instrument input error correction code with the logical instrument input error correction code, according to the example of FIG. 9B.
FIG. 10B schematically shows an example of an output generator adjustment that may be performed on the standardized stabilizer instrument specification to align the stabilizer instrument output error correction code with the logical instrument output error correction code, according to the example of FIG. 9B.

FIG. 10A schematically shows an example of an input generator adjustment 240 that may be performed on the standardized stabilizer instrument specification 50 to align the stabilizer instrument input error correction code 230 with the logical instrument input error correction code 200 as shown in FIG. 9B. In addition, FIG. 10B schematically shows an example of an output generator adjustment 242 that may be performed on the standardized stabilizer instrument specification 50 to align the stabilizer instrument output error correction code 232 with the logical instrument output error correction code 202.

Applying the input generator adjustment 240 to the logical instrument error correction code 230 includes expressing the generators of $[\![k_{in}, \tilde{k}, C_{in}]\!]$ in terms of the generators of $[\![k_{in}, k, C_{in}]\!]$. In addition, applying the input generator adjustment 240 further includes computing an input change-of-generators bit matrix $B_{in}$, which is a $(k_{in}-k)\times(k_{in}-k)$ matrix over $\mathbb{F}_2$, based at least in part on the input Clifford unitary $C_{in}$ and the logical instrument input code Clifford unitary $\tilde{C}_{in}$ using a change-of-generators matrix computation algorithm. The inputs to the change-of-generators matrix computation algorithm are $$P_j = C_{in}Z_jC_{in}^\dagger \text{ for } j \in [k_{in} - k] \text{ and } Q_{j'} = \tilde{C}_{in}Z_{j'}\tilde{C}_{in}^\dagger \text{ for } j' \in [k_{in} - \tilde{k}_{in}].$$

In examples in which no such matrix B in exists, the input generator adjustment 240 may fail and may report to the user that $[\![k_{in}, \tilde{k}, C_{in}]\!]$ and $[\![k_{in}, k, C_{in}]\!]$ are incompatible codes.

When applying the output generator adjustment 242 shown in FIG. 10B, the processor 22 is configured to compute an output change-of-generators bit matrix $B_{out}$, which is a $(k_{in}-k)\times(k_{in}-k)$ matrix over $\mathbb{F}_2$, based at least in part on the output Clifford unitary $C_{out}$ and the logical instrument output code Clifford unitary $\tilde{C}_{out}$. The output change-of-generators bit matrix $B_{out}$ is computed by executing the change-of-generators matrix computation algorithm to express the generators of $[\![k_{out}, \tilde{k}, \tilde{C}_{out}]\!]$ in terms of the generators of $[\![k_{out}, k, C_{out}]\!]$. Similarly to the input generator adjustment 240, the output generator adjustment 242 may fail and may report to the user that $[\![k_{out}, \tilde{k}, \tilde{C}_{out}]\!]$ and $[\![k_{out}, k, C_{out}]\!]$ are incompatible in examples in which no such output change-of-generators bit matrix $B_{out}$ exists. Aligning the generators further includes asserting that $$\tilde{C}_{in}Z_j\tilde{C}_{in}^\dagger = C_{in}Z^{(B_{in}^Te_j)\oplus 0_k}C_{in}^\dagger,$$

where $e_j$ are the $k_{in}-k$-dimensional standard basis vectors and $0_k$ is a vector of zeroes of length k. Similarly, the processor 22 is further configured to assert that $$\tilde{C}_{out}Z_j\tilde{C}_{out}^\dagger = C_{out}Z^{(B_{out}^Te_j)\oplus 0_k}C_{out}^\dagger.$$

Aligning the generators further includes setting $\tilde{C}_{in}=C_{in}(U_{B_{in}^{-1}}\otimes I_k)$ and setting $$\overline{C}_{out} = C_{out}\left(U_{B_{out}^{-1}} \otimes I_k\right).$$

Thus, the processor 22 is configured to compute the intermediate input error correction code 220 and the intermediate output error correction code 222 based at least in part on the input change-of-generators bit matrix $B_{in}$ and the output change-of-generators bit matrix $B_{out}$. In addition, the processor 22 is further configured to assert that $$\overline{C}_{in}Z_j\overline{C}_{in}^\dagger = \tilde{C}_{in}Z_j\tilde{C}_{in}^\dagger \text{ for } j \in [k_{in} - \tilde{k}_{in}] \text{ and } \overline{C}_{out}Z_j\overline{C}_{out}^\dagger =$$
$$\tilde{C}_{out}Z_j\tilde{C}_{out}^\dagger \text{ for } j \in [k_{out} - \tilde{k}_{out}].$$

Subsequently to aligning the input and output generators of the standardized stabilizer instrument specification 50 and the logical instrument specification 210, the processor 22 is further configured to define a plurality of intermediate bit matrices 224 over $\mathbb{F}_2$. The plurality of intermediate bit matrices 224 includes a first intermediate bit matrix $$\overline{A} = B_{out}A(B_{in}^{-1}|I_l),$$

US 12,651,190 B2

23 a second intermediate bit matrix $$\bar{A}_x = A_x \left( B_{in}^{-1} | I_l \right),$$

and a third intermediate bit matrix $$\bar{A}_z = A_z \left( B_{in}^{-1} | I_l \right).$$

In these equations, the notation (A|B) indicates that the columns of the matrices A and B are combined from left to right into a single matrix. In addition, the processor 22 is further configured to assert that the standardized stabilizer instrument specification 50 and the logical instrument specification 210 are equal up to relabeling, with $C_{in} = \bar{C}_{in}$, $C_{out} = \bar{C}_{out}$, $A = \bar{A}$, $A_x = \bar{A}_x$, $A_z = \bar{A}_z$, and $r = \bar{r}$ up to the outcome relabeling $\bar{r} = B_{in} r$.

Figure 11:
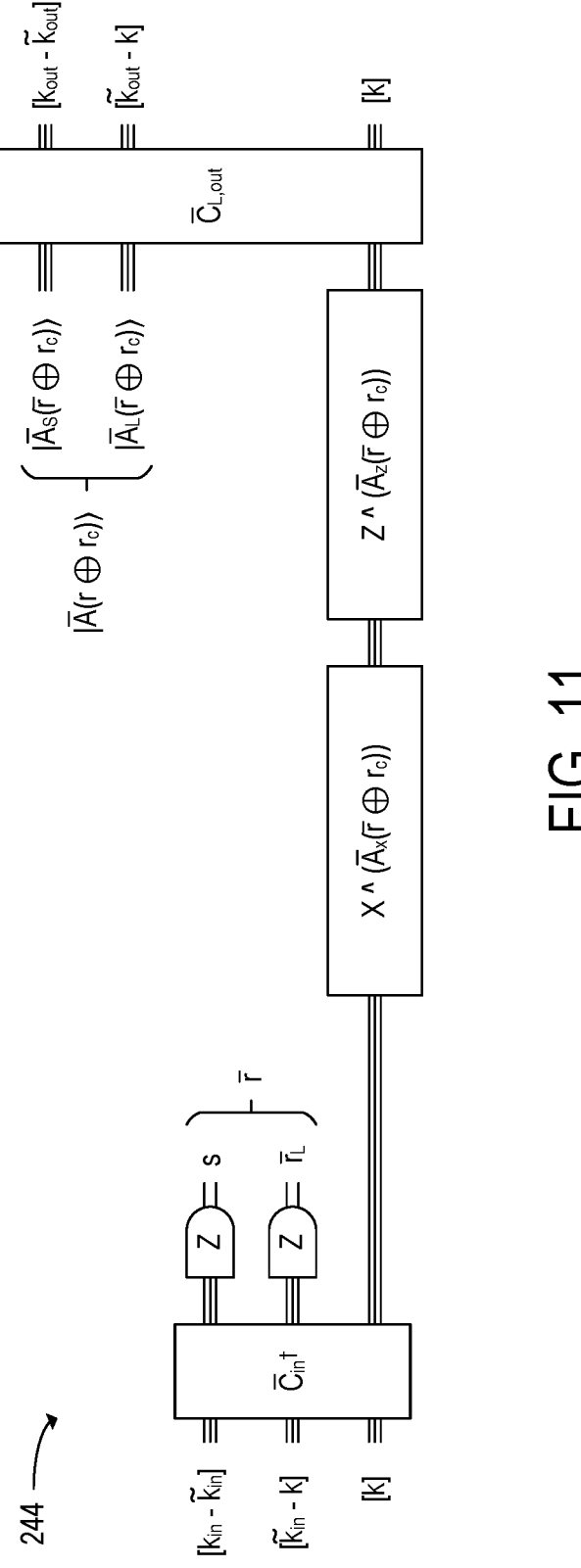
FIG. 11 schematically shows a stabilizer instrument specification with split measurement results, according to the example of FIG. 8A.

The processor 22 is further configured to define a syndrome-qubit matrix $\bar{A}_S$ as the first $k_{out} - \tilde{k}_{out}$ rows of the first intermediate bit matrix $\bar{A}$ and define a logical-qubit matrix $\bar{A}_L$ as the last $\tilde{k}_{out} - k$ rows of the first intermediate bit matrix $\bar{A}$. FIG. 11 schematically shows a stabilizer instrument specification with split measurement results 244. In the stabilizer instrument specification with split measurement results 244, the measurement results $\bar{r}$ of the standardized stabilizer instrument specification 50 are split between syndrome measurement results s and logical operator measurement results $\bar{r}_L$. Similarly, the intermediate bit matrix $\bar{A}(r \oplus r_c)$ shown in FIG. 11 is split between a logical-qubit stabilizer $|\bar{A}_L(\bar{r} \oplus r_c)\rangle$ and a syndrome-qubit stabilizer $|\bar{A}_S(\bar{r} \oplus r_c)\rangle$.

Returning to the example of FIG. 9A, the processor 22 is further configured to compute a plurality of input representation adjustment matrices 234 and a plurality of output representation adjustment matrices 236 based at least in part on the input change-of-generators bit matrix $B_{in}$ and the output change-of-generators bit matrix $B_{out}$. The plurality of input representation adjustment matrices 234 include a first input representation adjustment bit matrix $\bar{A}_{in,x}$, a second input representation adjustment bit matrix $\bar{A}_{in,z}$, and the logical input Clifford unitary $C_{L,in}$, which are computed for $\tilde{k}_{in}$ logical qubits. The logical Clifford unitary $C_{L,in}$ functions as an input representation adjustment Clifford unitary in the example of FIG. 9A. The plurality of output representation adjustment matrices 236 includes a first output representation adjustment bit matrix $\bar{A}_{out,x}$, a second output representation adjustment bit matrix $\bar{A}_{out,z}$, and the logical output Clifford unitary $C_{L,out}$, which are computed for $\tilde{k}_{out}$ logical qubits.

Figures 12A, 12B:
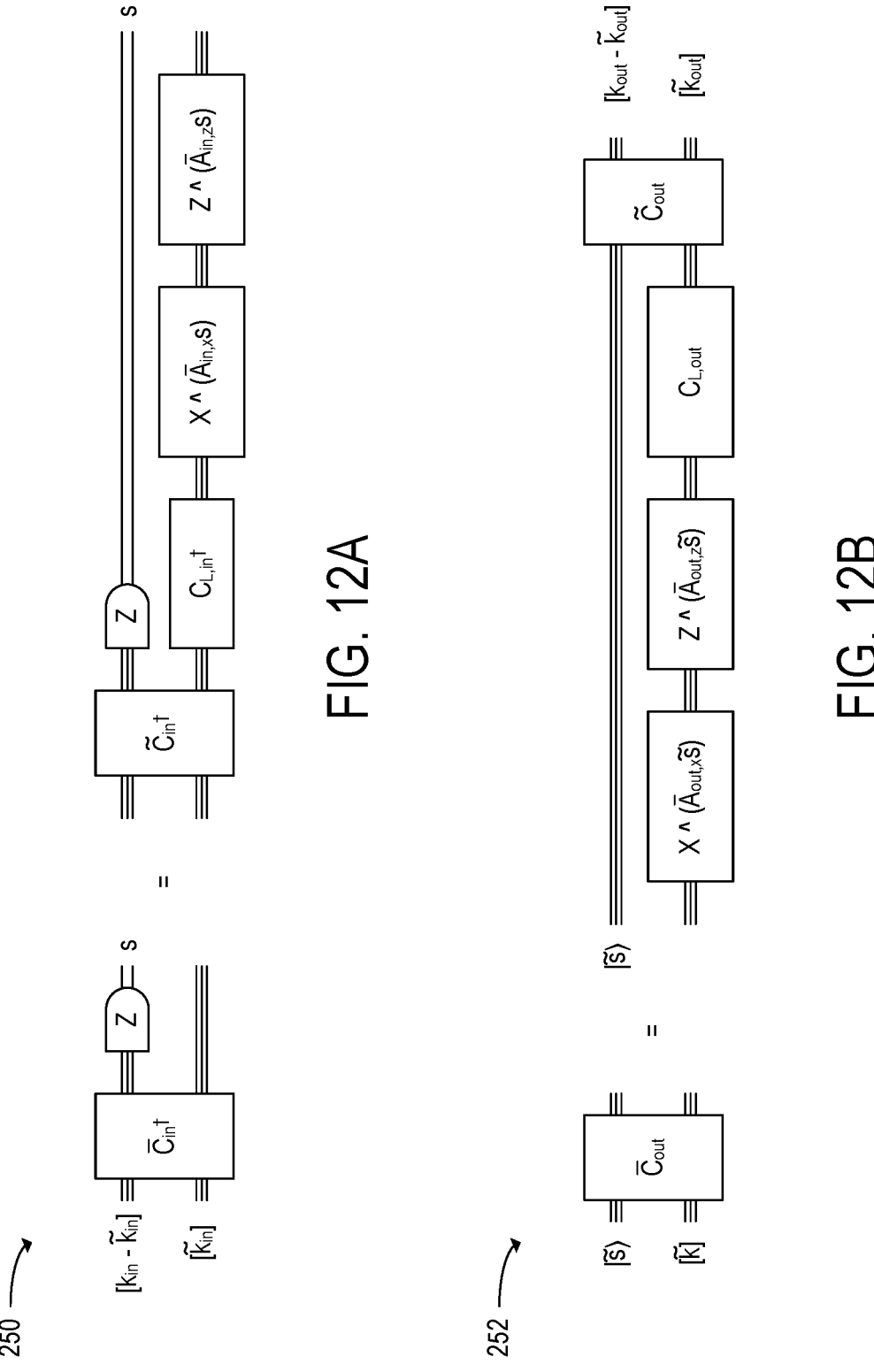
FIG. 12A schematically shows an input operator representation adjustment that may be performed on the standardized stabilizer instrument specification, according to the example of FIG. 9A.
FIG. 12B schematically shows an output operator representation adjustment that may be performed on the standardized stabilizer instrument specification, according to the example of FIG. 9A.

The logical operator adjustments may be computed such that the identities shown in FIGS. 12A and 12B hold. FIGS. 12A and 12B schematically depict an input operator representation adjustment 250 and an output operator representation adjustment 252, respectively, that may be performed on the standardized stabilizer instrument specification 50 when the processor 22 generates the plurality of input representation adjustment matrices 234 and the plurality of output representation adjustment matrices 236.

Figure 13:
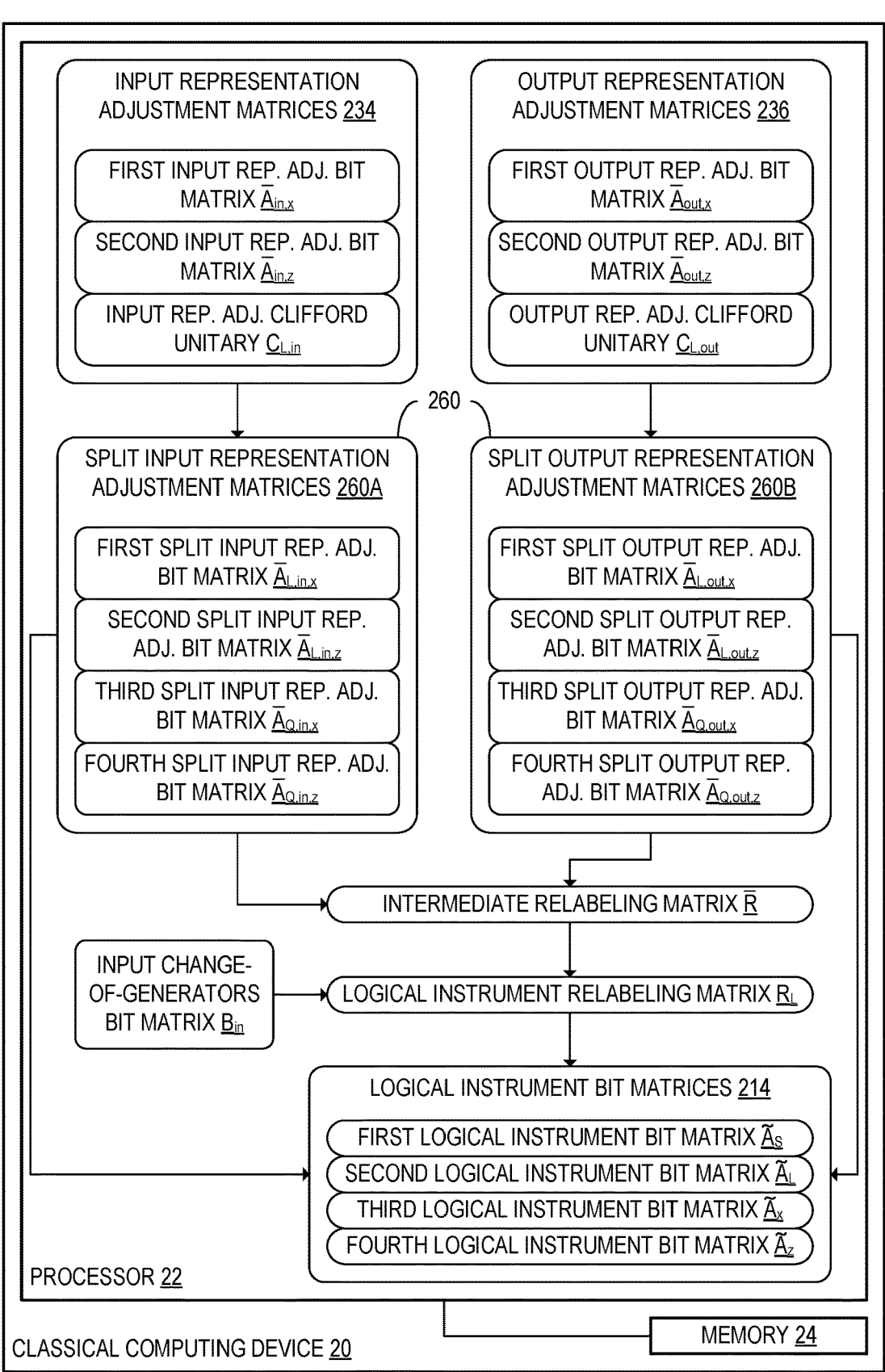
FIG. 13 schematically shows the classical computing device when the processor is configured to compute a plurality of split representation adjustment bit matrices based at least in part on a plurality of input representation adjustment matrices and a plurality of output representation adjustment matrices, according to the example of FIG. 9A.

As shown in FIG. 13, the processor 22 is further configured to compute a plurality of split representation adjustment bit matrices 260 based at least in part on the plurality of input representation adjustment matrices 234 and the plurality of output representation adjustment matrices 236. The processor 22 thereby splits the input representation

24 adjustment bit matrices $\bar{A}_{in,x}$ and $\bar{A}_{in,z}$ and the output representation adjustment bit matrices $\bar{A}_{out,x}$, and $\bar{A}_{out,z}$ into portions that adjust logical measurement outcomes and portions that indicate Pauli operators performed on preserved qubits. The preserved qubits are the qubits to which measurements are not applied.

Splitting the input representation adjustment matrices 234 includes setting a first split input representation adjustment bit matrix $\bar{A}_{L,in,x}$ and a second split input representation adjustment bit matrix $\bar{A}_{in,z}$ equal to the first $\tilde{k}_{in} - k$ rows of the first input representation adjustment bit matrix $\bar{A}_{in,x}$ and the second input representation adjustment bit matrix $\bar{A}_{in,z}$, respectively. In addition, splitting the output representation adjustment matrices 236 includes setting a first split output representation adjustment bit matrix $\bar{A}_{L,out,x}$ and a second split output representation adjustment bit matrix $\bar{A}_{L,out,z}$ equal to the first $k_{out} - k$ rows of the first output representation adjustment bit matrix $\bar{A}_{out,x}$ and the second output representation adjustment bit matrix $\bar{A}_{out,z}$ respectively. The bit matrices with subscripts that include L are configured to adjust the logical measurement outcomes.

Splitting the input representation adjustment matrices 234 further includes setting a third split input representation adjustment bit matrix $\bar{A}_{Q,in,x}$ and a fourth split input representation adjustment bit matrix $\bar{A}_{Q,in,z}$ equal to the last k rows of the first input representation adjustment bit matrix $\bar{A}_{in,x}$ and the second input representation adjustment bit matrix $\bar{A}_{in,z}$, respectively. Splitting the output representation adjustment matrices 236 further includes setting third split output representation adjustment bit matrix $\bar{A}_{Q,out,x}$ and a fourth split output representation adjustment bit matrix $\bar{A}_{Q,out,z}$ equal to the last k rows of the first output representation adjustment bit matrix $\bar{A}_{out,x}$ and the second output representation adjustment bit matrix $\bar{A}_{out,z}$, respectively.

Figure 14:
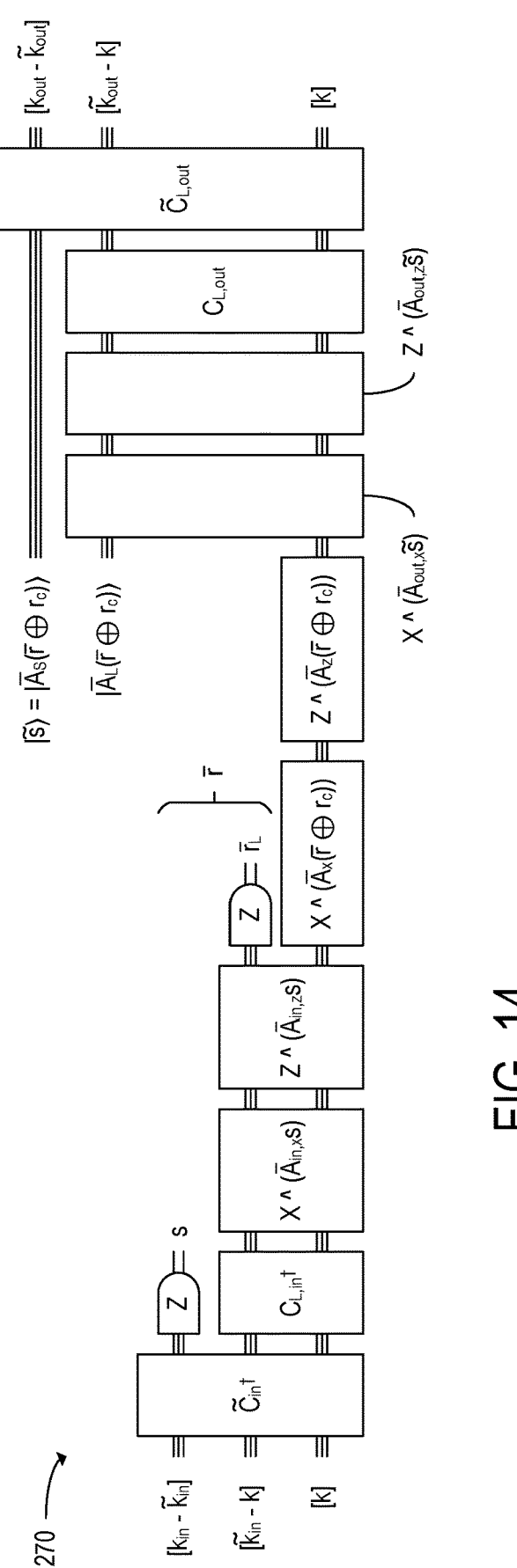
FIG. 14 schematically shows an adjusted logical instrument specification obtained by substituting the input operator representation adjustment and the output operator representation adjustment into the logical instrument specification with split measurement results, according to the example of FIGS. 12A-12B.

FIG. 14 schematically shows an adjusted logical instrument specification 270 obtained by substituting the input operator representation adjustment 250 of FIG. 12A and the output operator representation adjustment 252 of FIG. 12B into the logical instrument specification with split measurement results 244 as depicted in FIG. 11.

Returning to FIG. 13, the processor 22 is further configured to compute an intermediate relabeling matrix $\bar{R}$ based at least in part on the plurality of split representation adjustment bit matrices 260. In the example of FIG. 13, the first split input representation adjustment matrix $\bar{A}_{L,in,x}$ is used to compute the intermediate relabeling matrix $\bar{R}$. Computing the intermediate relabeling matrix $\bar{R}$ includes setting $$\bar{R} = \begin{pmatrix} I & 0 \\ \bar{A}_{L,in,x} & I \end{pmatrix}$$

Thus, the measurement outcomes of the logical instrument specification 210 and the adjusted logical instrument specification 270 are related as $\bar{r} = s \oplus \bar{r}_L = \bar{R}(s \oplus r_L)$. In addition, the processor 22 is further configured to compute the logical instrument relabeling matrix based at least in part on the intermediate relabeling matrix $\bar{R}$ and the input change-of-generators bit matrix $B_{in}$. The processor 22 is configured to set $R_L = \bar{R}B_{in}^{-1}$, thereby resulting in the labeling map $s \oplus r_L = R_L r$.

The processor is further configured to compute the plurality of logical instrument bit matrices 214 based at least in part on the plurality of split representation adjustment bit matrices and the intermediate relabeling matrix. The processor 22 is configured to compute the third logical instrument bit matrix $\tilde{A}_x$ by setting $\tilde{A}_x = (\bar{A}_{Q,in,x} | I_{\tilde{k}_{in} - k} | I_l) + \bar{A}_x (\bar{R} | I_l) + (\bar{A}_{Q,in,x} | I_{\tilde{k}_{in} - k} | I_l)$. The processor 22 is further configured to compute the fourth logical instrument bit matrix $\tilde{A}_z$ by setting $\tilde{A}_z = (\overline{A}_{Q,in,z} | I_{\tilde{k}_{in}-k} | I_l) + \overline{A}_z(\overline{R} | I_l)) + (\overline{A}_{Q,in,z} | I_{\tilde{k}_{in}-k} | I_l)$. In addition, the processor is further configured to set $\tilde{A}_S = \overline{A}_S$ $(\overline{R} | I_l)$ and $\tilde{A}_L = \overline{A}_L(\overline{R} | I_l) + \overline{A}_{L,out,x}$ to compute the first logical instrument bit $\tilde{A}_S$ and the second logical instrument bit matrix $\tilde{R}_L$.

By performing the steps discussed above, the processor 22 is configured to compute each of the components of the logical instrument specification 210, thereby mapping the standardized stabilizer instrument specification 50 to the logical instrument specification 210. The processor 22 is therefore configured to compute the logical action 212 performed by the physical-qubit-level stabilizer instrument expressed in the standardized stabilizer instrument specification 50. The processor 22 is further configured to store the logical instrument specification 210 in the memory 24.

FIG. 15A shows a flowchart of a method 300 for use with a computing system to compute a logical instrument specification from a standardized stabilizer instrument specification. At step 302, the method 300 includes receiving a standardized stabilizer instrument specification including an input Clifford unitary, an output Clifford unitary, and a plurality of stabilizer instrument bit matrices. The standardized stabilizer instrument specification encodes a stabilizer instrument that may be implemented by a stabilizer circuit at a quantum computing device. In some examples, the standardized stabilizer instrument specification further includes a relabeling matrix that maps qubit labels of the stabilizer circuit to qubit labels of the stabilizer instrument. The plurality of stabilizer instrument bit matrices may include a first stabilizer instrument bit matrix, a second stabilizer instrument bit matrix, and a third stabilizer instrument bit matrix. At step 304, the method 300 further includes receiving a logical instrument input error correction code and a logical instrument output error correction code. The logical instrument input error correction code may include a logical instrument input code Clifford unitary, and the logical instrument output error correction code may include a logical instrument output code Clifford unitary.

At step 306, the method 300 further includes computing a logical instrument specification based at least in part on the standardized stabilizer instrument specification, the logical instrument input error correction code, and the logical instrument output error correction code. The logical instrument specification includes a logical input Clifford unitary, a logical output Clifford unitary, a plurality of logical instrument bit matrices, and a logical instrument relabeling matrix. In some examples, the plurality of logical instrument bit matrices may include a first logical instrument bit matrix, a second logical instrument bit matrix, a third logical instrument bit matrix, and a fourth logical instrument bit matrix. At step 308, the method 300 further includes storing the logical instrument specification in memory.

FIG. 15B shows additional steps of the method 300 that may be performed in some examples when computing the logical instrument specification at step 306. At step 310, step 306 may include the logical instrument specification is generated at least in part by computing an intermediate input error correction code and an intermediate output error correction code. The intermediate input error correction code and the intermediate output error correction code may, in some examples, respectively map the logical instrument input error correction code and the logical instrument output error correction code to a stabilizer instrument input error correction code and a stabilizer instrument output error correction code of the stabilizer instrument specification. In such examples, the stabilizer instrument input error correction code may be a subset of the logical instrument input error correction code, and the stabilizer instrument output error correction code is a subset of the logical instrument output error correction code.

Computing the intermediate input error correction code and the intermediate output error correction code at step 310 may include, at step 312, computing an input change-of-generators bit matrix based at least in part on the input Clifford unitary and the logical instrument input code Clifford unitary included in the logical instrument input error correction code. In addition, step 310 may further include, at step 314, computing an output change-of-generators bit matrix based at least in part on the output Clifford unitary and the logical instrument output code Clifford unitary included in the logical instrument output error correction code. At step 316, step 310 may further include computing the intermediate input error correction code and the intermediate output error correction code based at least in part on the input change-of-generators bit matrix and the output change-of-generators bit matrix.

FIG. 15C shows further steps of the method 300 that may be performed in examples in which the input change-of-generators bit matrix and the output change-of-generators bit matrix are computed at steps 312 and 314. At step 318, the method 300 may further include computing a plurality of input representation adjustment matrices based at least in part on the input change-of-generators bit matrix. The plurality of input representation adjustment matrices may include a first input representation adjustment bit matrix, a second input representation adjustment bit matrix, and the logical input Clifford unitary. At step 320, the method may further include computing a plurality of output representation adjustment matrices based at least in part on the output change-of-generators bit matrix. The plurality of output representation adjustment matrices may include a first output representation adjustment bit matrix, a second output representation adjustment bit matrix, and the logical output Clifford unitary.

At step 322, the method 300 may further include computing a plurality of split representation adjustment bit matrices based at least in part on the plurality of input representation adjustment matrices and the plurality of output representation adjustment matrices. When the split representation adjustment bit matrices are computed, the first input representation adjustment bit matrix, the second input representation adjustment bit matrix, the first output representation adjustment bit matrix, and the second output representation adjustment bit matrix may each be split into a portion that implements a logical action and a portion that acts on preserved qubits, respectively.

At step 324, the method 300 may further include computing an intermediate relabeling matrix based at least in part on the plurality of split representation adjustment bit matrices. In addition, at step 326, the method 300 may further include computing the logical instrument relabeling matrix based at least in part on the intermediate relabeling matrix and the input change-of-generators bit matrix. The method 300 may further include, at step 328, computing the plurality of logical instrument bit matrices based at least in part on the plurality of split representation adjustment bit matrices and the intermediate relabeling matrix. Thus, each of the components of the logical instrument specification may be computed.

As discussed in further detail below, the processor 22 is further configured to compare pairs of standardized stabilizer instrument specifications 50 to determine whether those standardized stabilizer instrument specifications 50 are equal up to measurement outcome relabeling. When the standardized stabilizer instrument specifications 50 are equal, the processor 22 may also compute a between-instrument relabeling matrix for the pair of standardized stabilizer instrument specifications 50. When the standardized stabilizer instrument specifications 50 are not equal, the processor 22 may be configured to instead compute information indicating differences between the standardized stabilizer instrument specifications 50. Such information may, for example, be used to identify an error when the error correction protocol 32 is performed.

Figure 16:
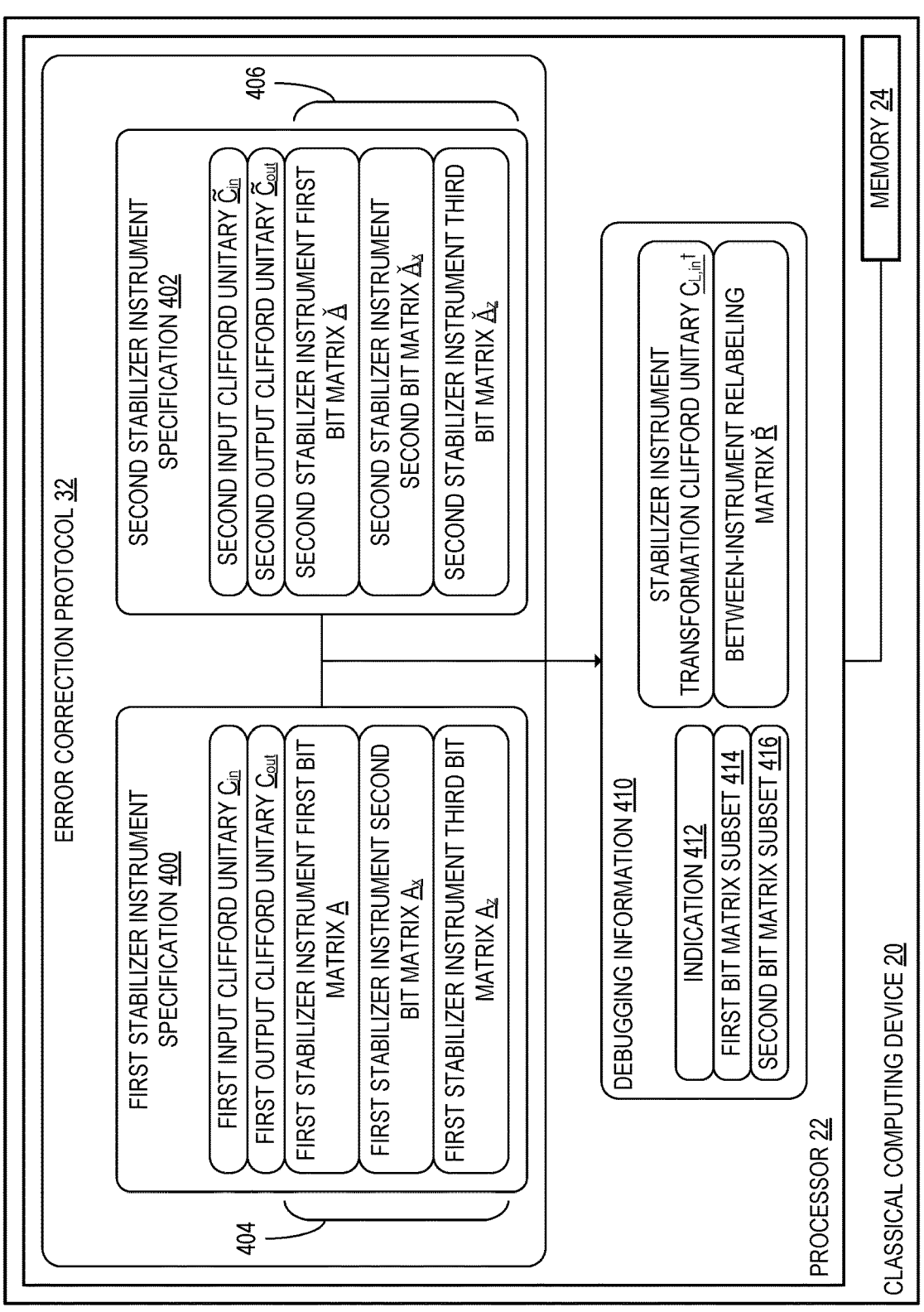
FIG. 16 schematically shows the classical computing device when the processor is configured to perform equality determination on a first stabilizer instrument specification of a first stabilizer instrument and a second stabilizer instrument specification of a second stabilizer instrument, according to the example of FIG. 2A.

FIG. 16 schematically shows the classical computing device 20 when the processor 22 is configured to perform equality determination on a first stabilizer instrument specification 400 of a first stabilizer instrument and a second stabilizer instrument specification 402 of a second stabilizer instrument. The first stabilizer instrument and the second stabilizer instrument both have the same number $k_{in}$ of input qubits and the same number $k_{out}$ of output qubits. The first stabilizer instrument specification 400 includes a first input Clifford unitary $C_{in}$, a first output Clifford unitary $C_{out}$, and a plurality of first stabilizer instrument bit matrices 404. The plurality of first stabilizer instrument bit matrices 404 may include a first stabilizer instrument first bit matrix A, a first stabilizer instrument second bit matrix $A_x$, and a first stabilizer instrument third bit matrix $A_z$. The second stabilizer instrument specification 402 includes a second input Clifford unitary $\check{C}_{in}$, a second output Clifford unitary $\check{C}_{out}$, and a plurality of second stabilizer instrument bit matrices 406. The plurality of second stabilizer instrument bit matrices 406 may include a second stabilizer instrument first bit matrix Ǎ, a second stabilizer instrument second bit matrix $\check{A}_x$, and a second stabilizer instrument third bit matrix $\check{A}_z$.

Based at least in part on the first stabilizer instrument specification 400 and the second stabilizer instrument specification 402, the processor 22 is further configured to determine whether the first stabilizer instrument is equal to the second stabilizer instrument up to measurement outcome relabeling. In addition, the processor 22 is further configured to output an indication 412 of whether the first stabilizer instrument is equal to the second stabilizer instrument up to measurement outcome relabeling. In some examples, the processor 22 may be configured to determine whether the first stabilizer instrument is equal to the second stabilizer instrument, up to measurement outcome relabeling, when executing the error correction protocol 32 of the quantum computing device 10 as discussed above. In such examples, the indication 412 of whether the first stabilizer instrument is equal to the second stabilizer instrument up to measurement outcome relabeling may be included in debugging information 410 generated as an output of the error correction protocol 32.

Figure 17:
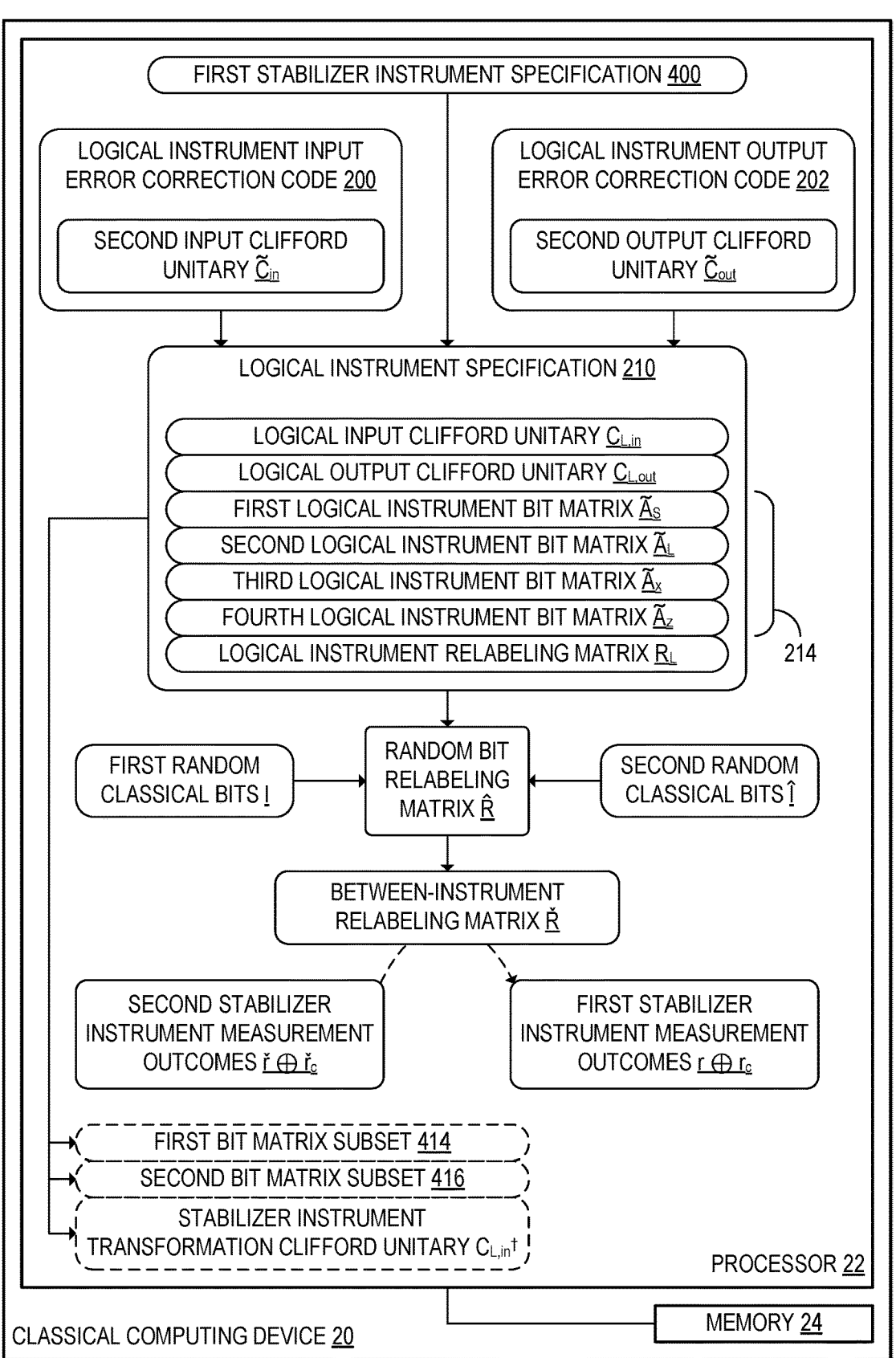
FIG. 17 schematically shows the classical computing device when the processor is configured to compute a logical instrument specification when performing equality determination on the first stabilizer instrument specification and the second stabilizer instrument specification, according to the example of FIG. 16.

FIG. 17 shows the classical computing device 20 when the processor 22 determines whether the first stabilizer instrument is equal to the second stabilizer instrument up to measurement outcome relabeling. The processor 22, as shown in the example of FIG. 17, is configured to compute a logical instrument specification 210 based at least in part on the first stabilizer instrument specification 400. The logical instrument specification 210 may be computed using the techniques discussed above. The logical instrument specification 210 may include a logical input Clifford unitary $C_{L,in}$, a logical output Clifford unitary $C_{L,out}$, a plurality of logical instrument bit matrices 214, and a logical instrument relabeling matrix $R_L$. The inputs with which the processor 22 computes the logical instrument specification 210 may further include a logical instrument input error correction code 200 including the second input Clifford unitary $\check{C}_{in}$ in and a logical instrument output error correction code 202 including the second output Clifford unitary $\check{C}_{out}$. The logical instrument input error correction code 200 may be expressed as $[\![ k_{in}, k, \check{C}_{in} ]\!]$, and the logical instrument output error correction code 202 may be expressed as $[\![ k_{out}, k, \check{C}_{out} ]\!]$.

When the processor 22 computes the logical instrument specification 210 using the above logical instrument input error correction code 200 and logical instrument output error correction code 202, the logical action 212 is a unitary operator with Pauli corrections. Thus, in the logical instrument specification 210, $r_L$ is a zero-dimensional vector and the second logical instrument bit matrix $\tilde{A}_L$ has zero rows. By computing the logical instrument specification 210, processor 22 computes the logical input Clifford unitary $C_{L,in}$ and the logical output Clifford unitary $C_{L,out}$. In addition, the processor 22 computes the first, third, and fourth logical instrument bit matrices $\tilde{A}_S$, $\tilde{A}_x$, and $\tilde{A}_z$ included in the logical instrument specification 210.

In examples in which $C_{L,in} \neq C_{L,out}$, the processor 22 is configured to return the result that the first stabilizer instrument and the second stabilizer instrument are not equal up to measurement outcome relabeling. Thus, in such examples, the indication indicates that the first stabilizer instrument is not equal to the second stabilizer instrument. In addition, the processor 22 may be further configured to output a stabilizer instrument transformation Clifford unitary $$C_{L,in}^\dagger \neq C_{L,out}.$$

The stabilizer instrument transformation Clifford unitary, in such examples, is a logical action 212 on the preserved qubits by which the first stabilizer instrument and the second stabilizer instrument differ when the measurement outcomes of the first stabilizer instrument and the second stabilizer instrument are zero. Thus, the stabilizer instrument transformation Clifford unitary $$C_{L,in}^\dagger$$

maps the first stabilizer instrument to the second stabilizer instrument. In such examples, the processor 22 is further configured to output the stabilizer instrument transformation Clifford unitary $C_{L,in}^\dagger$.

As shown in the example of FIG. 17, the first stabilizer instrument may be configured to receive a plurality of first random classical bits l. In addition, the second stabilizer instrument may be configured to receive a plurality of second random classical bits I. When the first stabilizer instrument and the second stabilizer instrument are equal up to measurement outcome relabeling, both stabilizer instruments apply the same linear maps to their inputs for outcomes $r \otimes r_c = \hat{R}(\tilde{r} \otimes \tilde{r}_c)$. $\hat{R}$ in this equation is a between-instrument relabeling matrix. Thus, the between-instrument relabeling matrix $\hat{R}$ maps a plurality of measurement outcomes $\tilde{r} \otimes \tilde{r}_c$ performed at the second stabilizer instrument to measurement outcomes performed at the first stabilizer instrument $r \otimes r_c$. In examples in which the first stabilizer instrument is equal to the second stabilizer instrument up to measurement outcome relabeling, the processor 22 may be further configured to compute and output the between-instrument relabeling matrix $\hat{R}$.

Steps by which the processor 22 may be configured to compute the between-instrument relabeling matrix $\hat{R}$ are discussed below. The processor 22 may be further configured to compute matrices $\hat{A}_x$ and $\hat{A}_z$ by solving the following equation:

$$C_{in,L}^{\dagger} X^{\tilde{A}_x \tilde{r}} Z^{\tilde{A}_z \tilde{r}} C_{out,L} = X^{\tilde{A}_x \tilde{r}} Z^{\tilde{A}_z \tilde{r}}$$

The processor 22 is further configured to compute a random bit relabeling matrix $\hat{R}$ based at least in part on the plurality of logical instrument bit matrices 214 and the logical instrument relabeling matrix $R_L$. The random bit relabeling matrix $\hat{R}$ maps the second plurality of random classical bits I to the first plurality of random classical bits l according to the equation $r_c = \hat{R} \check{r}_c$. The matrix $\hat{R}$ is obtained by solving the following equations:

$$\tilde{A}_S (I_{k_{in}-k} | \hat{R}) = \check{A}$$

$$\tilde{A}_x (I_{k_{in}-k} | \hat{R}) = \check{A}_x$$

$$\tilde{A}_z (I_{k_{in}-k} | \hat{R}) = \check{A}_z$$

In examples in which there does not exist a random bit relabeling matrix $\hat{R}$ that solves the above system of equations, the processor 22 may be configured to output indications of whether solutions exist for each of $\check{A}$, $\check{A}_x$, and $\check{A}_z$. Thus, in such examples, the processor 22 may be further configured to compute a second bit matrix subset 416 of the plurality of second stabilizer instrument bit matrices 406 that is equal to a corresponding first bit matrix subset 414 of the plurality of first stabilizer instrument bit matrices 404 up to measurement outcome relabeling. The processor 22 may be further configured to output the first bit matrix subset 414 and the second bit matrix subset 416 in the debugging information 410. Using the first bit matrix subset 414 and the second bit matrix subset 416, the user may identify a potential source of error in a circuit that implements the first stabilizer instrument or the second stabilizer instrument.

The processor 22 is further configured to compute the between-instrument relabeling matrix $\hat{R}$ by setting $$\check{R} = (R_L^{-1} | \hat{R}).$$

Accordingly, in examples in which the first stabilizer instrument and the second stabilizer instrument are equal up to measurement outcome relabeling, the processor 22 may be configured to output the between-instrument relabeling matrix $\check{R}$, and in examples in which the first stabilizer instrument and the second stabilizer instrument are not equal, the processor 22 may be configured to output information via which the user may identify differences between the stabilizer instruments.

FIG. 18A shows a flowchart of a method 500 for use with a computing system to determine whether a pair of stabilizer instruments are equal up to measurement outcome relabeling. At step 502, the method 500 includes receiving a first stabilizer instrument specification of a first stabilizer instrument. The first stabilizer instrument specification includes a first input Clifford unitary, a first output Clifford unitary, and a plurality of first stabilizer instrument bit matrices. The plurality of first stabilizer instrument bit matrices may, for example, include a first stabilizer instrument first bit matrix, a first stabilizer instrument second bit matrix, and a first stabilizer instrument third bit matrix. At step 504, the method 500 further includes receiving a second stabilizer instrument specification of a second stabilizer instrument. The second stabilizer instrument specification includes a second input Clifford unitary, a second output Clifford unitary, and a plurality of second stabilizer instrument bit matrices. The plurality of second stabilizer instrument bit matrices may include a second stabilizer instrument first bit matrix, a second stabilizer instrument second bit matrix, and a second stabilizer instrument third bit matrix.

At step 506, the method 500 further includes determining, based at least in part on the first stabilizer instrument specification and the second stabilizer instrument specification, whether the first stabilizer instrument is equal to the second stabilizer instrument up to measurement outcome relabeling. In addition, at step 508, the method 500 further includes outputting an indication of whether the first stabilizer instrument is equal to the second stabilizer instrument up to measurement outcome relabeling. The indication may, for example, be output to a user interface or to some other computing process.

FIG. 18B shows additional steps of the method 500 of FIG. 18A that may be performed in some examples. At step 510, the method 500 may include executing an error correction protocol of a quantum computing device. Executing the error correction protocol may, for example, include generating error correction instructions at a classical computing device communicatively coupled to the quantum computing device. The quantum computing device may execute the error correction instructions to resolve one or more errors in a quantum computation. At step 512, the method 500 may further include generating debugging information as an output of the error correction protocol. In the example of FIG. 18B, the indication of whether the first stabilizer instrument is equal to the second stabilizer instrument up to measurement outcome relabeling may be included in the debugging information. The debugging information may, for example, be used when generating the error correction instructions. Step 512 may be performed when determining whether the first stabilizer instrument is equal to the second stabilizer instrument at step 506.

In some examples, the debugging information is generated at step 512, the method 500 may further include step 514. Step 514 may be performed in examples in which the indication indicates that the first stabilizer instrument is not equal to the second stabilizer instrument. At step 514, the method 500 may further include computing a second bit matrix subset of the plurality of second stabilizer instrument bit matrices that is equal to a corresponding first bit matrix subset of the plurality of first stabilizer instrument bit matrices up to measurement outcome relabeling. Thus, subsets of the first and second stabilizer instrument bit matrices for which errors do not occur may be identified.

Step 512 may additionally or alternatively include step 516 in some examples. Step 516 may also be performed in examples in which the indication indicates that the first stabilizer instrument is not equal to the second stabilizer instrument up to measurement outcome relabeling. At step 516, the method 500 may further include computing a stabilizer instrument transformation Clifford unitary that maps the first stabilizer instrument to the second stabilizer instrument. Accordingly, the Clifford unitary by which the stabilizer instruments differ may be computed in examples in which the first and second stabilizer instruments are not equal up to measurement outcome relabeling.

At step 518, the method 500 further includes outputting the debugging information. Thus, outputting the debugging information at step 518 may include outputting the indication at step 508. Outputting the debugging information may, at step 520, include outputting the first bit matrix subset and the second bit matrix subset in examples in which step 514 is performed. Additionally or alternatively, in examples in which step 516 is performed, outputting the debugging information at step 518 may include, at step 522, outputting the stabilizer instrument transformation Clifford unitary.

Figure 18C:
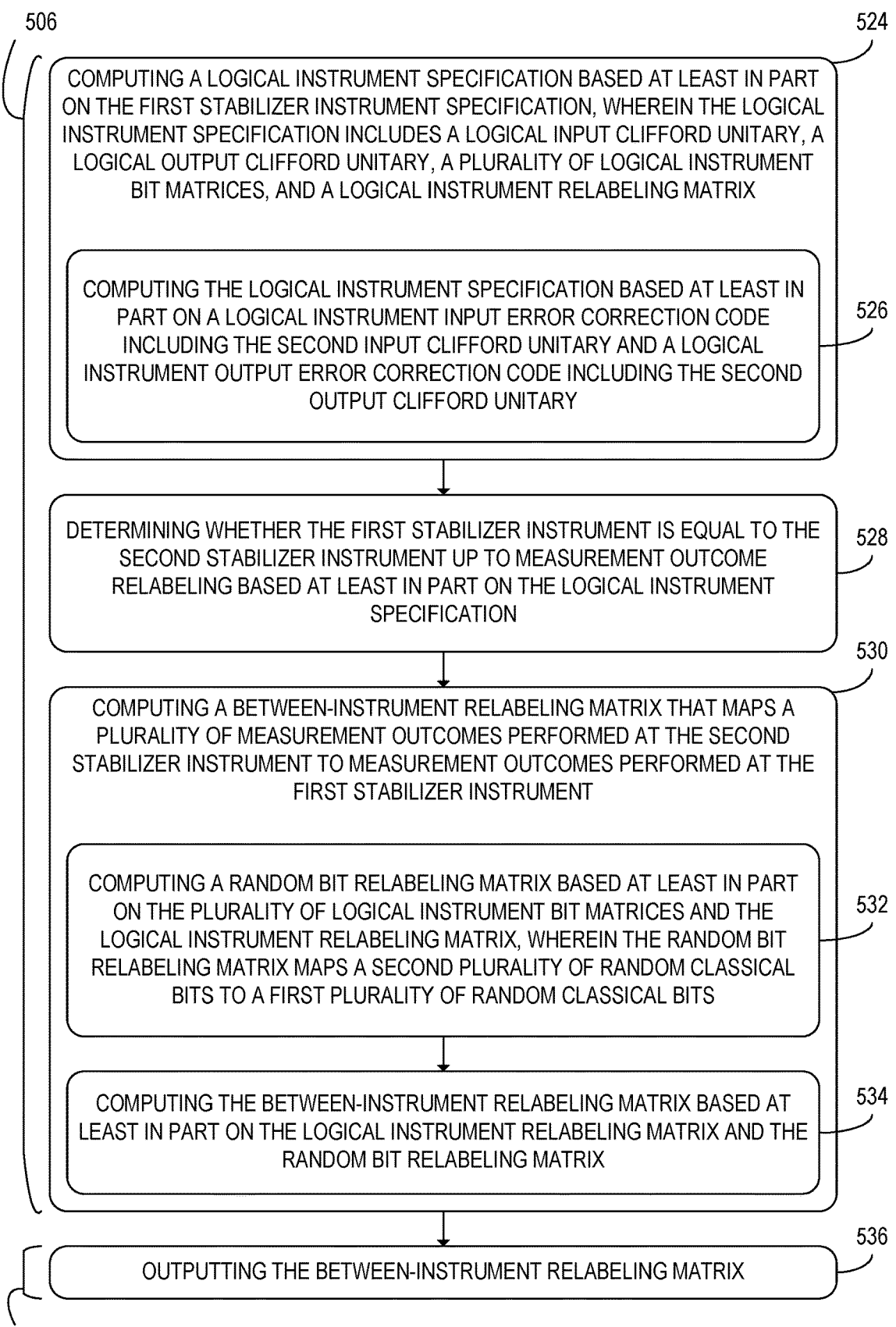

FIG. 18C shows additional steps of the method 500 that may be performed in some examples when determining whether the first stabilizer instrument is equal to the second stabilizer instrument at step 506. At step 524, the method 500 may further include computing a logical instrument specification based at least in part on the first stabilizer instrument specification. The logical instrument specification includes a logical input Clifford unitary, a logical output Clifford unitary, a plurality of logical instrument bit matrices, and a logical instrument relabeling matrix. In some examples, the steps of the method 300 shown in FIGS. 15A-15C may be used to compute the logical instrument specification. In some examples, at step 526, step 524 may include computing the logical instrument specification based at least in part on a logical instrument input error correction code including the second input Clifford unitary and a logical instrument output error correction code including the second output Clifford unitary.

At step 528, the method 500 may further include determining whether the first stabilizer instrument is equal to the second stabilizer instrument up to measurement outcome relabeling based at least in part on the logical instrument specification. For example, step 528 may include computing a logical input Clifford unitary, a logical output Clifford unitary, a first logical instrument bit matrix, a second logical instrument bit matrix, a third logical instrument bit matrix, a fourth logical instrument bit matrix, and a logical instrument relabeling matrix.

At step 530, the method 500 may further include computing a between-instrument relabeling matrix that maps a plurality of measurement outcomes performed at the second stabilizer instrument to measurement outcomes performed at the first stabilizer instrument. Step 530 may be performed in examples in which the indication indicates that the first stabilizer instrument is equal to the second stabilizer instrument up to measurement outcome relabeling.

In some examples, inputs to the first stabilizer instrument and the second stabilizer instrument may respectively include a first plurality of random classical bits and a second plurality of random classical bits. In such examples, at step 532, computing the between-instrument relabeling matrix at step 530 may include computing a random bit relabeling matrix based at least in part on the plurality of logical instrument bit matrices and the logical instrument relabeling matrix. The random bit relabeling matrix computed in such examples maps the second plurality of random classical bits to the first plurality of random classical bits. At step 534, step 530 may further include computing the between-instrument relabeling matrix based at least in part on the logical instrument relabeling matrix and the random bit relabeling matrix. The logical instrument relabeling matrix may also be used when computing the between-instrument relabeling matrix.

At step 536, the method 500 may further include outputting the between-instrument relabeling matrix. The between-instrument relabeling matrix may be output along with the indication when the first stabilizer instrument is determined to be equal to the second stabilizer instrument up to measurement outcome relabeling. In some examples, the between-instrument relabeling matrix may be included in the debugging information.

Using the systems and methods discussed above, the stabilizer instrument implemented by a stabilizer circuit may be checked for equality, up to measurement outcome relabeling, with another stabilizer instrument. The other stabilizer instrument may, for example, be a stabilizer instrument intended by a developer of the quantum computing device. In such examples, as part of an error correction protocol, the computing system may be configured to determine whether the quantum computing device correctly implements the intended stabilizer instrument. When an error occurs in the implementation of the stabilizer instrument, the computing system may further output additional debugging information that may be used to identify the source of the error. Thus, the stabilizer instrument equality determination method discussed above may allow for more reliable error correction at the stabilizer circuit.

In some embodiments, the methods and processes described herein may be tied to a computing system of one or more computing devices. In particular, such methods and processes may be implemented as a computer-application program or service, an application-programming interface (API), a library, and/or other computer-program product.

Figure 19:
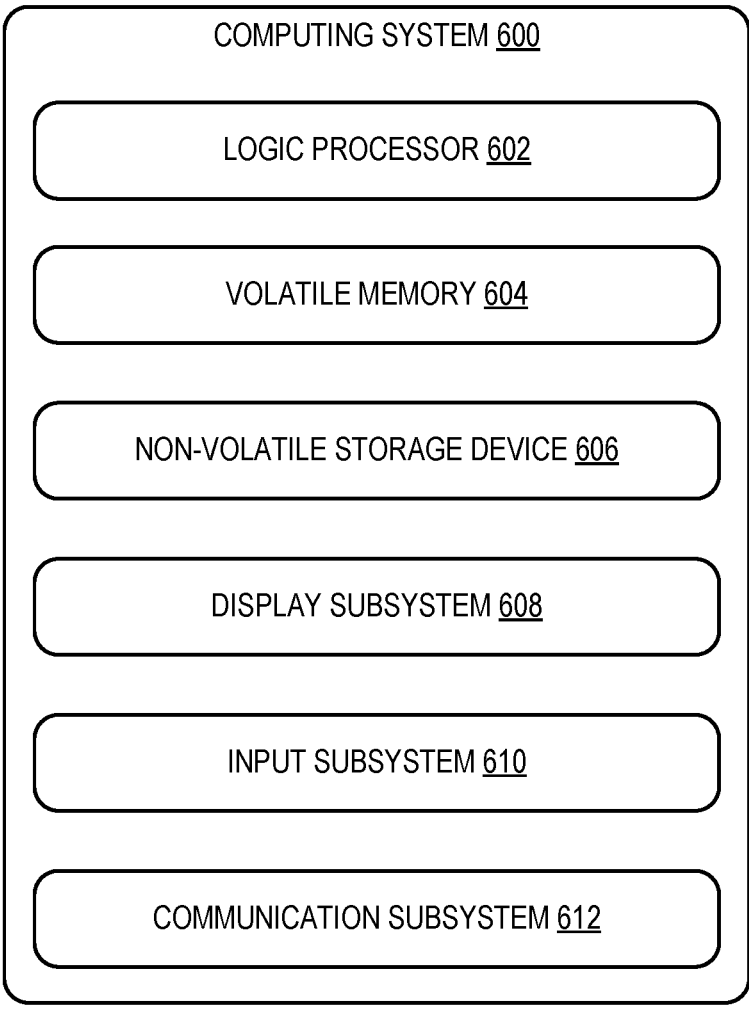
FIG. 19 shows a schematic view of an example computing environment in which the computing system of FIG. 1 may be instantiated.

FIG. 19 schematically shows a non-limiting embodiment of a computing system 600 that can enact one or more of the methods and processes described above.

Computing system 600 is shown in simplified form. Computing system 600 may embody the computing system 1 described above and illustrated in FIG. 1. Components of the computing system 600 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 600 includes a logic processor 602 volatile memory 604, and a non-volatile storage device 606. Computing system 600 may optionally include a display sub system 608, input sub system 610, communication sub system 612, and/or other components not shown in FIG. 19.

Logic processor 602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 may be transformed—e.g., to hold different data.

Non-volatile storage device 606 may include physical devices that are removable and/or built-in. Non-volatile storage device 606 may include optical memory, semiconductor memory, and/or magnetic memory, or other mass storage device technology. Non-volatile storage device 606 may include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 may include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 608 may be used to present a visual representation of data held by non-volatile storage device 606. The visual representation may take the form of a graphical user interface (GUI). As the herein described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices.

When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

The following paragraphs discuss several aspects of the present disclosure. According to one aspect of the present disclosure, a computing system is provided, including a processor configured to receive a stabilizer circuit specification of a stabilizer circuit that includes one or more elementary operations. The one or more elementary operations are each selected from the group consisting of: an allocation of one or more qubits in a stabilizer state; an allocation of one or more random classical bits; a Clifford unitary; a Pauli unitary conditional on one or more respective parities of one or more measurement outcomes and/or one or more respective parities of the one or more random classical bits; a joint multi-qubit Pauli measurement; and a destructive one-qubit Pauli measurement. The processor is further configured to compute a standardized stabilizer instrument specification of a stabilizer instrument based at least in part on the stabilizer circuit specification. The standardized stabilizer instrument specification includes an input Clifford unitary, an output Clifford unitary, and a plurality of bit matrices. The processor is further configured to store the standardized stabilizer instrument specification in memory. The above features may have the technical effects of determining and compactly storing a specification of the behavior of a stabilizer circuit.

According to this aspect, the plurality of bit matrices may include a first bit matrix, a second bit matrix, and a third bit matrix. The above features may have the technical effect of encoding transformations implemented by the stabilizer circuit.

According to this aspect, the processor may be configured to compute the standardized stabilizer instrument specification at least in part by computing a Choi state family of the stabilizer instrument. The processor may be further configured to compute the standardized stabilizer instrument specification based at least in part on the Choi state family. The above features may have the technical effect of efficiently computing the standardized stabilizer instrument specification.

According to this aspect, the processor may be further configured to compute a zero-input-qubit stabilizer circuit specification based at least in part on the stabilizer circuit specification. The processor may be further configured to compute the Choi state family as the Choi state family of the zero-input-qubit stabilizer circuit specification. The above features may have the technical effect of converting the stabilizer circuit specification into a form in which the standardized stabilizer instrument specification may be efficiently computed.

According to this aspect, the processor may be configured to compute the zero-input-qubit stabilizer circuit specification at least in part by coupling each of one or more input qubits of the stabilizer circuit specification to a respective Bell pair. The above features may have the technical effect of converting the stabilizer circuit specification into a form in which the standardized stabilizer instrument specification may be efficiently computed.

According to this aspect, the Choi state family is parameterized at least in part by a Choi state input-output Clifford unitary and a Choi state bit matrix. The above features may have the technical effect of encoding the Choi state family of the stabilizer circuit in a compact and efficiently processable form.

According to this aspect, when computing the standardized stabilizer instrument specification based at least in part on the Choi state family, the processor may be further configured to compute an additional Clifford unitary and an invertible bit matrix at least in part by computing a partition of the Choi state input-output Clifford unitary. The invertible bit matrix may be a transformation matrix from the Choi state input-output Clifford unitary into the additional Clifford unitary. The processor may be further configured to compute the input Clifford unitary and the output Clifford unitary based at least in part on the additional Clifford unitary. The above features may have the technical effect of efficiently computing portions of the standardized stabilizer instrument specification using the Choi state family.

According to this aspect, when computing the standardized stabilizer instrument specification based at least in part on the Choi state family, the processor may be further configured to compute a plurality of additional bit matrices based at least in part on the Choi state bit matrix, the additional Clifford unitary and an inversion of the invertible bit matrix. The processor may be further configured to compute the plurality of bit matrices based at least in part on the plurality of additional bit matrices. The above features may have the technical effect of efficiently computing portions of the standardized stabilizer instrument specification using the Choi state family.

According to this aspect, the processor may be further configured to compute a relabeling matrix that maps one or more stabilizer circuit qubit labels of the stabilizer circuit to one or more respective stabilizer instrument qubit labels of the stabilizer instrument. The processor may be further configured to compute the plurality of bit matrices based at least in part on the relabeling matrix. The above features may have the technical effects of efficiently computing portions of the standardized stabilizer instrument specification and of mapping qubit labels of the stabilizer circuit to qubit labels of the standardized stabilizer instrument specification.

According to this aspect, the processor may be configured to compute the standardized stabilizer instrument specification at least in part by iteratively incorporating the elementary operations included in the stabilizer circuit specification into the standardized stabilizer instrument specification, starting from a zero-operation stabilizer instrument specification. The above features may have the technical effect of computing the standardized stabilizer instrument specification in polynomial time as a function of circuit length and number of qubits included.

According to another aspect of the present disclosure, a method for use with a computing system is provided. The method includes receiving a stabilizer circuit specification of a stabilizer circuit that includes one or more elementary operations. The one or more elementary operations are each selected from the group consisting of an allocation of one or more qubits in a stabilizer state; an allocation of one or more random classical bits; a Clifford unitary; a Pauli unitary conditional on one or more respective parities of one or more measurement outcomes and/or one or more respective parities of the one or more random classical bits; a joint multi-qubit Pauli measurement; and a destructive one-qubit Pauli measurement. The method further includes computing a standardized stabilizer instrument specification of a stabilizer instrument based at least in part on the stabilizer circuit specification, wherein the standardized stabilizer instrument specification includes an input Clifford unitary, an output Clifford unitary, and a plurality of bit matrices. The method further includes storing the standardized stabilizer instrument specification in memory. The above features may have the technical effects of determining and compactly storing a specification of the behavior of a stabilizer circuit.

According to this aspect, the plurality of bit matrices may include a first bit matrix, a second bit matrix, and a third bit matrix. The above features may have the technical effect of encoding transformations implemented by the stabilizer circuit.

According to this aspect, computing the standardized stabilizer instrument specification may include computing a Choi state family of the stabilizer instrument and computing the standardized stabilizer instrument specification based at least in part on the Choi state family. The above features may have the technical effect of efficiently computing the standardized stabilizer instrument specification.

According to this aspect, computing the standardized stabilizer instrument specification may further include computing a zero-input-qubit stabilizer circuit specification based at least in part on the stabilizer circuit specification. Computing the standardized stabilizer instrument specification may further include computing the Choi state family as the Choi state family of the zero-input-qubit stabilizer circuit specification. The above features may have the technical effect of converting the stabilizer circuit specification into a form in which the standardized stabilizer instrument specification may be efficiently computed.

According to this aspect, computing the zero-input-qubit stabilizer circuit specification may include coupling each of one or more input qubits of the stabilizer circuit specification to a respective Bell pair. The above features may have the technical effect of converting the stabilizer circuit specification into a form in which the standardized stabilizer instrument specification may be efficiently computed.

According to this aspect, the Choi state family may be parameterized at least in part by a Choi state input-output Clifford unitary and a Choi state bit matrix. The above features may have the technical effect of encoding the Choi state family of the stabilizer circuit in a compact and efficiently processable form.

According to this aspect, the method may further include, when computing the standardized stabilizer instrument specification based at least in part on the Choi state family, computing an additional Clifford unitary and an invertible bit matrix at least in part by computing a partition of the Choi state input-output Clifford unitary. The invertible bit matrix may be a transformation matrix from the Choi state input-output Clifford unitary into the additional Clifford unitary. The method may further include computing the input Clifford unitary and the output Clifford unitary based at least in part on the additional Clifford unitary. The above features may have the technical effect of efficiently computing portions of the standardized stabilizer instrument specification using the Choi state family.

According to this aspect, the method may further include, when computing the standardized stabilizer instrument specification based at least in part on the Choi state family, computing a plurality of additional bit matrices based at least in part on the Choi state bit matrix, the additional Clifford unitary and an inversion of the invertible bit matrix. The method may further include computing the plurality of bit matrices based at least in part on the plurality of additional bit matrices. The above features may have the technical effect of efficiently computing portions of the standardized stabilizer instrument specification using the Choi state family.

According to this aspect, the method may further include computing a relabeling matrix that maps one or more stabilizer circuit qubit labels of the stabilizer circuit to one or more respective stabilizer instrument qubit labels of the stabilizer instrument. The method may further include computing the plurality of bit matrices based at least in part on the relabeling matrix. The above features may have the technical effects of efficiently computing portions of the standardized stabilizer instrument specification and of mapping qubit labels of the stabilizer circuit to qubit labels of the standardized stabilizer instrument specification.

According to another aspect of the present disclosure, a computing system is provided, including a processor configured to receive a stabilizer circuit specification of a stabilizer circuit. The processor is further configured to compute a standardized stabilizer instrument specification of a stabilizer instrument based at least in part on the stabilizer circuit specification. The standardized stabilizer instrument specification includes an input Clifford unitary, an output Clifford unitary, a first bit matrix, a second bit matrix, and a third bit matrix. Computing the standardized stabilizer instrument specification includes computing a Choi state family of the stabilizer instrument and computing the standardized stabilizer instrument specification based at least in part on the Choi state family. The processor is further configured to store the standardized stabilizer instrument specification in memory. The above features may have the technical effects of determining and compactly storing a specification of the behavior of a stabilizer circuit.

According to another aspect of the present disclosure, a computing system is provided, including a processor configured to receive a standardized stabilizer instrument specification including an input Clifford unitary, an output Clifford unitary, and a plurality of stabilizer instrument bit matrices. The processor is further configured to receive a logical instrument input error correction code and a logical instrument output error correction code. The processor is further configured to compute a logical instrument specification based at least in part on the standardized stabilizer instrument specification, the logical instrument input error correction code, and the logical instrument output error correction code. The logical instrument specification includes a logical input Clifford unitary, a logical output Clifford unitary, a plurality of logical instrument bit matrices, and a logical instrument relabeling matrix. The processor is further configured to store the logical instrument specification in memory. The above features may have the technical effect of computing the logical-qubit-level behavior of a physical-qubit-level stabilizer circuit.

According to this aspect, the plurality of stabilizer instrument bit matrices may include a first stabilizer instrument bit matrix, a second stabilizer instrument bit matrix, and a third stabilizer instrument bit matrix. The above features may have the technical effect of encoding physical-qubit-level transformations implemented by the stabilizer circuit.

According to this aspect, the plurality of logical instrument bit matrices may include a first logical instrument bit matrix, a second logical instrument bit matrix, a third logical instrument bit matrix, and a fourth logical instrument bit matrix. The above features may have the technical effect of encoding logical-qubit-level transformations implemented by the stabilizer instrument.

According to this aspect, the processor may be configured to generate the logical instrument specification at least in part by computing an intermediate input error correction code and an intermediate output error correction code. The intermediate input error correction code and the intermediate output error correction code may map the logical instrument input error correction code and the logical instrument output error correction code to a stabilizer instrument input error correction code and a stabilizer instrument output error correction code, respectively. The above features may have the technical effect of computing a mapping between respective error correction codes of the stabilizer instrument and the logical instrument.

According to this aspect, computing the intermediate input error correction code and the intermediate output error correction code may include computing an input change-of-generators bit matrix based at least in part on the input Clifford unitary and a logical instrument input code Clifford unitary included in the logical instrument input error correction code. Computing the intermediate input error correction code and the intermediate output error correction code may further include computing an output change-of-generators bit matrix based at least in part on the output Clifford unitary and a logical instrument output code Clifford unitary included in the logical instrument output error correction code. The processor may be further configured to compute the intermediate input error correction code and the intermediate output error correction code based at least in part on the input change-of-generators bit matrix and the output change-of-generators bit matrix. The above features may have the technical effect of computing the mapping between the respective error correction codes of the stabilizer instrument and the logical instrument.

According to this aspect, the processor may be further configured to compute a plurality of input representation adjustment matrices and a plurality of output representation adjustment matrices based at least in part on the input change-of-generators bit matrix and the output change-of-generators bit matrix. The above features may have the technical effect of computing the mapping between the respective error correction codes of the stabilizer instrument and the logical instrument.

According to this aspect, the plurality of input representation adjustment matrices may include a first input representation adjustment bit matrix, a second input representation adjustment bit matrix, and the logical input Clifford unitary. The plurality of output representation adjustment matrices may include a first output representation adjustment bit matrix, a second output representation adjustment bit matrix, and the logical output Clifford unitary. The above features may have the technical effect of computing the mapping between the respective error correction codes of the stabilizer instrument and the logical instrument.

According to this aspect, the processor may be further configured to compute a plurality of split representation adjustment bit matrices based at least in part on the plurality of input representation adjustment matrices and the plurality of output representation adjustment matrices. The processor may be further configured to compute an intermediate relabeling matrix based at least in part on the plurality of split representation adjustment bit matrices. The processor may be further configured to compute the logical instrument relabeling matrix based at least in part on the intermediate relabeling matrix and the input change-of-generators bit matrix. The above features may have the technical effect of determining qubit relabeling between the standardized stabilizer instrument specification and the logical instrument specification.

According to this aspect, the processor may be further configured to compute the plurality of logical instrument bit matrices based at least in part on the plurality of split representation adjustment bit matrices and the intermediate relabeling matrix. The above features may have the technical effect of computing transformations implemented by the logical instrument.

According to this aspect, the stabilizer instrument input error correction code may be a subset of the logical instrument input error correction code, and the stabilizer instrument output error correction code may be a subset of the logical instrument output error correction code. The above features may have the technical effect of allowing the stabilizer instrument error correction codes to be encoded in terms of the logical instrument error correction codes.

According to another aspect of the present disclosure, a method for use with a computing system is provided. The method includes receiving a standardized stabilizer instrument specification including an input Clifford unitary, an output Clifford unitary, and a plurality of stabilizer instrument bit matrices. The method further includes receiving a logical instrument input error correction code and a logical instrument output error correction code. The method further includes computing a logical instrument specification based at least in part on the standardized stabilizer instrument specification, the logical instrument input error correction code, and the logical instrument output error correction code. The logical instrument specification includes a logical input Clifford unitary, a logical output Clifford unitary, a plurality of logical instrument bit matrices, and a logical instrument relabeling matrix. The method further includes storing the logical instrument specification in memory. The above features may have the technical effect of computing the logical-qubit-level behavior of a physical-qubit-level stabilizer circuit.

According to this aspect, the plurality of stabilizer instrument bit matrices may include a first stabilizer instrument bit matrix, a second stabilizer instrument bit matrix, and a third stabilizer instrument bit matrix. The above features may have the technical effect of encoding physical-qubit-level transformations implemented by the stabilizer circuit.

According to this aspect, the plurality of logical instrument bit matrices may include a first logical instrument bit matrix, a second logical instrument bit matrix, a third logical instrument bit matrix, and a fourth logical instrument bit matrix. The above features may have the technical effect of encoding logical-qubit-level transformations implemented by the stabilizer instrument.

According to this aspect, the logical instrument specification may be generated at least in part by computing an intermediate input error correction code and an intermediate output error correction code. The intermediate input error correction code and the intermediate output error correction code may map the logical instrument input error correction code and the logical instrument output error correction code to a stabilizer instrument input error correction code and a stabilizer instrument output error correction code, respectively. The above features may have the technical effect of computing a mapping between respective error correction codes of the stabilizer instrument and the logical instrument.

According to this aspect, computing the intermediate input error correction code and the intermediate output error correction code may include computing an input change-of-generators bit matrix based at least in part on the input Clifford unitary and a logical instrument input code Clifford unitary included in the logical instrument input error correction code. Computing the intermediate input error correction code and the intermediate output error correction code may further include computing an output change-of-generators bit matrix based at least in part on the output Clifford unitary and a logical instrument output code Clifford unitary included in the logical instrument output error correction code. The method may further include computing the intermediate input error correction code and the intermediate output error correction code based at least in part on the input change-of-generators bit matrix and the output change-of-generators bit matrix. The above features may have the technical effect of computing the mapping between the respective error correction codes of the stabilizer instrument and the logical instrument.

According to this aspect, the method may further include computing a plurality of input representation adjustment matrices and a plurality of output representation adjustment matrices based at least in part on the input change-of-generators bit matrix and the output change-of-generators bit matrix. The above features may have the technical effect of computing the mapping between the respective error correction codes of the stabilizer instrument and the logical instrument.

According to this aspect, the plurality of input representation adjustment matrices may include a first input representation adjustment bit matrix, a second input representation adjustment bit matrix, and the logical input Clifford unitary. The plurality of output representation adjustment matrices may include a first output representation adjustment bit matrix, a second output representation adjustment bit matrix, and the logical output Clifford unitary. The above features may have the technical effect of computing the mapping between the respective error correction codes of the stabilizer instrument and the logical instrument.

According to this aspect, the method may further include computing a plurality of split representation adjustment bit matrices based at least in part on the plurality of input representation adjustment matrices and the plurality of output representation adjustment matrices. The method may further include computing an intermediate relabeling matrix based at least in part on the plurality of split representation adjustment bit matrices. The method may further include computing the logical instrument relabeling matrix based at least in part on the intermediate relabeling matrix and the input change-of-generators bit matrix. The above features may have the technical effect of determining qubit relabeling between the standardized stabilizer instrument specification and the logical instrument specification.

According to this aspect, the method may further include computing the plurality of logical instrument bit matrices based at least in part on the plurality of split representation adjustment bit matrices and the intermediate relabeling matrix. The above features may have the technical effect of computing transformations implemented by the logical instrument.

According to another aspect of the present disclosure, a computing system is provided, including a processor configured to receive a standardized stabilizer instrument specification including an input Clifford unitary, an output Clifford unitary, and a plurality of stabilizer instrument bit matrices. The processor is further configured to receive a logical instrument input error correction code and a logical instrument output error correction code. The processor is further configured to compute a logical instrument specification that includes a logical input Clifford unitary, a logical output Clifford unitary, a plurality of logical instrument bit matrices, and a logical instrument relabeling matrix. Computing the logical instrument specification includes computing an input change-of-generators bit matrix based at least in part on the input Clifford unitary and a logical instrument input code Clifford unitary included in the logical instrument input error correction code. Computing the logical instrument specification further includes computing an output change-of-generators bit matrix based at least in part on the output Clifford unitary and a logical instrument output code Clifford unitary included in the logical instrument output error correction code. Computing the logical instrument specification further includes computing an intermediate input error correction code and a plurality of input representation adjustment matrices based at least in part on the input change-of-generators bit matrix. The plurality of input representation adjustment matrices include a first input representation adjustment bit matrix, a second input representation adjustment bit matrix, and the logical input Clifford unitary. Computing the logical instrument specification further includes computing an intermediate output error correction code and a plurality of output representation adjustment matrices based at least in part on the output change-of-generators bit matrix. The plurality of output representation adjustment matrices include a first output representation adjustment bit matrix, a second output representation adjustment bit matrix, and the logical output Clifford unitary. Computing the logical instrument specification further includes computing a plurality of split representation adjustment bit matrices based at least in part on the plurality of input representation adjustment matrices and the plurality of output representation adjustment matrices. Computing the logical instrument specification further includes computing an intermediate relabeling matrix based at least in part on the plurality of split representation adjustment bit matrices. Computing the logical instrument specification further includes computing the logical instrument relabeling matrix and the plurality of logical instrument bit matrices based at least in part on the intermediate relabeling matrix and the input change-of-generators bit matrix. The processor is further configured to store the logical instrument specification in memory. The above features may have the technical effect of computing the logical-qubit-level behavior of a physical-qubit-level stabilizer circuit.

According to another aspect of the present disclosure, a computing system is provided, including a processor configured to receive a first stabilizer instrument specification of a first stabilizer instrument. The first stabilizer instrument specification includes a first input Clifford unitary, a first output Clifford unitary, and a plurality of first stabilizer instrument bit matrices. The processor is further configured to receive a second stabilizer instrument specification of a second stabilizer instrument. The second stabilizer instrument specification includes a second input Clifford unitary, a second output Clifford unitary, and a plurality of second stabilizer instrument bit matrices. Based at least in part on the first stabilizer instrument specification and the second stabilizer instrument specification, the processor is further configured to determine whether the first stabilizer instrument is equal to the second stabilizer instrument up to measurement outcome relabeling. The processor is further configured to output an indication of whether the first stabilizer instrument is equal to the second stabilizer instrument up to measurement outcome relabeling. The above features may have the technical effect of testing whether a stabilizer instrument implemented by a stabilizer circuit exhibits intended behavior.

According to this aspect, the processor may be configured to determine whether the first stabilizer instrument is equal to the second stabilizer instrument, up to measurement outcome relabeling, when executing an error correction protocol of a quantum computing device. The indication of whether the first stabilizer instrument is equal to the second stabilizer instrument up to measurement outcome relabeling may be included in debugging information generated as an output of the error correction protocol. The processor may be further configured to output the debugging information. The above features may have the technical effect of identifying errors that occur at a stabilizer circuit.

According to this aspect, the plurality of first stabilizer instrument bit matrices may include a first stabilizer instrument first bit matrix, a first stabilizer instrument second bit matrix, and a first stabilizer instrument third bit matrix. The plurality of second stabilizer instrument bit matrices may include a second stabilizer instrument first bit matrix, a second stabilizer instrument second bit matrix, and a second stabilizer instrument third bit matrix. The above features may have the technical effect of encoding transformations performed by the first stabilizer instrument and the second stabilizer instrument.

According to this aspect, the indication may indicate that the first stabilizer instrument is not equal to the second stabilizer instrument. The processor may be further configured to compute a second bit matrix subset of the plurality of second stabilizer instrument bit matrices that is equal to a corresponding first bit matrix subset of the plurality of first stabilizer instrument bit matrices up to measurement outcome relabeling. The processor may be further configured to output the first bit matrix subset and the second bit matrix subset. The above features may have the technical effect of identifying a potential source of error when implementing a stabilizer instrument at a stabilizer circuit.

According to this aspect, the indication may indicate that the first stabilizer instrument is not equal to the second stabilizer instrument. The processor may be further configured to compute a stabilizer instrument transformation Clifford unitary that maps the first stabilizer instrument to the second stabilizer instrument. The processor may be further configured to output the stabilizer instrument transformation Clifford unitary. The above features may have the technical effect of identifying a correction that converts the first stabilizer instrument into the second stabilizer instrument.

According to this aspect, the processor may be further configured to compute a logical instrument specification based at least in part on the first stabilizer instrument specification. The logical instrument specification may include a logical input Clifford unitary, a logical output Clifford unitary, a plurality of logical instrument bit matrices, and a logical instrument relabeling matrix. The processor may be further configured to determine whether the first stabilizer instrument is equal to the second stabilizer instrument up to measurement outcome relabeling based at least in part on the logical instrument specification. The above features may have the technical effect of determining whether the stabilizer instruments are equal up to measurement outcome relabeling based on logical-qubit-level behavior of the stabilizer instruments.

According to this aspect, the indication may indicate that the first stabilizer instrument is equal to the second stabilizer instrument up to measurement outcome relabeling. The processor may be further configured to compute a between-instrument relabeling matrix that maps a plurality of measurement outcomes performed at the second stabilizer instrument to measurement outcomes performed at the first stabilizer instrument. The processor may be further configured to output the between-instrument relabeling matrix. The above features may have the technical effect of computing a mapping between the measurement outcomes of the stabilizer instruments when the stabilizer instruments are equal up to measurement outcome relabeling.

According to this aspect, inputs to the first stabilizer instrument and the second stabilizer instrument may respectively include a first plurality of random classical bits and a second plurality of random classical bits. The processor may be further configured to compute a random bit relabeling matrix based at least in part on the plurality of logical instrument bit matrices and the logical instrument relabeling matrix. The random bit relabeling matrix may map the second plurality of random classical bits to the first plurality of random classical bits. The processor may be further configured to compute the between-instrument relabeling matrix based at least in part on the logical instrument relabeling matrix and the random bit relabeling matrix. The above features may have the technical effect of computing the relabeling matrix in a manner that accounts for all the inputs configured to be received at the stabilizer instruments.

According to this aspect, the logical instrument specification may be computed based at least in part on a logical instrument input error correction code including the second input Clifford unitary and a logical instrument output error correction code including the second output Clifford unitary. The above features may have the technical effect of determining whether the stabilizer instruments are equal up to measurement outcome relabeling based on logical-qubit-level behavior of the stabilizer instruments.

According to this aspect, the first stabilizer instrument and the second stabilizer instrument may have a same number of input qubits and a same number of output qubits. The above features may have the technical effects of allowing isomorphisms between the input qubits of the stabilizer instruments and between the output qubits of the stabilizer instruments.

According to another aspect of the present disclosure, a method for use with a computing system is provided. The method includes receiving a first stabilizer instrument specification of a first stabilizer instrument. The first stabilizer instrument specification includes a first input Clifford unitary, a first output Clifford unitary, and a plurality of first stabilizer instrument bit matrices. The method further includes receiving a second stabilizer instrument specification of a second stabilizer instrument. The second stabilizer instrument specification includes a second input Clifford unitary, a second output Clifford unitary, and a plurality of second stabilizer instrument bit matrices. Based at least in part on the first stabilizer instrument specification and the second stabilizer instrument specification, the method further includes determining whether the first stabilizer instrument is equal to the second stabilizer instrument up to measurement outcome relabeling. The method further includes outputting an indication of whether the first stabilizer instrument is equal to the second stabilizer instrument up to measurement outcome relabeling. The above features may have the technical effect of testing whether a stabilizer instrument implemented by a stabilizer circuit exhibits intended behavior.

According to this aspect, the method may further include determining whether the first stabilizer instrument is equal to the second stabilizer instrument, up to measurement outcome relabeling, when executing an error correction protocol of a quantum computing device. The method may further include generating debugging information as an output of the error correction protocol. The indication of whether the first stabilizer instrument is equal to the second stabilizer instrument up to measurement outcome relabeling may be included in the debugging information. The method may further include outputting the debugging information. The above features may have the technical effect of identifying errors that occur at a stabilizer circuit.

According to this aspect, the plurality of first stabilizer instrument bit matrices may include a first stabilizer instrument first bit matrix, a first stabilizer instrument second bit matrix, and a first stabilizer instrument third bit matrix. The plurality of second stabilizer instrument bit matrices may include a second stabilizer instrument first bit matrix, a second stabilizer instrument second bit matrix, and a second stabilizer instrument third bit matrix. The above features may have the technical effect of encoding transformations performed by the first stabilizer instrument and the second stabilizer instrument.

According to this aspect, the indication may indicate that the first stabilizer instrument is not equal to the second stabilizer instrument. The method may further include computing a second bit matrix subset of the plurality of second stabilizer instrument bit matrices that is equal to a corresponding first bit matrix subset of the plurality of first stabilizer instrument bit matrices up to measurement outcome relabeling. The method may further include outputting the first bit matrix subset and the second bit matrix subset. The above features may have the technical effect of identifying a potential source of error when implementing a stabilizer instrument at a stabilizer circuit.

According to this aspect, the indication may indicate that the first stabilizer instrument is not equal to the second stabilizer instrument. The method may further include computing a stabilizer instrument transformation Clifford unitary that maps the first stabilizer instrument to the second stabilizer instrument. The method may further include outputting the stabilizer instrument transformation Clifford unitary. The above features may have the technical effect of identifying a correction that converts the first stabilizer instrument into the second stabilizer instrument.

According to this aspect, the method may further include computing a logical instrument specification based at least in part on the first stabilizer instrument specification. The logical instrument specification may include a logical input Clifford unitary, a logical output Clifford unitary, a plurality of logical instrument bit matrices, and a logical instrument relabeling matrix. The method may further include determining whether the first stabilizer instrument is equal to the second stabilizer instrument up to measurement outcome relabeling based at least in part on the logical instrument specification. The above features may have the technical effect of determining whether the stabilizer instruments are equal up to measurement outcome relabeling based on logical-qubit-level behavior of the stabilizer instruments.

According to this aspect, the indication may indicate that the first stabilizer instrument is equal to the second stabilizer instrument up to measurement outcome relabeling. The method may further include computing a between-instrument relabeling matrix that maps a plurality of measurement outcomes performed at the second stabilizer instrument to measurement outcomes performed at the first stabilizer instrument. The method may further include outputting the between-instrument relabeling matrix. The above features may have the technical effect of computing a mapping between the measurement outcomes of the stabilizer instruments when the stabilizer instruments are equal up to measurement outcome relabeling.

According to this aspect, inputs to the first stabilizer instrument and the second stabilizer instrument may respectively include a first plurality of random classical bits and a second plurality of random classical bits. The method may further include computing a random bit relabeling matrix based at least in part on the plurality of logical instrument bit matrices and the logical instrument relabeling matrix. The random bit relabeling matrix may map the second plurality of random classical bits to the first plurality of random classical bits. The method may further include computing the between-instrument relabeling matrix based at least in part on the logical instrument relabeling matrix and the random bit relabeling matrix. The above features may have the technical effect of computing the relabeling matrix in a manner that accounts for all the inputs configured to be received at the stabilizer instruments.

According to this aspect, the logical instrument specification may be computed based at least in part on a logical instrument input error correction code including the second input Clifford unitary and a logical instrument output error correction code including the second output Clifford unitary. The above features may have the technical effect of determining whether the stabilizer instruments are equal up to measurement outcome relabeling based on logical-qubit-level behavior of the stabilizer instruments.

According to another aspect of the present disclosure, a computing system is provided, including a processor configured to, during execution of an error correction protocol of a quantum computing device, receive a first stabilizer instrument specification of a first stabilizer instrument. The first stabilizer instrument specification includes a first input Clifford unitary, a first output Clifford unitary, and a plurality of first stabilizer instrument bit matrices. The plurality of first stabilizer instrument bit matrices includes a first stabilizer instrument first bit matrix, a first stabilizer instrument second bit matrix, and a first stabilizer instrument third bit matrix. The processor is further configured to receive a second stabilizer instrument specification of a second stabilizer instrument. The second stabilizer instrument specification includes a second input Clifford unitary, a second output Clifford unitary, and a plurality of second stabilizer instrument bit matrices. The plurality of second stabilizer instrument bit matrices includes a second stabilizer instrument first bit matrix, a second stabilizer instrument second bit matrix, and a second stabilizer instrument third bit matrix. Based at least in part on the first stabilizer instrument specification and the second stabilizer instrument specification, the processor is further configured to determine whether the first stabilizer instrument is equal to the second stabilizer instrument up to measurement outcome relabeling. Based at least in part on the determination of whether the first stabilizer instrument is equal to the second stabilizer instrument up to measurement outcome relabeling, the processor is further configured to generate debugging information as an output of the error correction protocol. The debugging information includes a second bit matrix subset of the plurality of second stabilizer instrument bit matrices that is equal to a corresponding first bit matrix subset of the plurality of first stabilizer instrument bit matrices up to measurement outcome relabeling, or a between-instrument relabeling matrix that maps a plurality of measurement outcomes performed at the second stabilizer instrument to measurement outcomes performed at the first stabilizer instrument. The processor is further configured to output the debugging information. The above features may have the technical effect of testing whether a stabilizer instrument implemented by a stabilizer circuit exhibits intended behavior.

"And/or" as used herein is defined as the inclusive or $\lor$, as specified by the following truth table:

| A | B | A $\lor$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
  a processor configured to:
    receive a first stabilizer instrument specification of a first stabilizer instrument, the first stabilizer instrument specification including a first input Clifford unitary, a first output Clifford unitary, and a plurality of first stabilizer instrument bit matrices;
    receive a second stabilizer instrument specification of a second stabilizer instrument, the second stabilizer instrument specification including a second input Clifford unitary, a second output Clifford unitary, and a plurality of second stabilizer instrument bit matrices;
    control a quantum computing device to execute an error correction protocol;
    when executing the error correction protocol of the quantum computing device, based at least in part on the first stabilizer instrument specification and the second stabilizer instrument specification, determine whether the first stabilizer instrument is equal to the second stabilizer instrument up to measurement outcome relabeling; and output, as debugging information computed as an output of the error correction protocol, an indication of whether the first stabilizer instrument is equal to the second stabilizer instrument up to measurement outcome relabeling.

2. The computing system of claim 1, wherein the first stabilizer instrument and the second stabilizer instrument have a same number of input qubits and a same number of output qubits.

3. The computing system of claim 1, wherein:

the plurality of first stabilizer instrument bit matrices includes a first stabilizer instrument first bit matrix, a first stabilizer instrument second bit matrix, and a first stabilizer instrument third bit matrix; and the plurality of second stabilizer instrument bit matrices includes a second stabilizer instrument first bit matrix, a second stabilizer instrument second bit matrix, and a second stabilizer instrument third bit matrix.

4. The computing system of claim 1, wherein:

the indication indicates that the first stabilizer instrument is not equal to the second stabilizer instrument; and the processor is further configured to:

compute a second bit matrix subset of the plurality of second stabilizer instrument bit matrices that is equal to a corresponding first bit matrix subset of the plurality of first stabilizer instrument bit matrices up to measurement outcome relabeling; and output the first bit matrix subset and the second bit matrix subset.

5. The computing system of claim 1, wherein:

the indication indicates that the first stabilizer instrument is not equal to the second stabilizer instrument; and the processor is further configured to:

compute a stabilizer instrument transformation Clifford unitary that maps the first stabilizer instrument to the second stabilizer instrument; and output the stabilizer instrument transformation Clifford unitary.

6. The computing system of claim 1, wherein the processor is further configured to:

compute a logical instrument specification based at least in part on the first stabilizer instrument specification, wherein the logical instrument specification includes a logical input Clifford unitary, a logical output Clifford unitary, a plurality of logical instrument bit matrices, and a logical instrument relabeling matrix; and determine whether the first stabilizer instrument is equal to the second stabilizer instrument up to measurement outcome relabeling based at least in part on the logical instrument specification.

7. The computing system of claim 6, wherein:

the indication indicates that the first stabilizer instrument is equal to the second stabilizer instrument up to measurement outcome relabeling; and the processor is further configured to:

compute a between-instrument relabeling matrix that maps a plurality of measurement outcomes performed at the second stabilizer instrument to measurement outcomes performed at the first stabilizer instrument; and output the between-instrument relabeling matrix.

8. The computing system of claim 7, wherein:

inputs to the first stabilizer instrument and the second stabilizer instrument respectively include a first plurality of random classical bits and a second plurality of random classical bits; and the processor is further configured to:

compute a random bit relabeling matrix based at least in part on the plurality of logical instrument bit matrices and the logical instrument relabeling matrix, wherein the random bit relabeling matrix maps the second plurality of random classical bits to the first plurality of random classical bits; and compute the between-instrument relabeling matrix based at least in part on the logical instrument relabeling matrix and the random bit relabeling matrix.

9. The computing system of claim 6, wherein the logical instrument specification is computed based at least in part on:

a logical instrument input error correction code including the second input Clifford unitary; and a logical instrument output error correction code including the second output Clifford unitary.

10. A computing system comprising:

a processor configured to;

control a quantum computing device to execute an error correction protocol;

during execution of the error correction protocol of the quantum computing device:

receive a first stabilizer instrument specification of a first stabilizer instrument, the first stabilizer instrument specification including a first input Clifford unitary, a first output Clifford unitary, and a plurality of first stabilizer instrument bit matrices, wherein the plurality of first stabilizer instrument bit matrices includes a first stabilizer instrument first bit matrix, a first stabilizer instrument second bit matrix, and a first stabilizer instrument third bit matrix;

receive a second stabilizer instrument specification of a second stabilizer instrument, the second stabilizer instrument specification including a second input Clifford unitary, a second output Clifford unitary, and a plurality of second stabilizer instrument bit matrices, wherein the plurality of second stabilizer instrument bit matrices includes a second stabilizer instrument first bit matrix, a second stabilizer instrument second bit matrix, and a second stabilizer instrument third bit matrix;

based at least in part on the first stabilizer instrument specification and the second stabilizer instrument specification, determine whether the first stabilizer instrument is equal to the second stabilizer instrument up to measurement outcome relabeling;

based at least in part on the determination of whether the first stabilizer instrument is equal to the second stabilizer instrument up to measurement outcome relabeling, generate debugging information as an output of the error correction protocol, wherein the debugging information includes:

a second bit matrix subset of the plurality of second stabilizer instrument bit matrices that is equal to a corresponding first bit matrix subset of the plurality of first stabilizer instrument bit matrices up to measurement outcome relabeling; or a between-instrument relabeling matrix that maps a plurality of measurement outcomes performed at the second stabilizer instrument to measurement outcomes performed at the first stabilizer instrument; and output the debugging information as the output of the error correction protocol.

11. A method for use with a computing system, the method comprising:

receiving a first stabilizer instrument specification of a first stabilizer instrument, the first stabilizer instrument specification including a first input Clifford unitary, a first output Clifford unitary, and a plurality of first stabilizer instrument bit matrices;

receiving a second stabilizer instrument specification of a second stabilizer instrument, the second stabilizer instrument specification including a second input Clifford unitary, a second output Clifford unitary, and a plurality of second stabilizer instrument bit matrices;

controlling a quantum computing device to execute an error correction protocol;

when executing the error correction protocol of the quantum computing device, based at least in part on the first stabilizer instrument specification and the second stabilizer instrument specification, determining whether the first stabilizer instrument is equal to the second stabilizer instrument up to measurement outcome relabeling; and outputting, as debugging information computed as an output of the error correction protocol, an indication of whether the first stabilizer instrument is equal to the second stabilizer instrument up to measurement outcome relabeling.

12. The method of claim 11, wherein:

the plurality of first stabilizer instrument bit matrices includes a first stabilizer instrument first bit matrix, a first stabilizer instrument second bit matrix, and a first stabilizer instrument third bit matrix; and the plurality of second stabilizer instrument bit matrices includes a second stabilizer instrument first bit matrix, a second stabilizer instrument second bit matrix, and a second stabilizer instrument third bit matrix.

13. The method of claim 11, wherein:

the indication indicates that the first stabilizer instrument is not equal to the second stabilizer instrument; and the method further comprises:

computing a second bit matrix subset of the plurality of second stabilizer instrument bit matrices that is equal to a corresponding first bit matrix subset of the plurality of first stabilizer instrument bit matrices up to measurement outcome relabeling; and outputting the first bit matrix subset and the second bit matrix subset.

14. The method of claim 11, wherein:

the indication indicates that the first stabilizer instrument is not equal to the second stabilizer instrument; and the method further comprises:

computing a stabilizer instrument transformation Clifford unitary that maps the first stabilizer instrument to the second stabilizer instrument; and outputting the stabilizer instrument transformation Clifford unitary.

15. The method of claim 11, further comprising:

computing a logical instrument specification based at least in part on the first stabilizer instrument specification, wherein the logical instrument specification includes a logical input Clifford unitary, a logical output Clifford unitary, a plurality of logical instrument bit matrices, and a logical instrument relabeling matrix; and determining whether the first stabilizer instrument is equal to the second stabilizer instrument up to measurement outcome relabeling based at least in part on the logical instrument specification.

16. The method of claim 15, wherein:

the indication indicates that the first stabilizer instrument is equal to the second stabilizer instrument up to measurement outcome relabeling; and the method further comprises:

computing a between-instrument relabeling matrix that maps a plurality of measurement outcomes performed at the second stabilizer instrument to measurement outcomes performed at the first stabilizer instrument; and outputting the between-instrument relabeling matrix.

17. The method of claim 16, wherein:

inputs to the first stabilizer instrument and the second stabilizer instrument respectively include a first plurality of random classical bits and a second plurality of random classical bits; and the method further comprises:

computing a random bit relabeling matrix based at least in part on the plurality of logical instrument bit matrices and the logical instrument relabeling matrix, wherein the random bit relabeling matrix maps the second plurality of random classical bits to the first plurality of random classical bits; and computing the between-instrument relabeling matrix based at least in part on the logical instrument relabeling matrix and the random bit relabeling matrix.

18. The method of claim 15, wherein the logical instrument specification is computed based at least in part on:

a logical instrument input error correction code including the second input Clifford unitary; and a logical instrument output error correction code including the second output Clifford unitary.

* * * * *